United States Patent
Dandurand et al.

(10) Patent No.: US 12,208,844 B2
(45) Date of Patent: Jan. 28, 2025

(54) TRACK SYSTEM FOR TRACTION OF AN OFF-ROAD VEHICLE SUCH AS A SNOWMOBILE OR AN ALL-TERRAIN VEHICLE (ATV)

(71) Applicant: Camso Inc., Magog (CA)

(72) Inventors: Jules Dandurand, Sherbrooke (CA); Denis Courtemanche, Val Joli (CA); Pascal Labbé, Sherbrooke (CA); Linda Poulin, Compton (CA)

(73) Assignee: Camso Inc., Magog (CA)

( * ) Notice: Subject to any disclaimer, the term of this patent is extended or adjusted under 35 U.S.C. 154(b) by 768 days.

(21) Appl. No.: 17/021,866

(22) Filed: Sep. 15, 2020

(65) Prior Publication Data

US 2021/0078655 A1    Mar. 18, 2021

Related U.S. Application Data

(63) Continuation of application No. 13/689,128, filed on Nov. 29, 2012, now abandoned.

(60) Provisional application No. 61/564,630, filed on Nov. 29, 2011.

(51) Int. Cl.
| | | |
|---|---|---|
| B62D 55/24 | (2006.01) | |
| B62D 55/04 | (2006.01) | |
| B62D 55/065 | (2006.01) | |
| B62D 55/14 | (2006.01) | |

(Continued)

(52) U.S. Cl.
CPC .......... *B62D 55/244* (2013.01); *B62D 55/04* (2013.01); *B62D 55/065* (2013.01); *B62D 55/14* (2013.01); *B62D 55/24* (2013.01); *B62D 55/242* (2013.01); *B62D 55/305* (2013.01); *B62M 27/02* (2013.01); *B62M 2027/027* (2013.01)

(58) Field of Classification Search
CPC ...... B62D 55/24; B62D 55/244; B62D 55/04; B62D 55/065; B62D 55/18
See application file for complete search history.

(56) References Cited

U.S. PATENT DOCUMENTS

| | | | | |
|---|---|---|---|---|
| 3,498,684 A | * | 3/1970 | Hallaman | B62D 55/24 |
| | | | | 474/204 |
| 3,582,154 A | | 6/1971 | Russ, Sr. | |
| 3,747,994 A | | 7/1973 | Russ, Sr. | |

(Continued)

FOREIGN PATENT DOCUMENTS

| | | |
|---|---|---|
| CA | 2838935 | 1/2013 |
| CA | 2797535 | 5/2013 |
| WO | 2013002781 | 1/2013 |

OTHER PUBLICATIONS

Examiner's report issued on Jul. 3, 2019 in connection with Canadian Patent Application No. 2,797,535, 4 pages.

(Continued)

*Primary Examiner* — Jason R Bellinger
(74) *Attorney, Agent, or Firm* — Hahn Loeser & Parks LLP

(57) ABSTRACT

A track system for traction of an off-road vehicle such as a snowmobile or an all-terrain vehicle (ATV). The track system comprises a track-engaging assembly and a track disposed around the track-engaging assembly. The track system may be configured to have a reduced noise profile so as to generate less noise, enhanced track rigidity characteristics to improve its traction and floatation, and/or other features improving use and performance of the off-road vehicle.

38 Claims, 40 Drawing Sheets

(51) Int. Cl.
  *B62D 55/30* (2006.01)
  *B62M 27/02* (2006.01)

(56) References Cited

U.S. PATENT DOCUMENTS

| | | | |
|---|---|---|---|
| 3,747,995 A | 7/1973 | Russ, Sr. | |
| 3,858,948 A | 1/1975 | Johnson et al. | |
| 3,883,191 A | 5/1975 | Chaumont | |
| 3,917,360 A | 11/1975 | Gregoire | |
| 5,006,603 A | 4/1991 | Takaki et al. | |
| 5,474,146 A | 12/1995 | Yoshioka et al. | |
| 5,498,213 A * | 3/1996 | Mishima | F16G 5/20 474/263 |
| 5,624,338 A * | 4/1997 | Kawashima | F16G 5/20 474/263 |
| 5,730,510 A | 3/1998 | Courtemanche | |
| 5,904,217 A | 5/1999 | Yamamoto et al. | |
| 5,984,438 A * | 11/1999 | Tsunoda | B62D 55/24 305/179 |
| 6,109,705 A | 8/2000 | Courtemanche | |
| 6,203,125 B1 | 3/2001 | Arakawa et al. | |
| 6,406,655 B1 | 6/2002 | Courtemanche | |
| 6,494,548 B2 | 12/2002 | Courtemanche | |
| 6,536,852 B2 * | 3/2003 | Katayama | B62D 55/24 305/179 |
| 6,709,077 B2 | 3/2004 | Watanabe | |
| 6,923,515 B2 | 8/2005 | Konickson et al. | |
| 7,201,457 B2 | 4/2007 | Katoh et al. | |
| 7,229,141 B2 * | 6/2007 | Dandurand | B62D 55/244 305/165 |
| 7,407,236 B2 | 8/2008 | Fukushima | |
| 7,422,295 B2 | 9/2008 | Rasmussen et al. | |
| 7,823,987 B2 | 11/2010 | Dandurand et al. | |
| 8,476,372 B2 * | 7/2013 | Shimada | D01F 6/62 524/439 |
| 9,933,041 B2 * | 4/2018 | South | F16G 5/06 |
| 2002/0067074 A1 | 6/2002 | Katayama et al. | |
| 2002/0145335 A1 | 10/2002 | Soucy et al. | |
| 2003/0107267 A1 | 3/2003 | Katoh et al. | |
| 2005/0168068 A1 | 8/2005 | Courtemanche et al. | |
| 2006/0006737 A1 | 1/2006 | Dandurand | |
| 2006/0125318 A1 | 6/2006 | Soucy et al. | |
| 2006/0181150 A1 | 8/2006 | Dandurand | |
| 2006/0273660 A1 | 12/2006 | Dandurand et al. | |
| 2007/0126286 A1 | 6/2007 | Feldmann et al. | |
| 2007/0159004 A1 | 7/2007 | St-Amant | |
| 2008/0100134 A1 | 5/2008 | Soucy et al. | |
| 2008/0174176 A1 | 7/2008 | Berg | |
| 2009/0085398 A1 | 4/2009 | Maltais | |
| 2009/0195061 A1 | 8/2009 | Bellemare | |
| 2009/0224598 A1 | 9/2009 | St-Amant et al. | |
| 2010/0253138 A1 | 10/2010 | Despres | |
| 2011/0068620 A1 | 3/2011 | Delisle et al. | |
| 2011/0074210 A1 | 3/2011 | Paradis et al. | |
| 2011/0148189 A1 | 6/2011 | Courtemanche et al. | |
| 2011/0259654 A1 | 10/2011 | Yoshihara | |
| 2011/0315459 A1 | 12/2011 | Zuchoski et al. | |
| 2012/0001478 A1 | 1/2012 | Zuchoski et al. | |
| 2012/0104840 A1 | 5/2012 | Zuchoski et al. | |
| 2013/0134772 A1 | 5/2013 | Dandurand et al. | |
| 2013/0134773 A1 | 5/2013 | Dandurand et al. | |
| 2014/0182960 A1 | 7/2014 | Bedard et al. | |
| 2016/0200378 A1 | 7/2016 | Dandurand et al. | |
| 2018/0327036 A1 * | 11/2018 | Dandurand | B62M 27/02 |

OTHER PUBLICATIONS

Notice of Allowance issued on Mar. 4, 2020 in connection with Canadian Patent application No. 2,797,535, 1 page.
Examiner's report issued on Aug. 31, 2018 in connection with Canadian Patent Application No. 2,797,535, 3 pages.

* cited by examiner

TRACK SYSTEM FOR TRACTION OF AN OFF-ROAD VEHICLE SUCH AS A SNOWMOBILE OR AN ALL-TERRAIN VEHICLE (ATV)

CROSS-REFERENCE TO RELATED APPLICATION

This application is a continuation application of U.S. application Ser. No. 13/689,128 filed on Nov. 29, 2012 (now abandoned), which claims the benefit under 35 USC 119 (e) of U.S. Provisional Patent Application 61/564,630 filed on Nov. 29, 2011. Each application is incorporated by reference herein.

FIELD OF THE INVENTION

The invention relates generally to off-road vehicles such as snowmobiles and all-terrain vehicles (ATV) and, more particularly, to track systems for traction of snowmobiles, ATVs and other off-road vehicles.

BACKGROUND

Snowmobiles allow efficient travel on snowy and in some cases icy grounds. A snowmobile comprises a track system which engages the ground to provide traction. The track system comprises a track-engaging assembly and an endless track that moves around the track-engaging assembly and engages the ground to generate traction. The endless track typically comprises an elastomeric body in which are embedded certain reinforcements, such as transversal stiffening rods providing transversal rigidity to the track, longitudinal cables providing tensional strength, and/or fabric layers. The track-engaging assembly comprises wheels and in some cases slide rails around which the endless track is driven.

Various considerations are important when it comes to a snowmobile's use and performance.

For example, a snowmobile generates noise, including noise generated by its track system. Various factors may contribute to the noise generated by the snowmobile's track system. For instance, in some cases: impacts between roller and/or other wheels of the track-engaging assembly and the transversal stiffening rods of the endless track; impacts between the slide rails and the transversal stiffening rods of the endless track; impacts between the slide rails and slide members (e.g., "clips") of the endless track, if any; impacts between the ground and traction projections of a ground-engaging outer side of the endless track; and contact between the endless track and drive wheels of the track-engaging assembly may contribute to the noise generated by the snowmobile's track system.

As another example, traction and floatation provided by a snowmobile's track system depend on rigidity of the track system's endless track. While longitudinal flexibility of the track is desirable in order to efficiently drive the track around the track-engaging assembly, transversal rigidity of the track is desirable in order to have a proper ground-contacting area for traction and floatation.

Similar considerations may be important for all-terrain vehicles (ATVs) equipped with track systems having endless tracks providing traction to the ATVs on the ground (e.g., an ATV equipped with two front track systems in place of two front wheels and two rear track systems in place of two rear wheels) and/or for other types of off-road vehicles.

While certain developments have been made to improve performance of track systems of snowmobiles, ATVs and other off-road vehicles, there remains a need for improvements in such track systems.

SUMMARY OF THE INVENTION

In accordance with an aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a plurality of stiffening rods extending transversally to a longitudinal direction of the track. Each stiffening rod of the plurality of stiffening rods has a cross-section perpendicular to a longitudinal axis of the stiffening rod. The cross-section of the stiffening rod is elongate.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a plurality of stiffening rods extending transversally to a longitudinal direction of the track. Each stiffening rod of the plurality of stiffening rods has a cross-section perpendicular to a longitudinal axis of the stiffening rod. The cross-section of the stiffening rod has an aspect ratio of at least 4.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a plurality of stiffening rods extending transversally to a longitudinal direction of the track. Each stiffening rod of the plurality of stiffening rods has a cross-section perpendicular to a longitudinal axis of the stiffening rod. A ratio of (i) a thickness of the cross-section of the stiffening rod in a thickness direction of the track over (ii) a thickness of a carcass of the track from the inner surface to the ground-engaging outer surface in the thickness direction of the track is less than 0.7.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a plurality of stiffening rods extending transversally to a longitudinal direction of the track. Each stiffening rod of the plurality of stiffening rods has a cross-section perpendicular to a longitudinal axis of the stiffening rod. A thickness of the cross-section of the stiffening rod in a thickness direction of the track is less than 3.5 mm.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track is free of reinforcing fabric between the inner surface and the ground-engaging outer surface along at least part of a length of the track.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track is free of reinforcing fabric.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. A thickness of the track from the inner surface to the ground-engaging outer surface is no more than 0.25 inches. The track is free of reinforcing fabric between the inner surface and the ground-engaging outer surface along at least part of a length of the track.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a plurality of stiffening rods extending transversally to a longitudinal direction of the track. Each stiffening rod of the plurality of stiffening rods comprises a cavity.

In accordance with another aspect of the invention, there is provided a track for traction of an off-road vehicle. The track is mountable around a track-engaging assembly of the off-road vehicle. The track-engaging assembly comprises a drive wheel for driving the track and an idler wheel for contacting the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The inner surface comprises an idler wheel path for the idler wheel. The track also comprises a plurality of stiffening rods extending transversally to a longitudinal direction of the track. Each stiffening rod of the plurality of stiffening rods comprises a recess aligned with the idler wheel path.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a plurality of stiffening rods extending transversally to a longitudinal direction of the track. Each stiffening rod of the plurality of stiffening rods is shaped such that a thickness of elastomeric material between (i) the inner surface and (ii) a surface of the stiffening rod facing the inner surface varies in the longitudinal direction of the track.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a plurality of stiffening rods extending transversally to a longitudinal direction of the track. Each stiffening rod of the plurality of stiffening rods is dimensioned such that the stiffening rod does not extend beneath laterally-outmost track-contacting devices of the track-engaging assembly.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a plurality of stiffening rods extending transversally to a longitudinal direction of the track. A first one of the stiffening rods and a second one of the stiffening rods being stacked in a thickness direction of the track.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a plurality of stiffening rods extending transversally to a longitudinal direction of the track. A given one of the stiffening rods is located between adjacent ones of the traction projections in the longitudinal direction of the track.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a plurality of stiffening rods extending transversally to a longitudinal direction of the track. A first one of the stiffening rods is different from a second one of the stiffening rods that succeeds the first one of the stiffening rods in the longitudinal direction of the track.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a plurality of stiffening rods extending transversally to a longitudinal direction of the track. The plurality of stiffening rods includes an elastomeric fiber-reinforced rod.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner side for facing the track-engaging assembly and a ground-engaging outer side for engaging the ground. The ground-engaging outer side comprises a ground-engaging outer surface and a plurality of traction projections projecting from the ground-engaging outer surface. Elastomeric material of the ground-engaging outer side is different from elastomeric material between the inner side and the ground-engaging outer side such that at least one of: a hardness of the elastomeric material of the ground-engaging outer side is lower than a hardness of the elastomeric material between the inner side and the ground-engaging outer side; and a modulus of elasticity of the elastomeric material of the ground-engaging outer side is lower than a modulus of elasticity of the elastomeric material between the inner side and the ground-engaging outer side.

In accordance with another aspect of the invention, there is provided a track for traction of an off-road vehicle. The track is mountable around a track-engaging assembly of the off-road vehicle. The track-engaging assembly comprises a drive wheel for driving the track and an idler wheel for contacting the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The inner surface comprises an idler wheel path for the idler wheel. A shock absorbency of the track at a widthwise position of the idler wheel path is greater than a shock absorbency of the track at a widthwise position outside the idler wheel path.

In accordance with another aspect of the invention, there is provided a track for traction of an off-road vehicle. The track is mountable around a track-engaging assembly of the off-road vehicle. The track-engaging assembly comprises a drive wheel for driving the track and an idler wheel for contacting the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. Elastomeric material at a widthwise position of the idler wheel path is different from elastomeric material at a widthwise position outside the idler wheel path such that at least one of: a hardness of the elastomeric material at the widthwise position of the idler wheel path is lower than a hardness of the elastomeric material at the widthwise position outside the idler wheel path; and a modulus of elasticity of the elastomeric material at the widthwise position of the idler wheel path is lower than a modulus of elasticity of the elastomeric material at the widthwise position outside the idler wheel path.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a layer of stiffening cables extending transversally to a longitudinal direction of the track.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track also comprises a plurality of stiffening rods extending transversally to a longitudinal direction of the track. The track further comprises a layer of stiffening cables extending transversally to the longitudinal direction of the track.

In accordance with another aspect of the invention, there is provided a track for traction of an off-road vehicle. The track is mountable around a track-engaging assembly of the off-road vehicle. The track-engaging assembly comprises a drive wheel for driving the track and an idler wheel for contacting the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The ground-engaging outer surface defines an idler wheel path projection that is located between adjacent ones of the traction projections in a longitudinal direction of the track and that is aligned with the idler wheel path in a widthwise direction of the track.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. At least one of the inner surface and the ground-engaging outer surface comprises a plurality of longitudinal rigidifiers for imparting longitudinal rigidity to the track.

In accordance with another aspect of the invention, there is provided a track for traction of an off-road vehicle. The track is mountable around a track-engaging assembly of the off-road vehicle. The track-engaging assembly comprises a drive wheel for driving the track and an idler wheel for contacting the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The inner surface comprises an idler wheel path for the idler wheel. The idler wheel path is uneven in a longitudinal direction of the track.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track is at least mainly made of fiber-reinforced elastomeric material.

In accordance with another aspect of the invention, there is provided a track for traction of an off-road vehicle. The track is mountable around a track-engaging assembly of the off-road vehicle. The track-engaging assembly comprises a drive wheel for driving the track and an idler wheel for contacting the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. Cellular elastomeric material is located at a widthwise position of the idler wheel path.

In accordance with another aspect of the invention, there is provided a track-engaging assembly for a track system providing traction of an off-road vehicle. The track-engaging assembly is configured to engage a track disposed around the track-engaging assembly. The track is elastomeric to be flexible around the track-engaging assembly. The track comprises: an inner surface for facing the track-engaging assembly, the inner surface comprising an idler wheel path; a ground-engaging outer surface for engaging the ground; and a plurality of traction projections projecting from the ground-engaging outer surface. The track-engaging assembly comprises a drive wheel for driving the track and a plurality of idler wheels for contacting the track. The plurality of idler wheels includes a set of idler wheels spaced apart in a longitudinal direction of the track system and disposed to roll on the idler wheel path of the track. The set of idler wheels is arranged such that a longitudinal spacing of any two successive idler wheels of the set of idler wheels is less than half of a length of the track system.

In accordance with another aspect of the invention, there is provided a track-engaging assembly for a track system providing traction of an off-road vehicle. The track-engaging assembly is configured to engage a track disposed around the track-engaging assembly. The track is elastomeric to be flexible around the track-engaging assembly. The track comprises: an inner surface for facing the track-engaging assembly, the inner surface comprising an idler wheel path; a ground-engaging outer surface for engaging the ground; and a plurality of traction projections projecting from the ground-engaging outer surface. The track-engaging assembly comprises a drive wheel for driving the track and a plurality of idler wheels for contacting the track. The plurality of idler wheels includes at least four idler wheels spaced apart in a longitudinal direction of the track and disposed to roll on the idler wheel path of the track.

In accordance with another aspect of the invention, there is provided a track-engaging assembly for a track system providing traction of an off-road vehicle. The track-engaging assembly is configured to engage a track disposed around the track-engaging assembly. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track-engaging assembly comprises a drive wheel for driving the track and a plurality of side rails spaced apart in a widthwise direction of the track system to slide against a bottom run of the track. The plurality of side rails is arranged such that a widthwise spacing of any two adjacent slide rails of the plurality of side rails is less than half of a width of the track system.

In accordance with another aspect of the invention, there is provided a track-engaging assembly for a track system providing traction of an off-road vehicle. The track-engaging assembly is configured to engage a track disposed around the track-engaging assembly. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track-engaging assembly comprises a drive wheel for driving the track and a plurality of side rails spaced apart in a widthwise direction of the track system to slide against a bottom run of the track. The plurality of side rails includes at least three slide rails.

In accordance with another aspect of the invention, there is provided a track-engaging assembly for a track system providing traction of an off-road vehicle. The track-engaging assembly is configured to engage a track disposed around the track-engaging assembly. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track-engaging assembly comprises a drive wheel for driving the track and an idler wheel for contacting a bottom run of the track. The track-engaging assembly also comprises a track tensioner for maintaining a tension of the track.

In accordance with another aspect of the invention, there is provided a track-engaging assembly for a track system providing traction of an off-road vehicle. The track-engaging assembly is configured to engage a track disposed around the track-engaging assembly. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track-engaging assembly comprises a drive wheel for driving the track and an idler wheel for contacting a bottom run of the track. The track-engaging assembly also comprises a track tensioner for maintaining a tension of the track. The track tensioner comprises a resilient device for contacting a segment of a top run of the track.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 4 to 7A respectively show an elevation view, a plan view of an inner side, a longitudinal cross-sectional view, and a widthwise cross-sectional view of part of the track;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
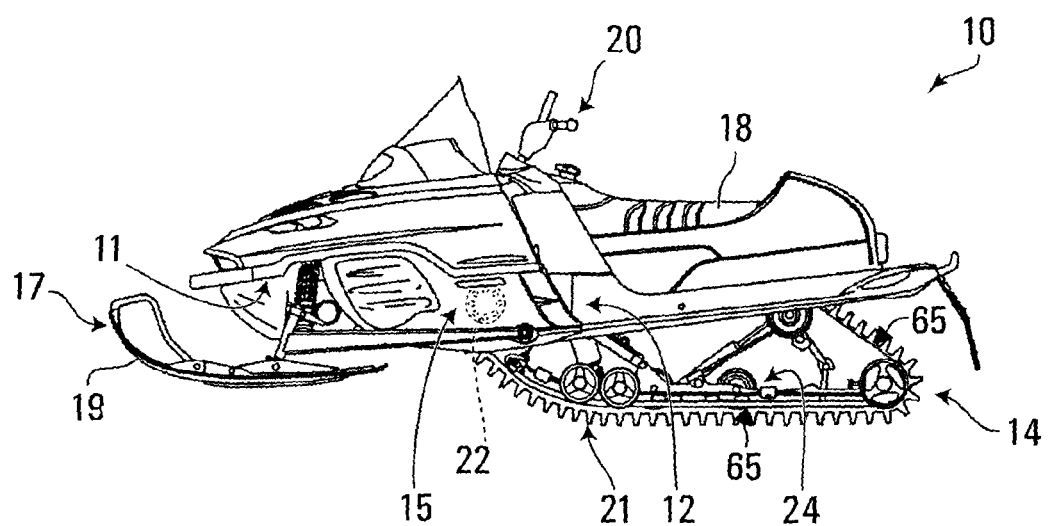
FIG. 1 shows an example of a snowmobile comprising a track system in accordance with an embodiment of the invention.

FIG. 1 shows an example of a snowmobile 10 in accordance with an embodiment of the invention. The snowmobile 10 is designed for travelling on snow and in some cases ice. In this embodiment, the snowmobile 10 comprises a frame 11, a powertrain 12, a track system 14, a ski assembly 17, a seat 18, and a user interface 20, which enables a user to control the snowmobile 10.

The powertrain 12 is configured for generating motive power and transmitting motive power to the track system 14 to propel the snowmobile 10 on the ground. To that end, the powertrain 12 comprises a prime mover 15, which is a source of motive power that comprises one or more motors (e.g., an internal combustion engine, an electric motor, etc.). For example, in this embodiment, the prime mover 15 comprises an internal combustion engine. In other embodiments, the prime mover 15 may comprise another type of motor (e.g., an electric motor) or a combination of different types of motor (e.g., an internal combustion engine and an electric motor). The prime mover 15 is in a driving relationship with the track system 14 That is, the powertrain 12 transmits motive power from the primer mover 15 to the track system 14 in order to drive (i.e., impart motion to) the track system 14.

The ski assembly 17 is turnable to allow steering of the snowmobile 10. In this embodiment, the ski assembly 17 comprises a pair of skis 19 connected to the frame 11 via a front suspension unit.

The seat 18 accommodates the user of the snowmobile 10. In this case, the seat 18 is a straddle seat and the snowmobile 10 is usable by a single person such that the seat 18 accommodates only that person driving the snowmobile 10. In other cases, the seat 18 may be another type of seat, and/or the snowmobile 10 may be usable by two individuals, namely one person driving the snowmobile 10 and a passenger, such that the seat 18 may accommodate both of these individuals (e.g., behind one another) or the snowmobile 10 may comprise an additional seat for the passenger.

The user interface 20 allows the user to interact with the snowmobile 10 to control the snowmobile 10. More particularly, the user interface 20 comprises an accelerator, a brake control, and a steering device that are operated by the user to control motion of the snowmobile 10 on the ground. In this case, the steering device comprises handlebars, although it may comprise a steering wheel or other type of steering element in other cases. The user interface 20 also comprises an instrument panel (e.g., a dashboard) which provides indicators (e.g., a speedometer indicator, a tachometer indicator, etc.) to convey information to the user.

Figure 2:
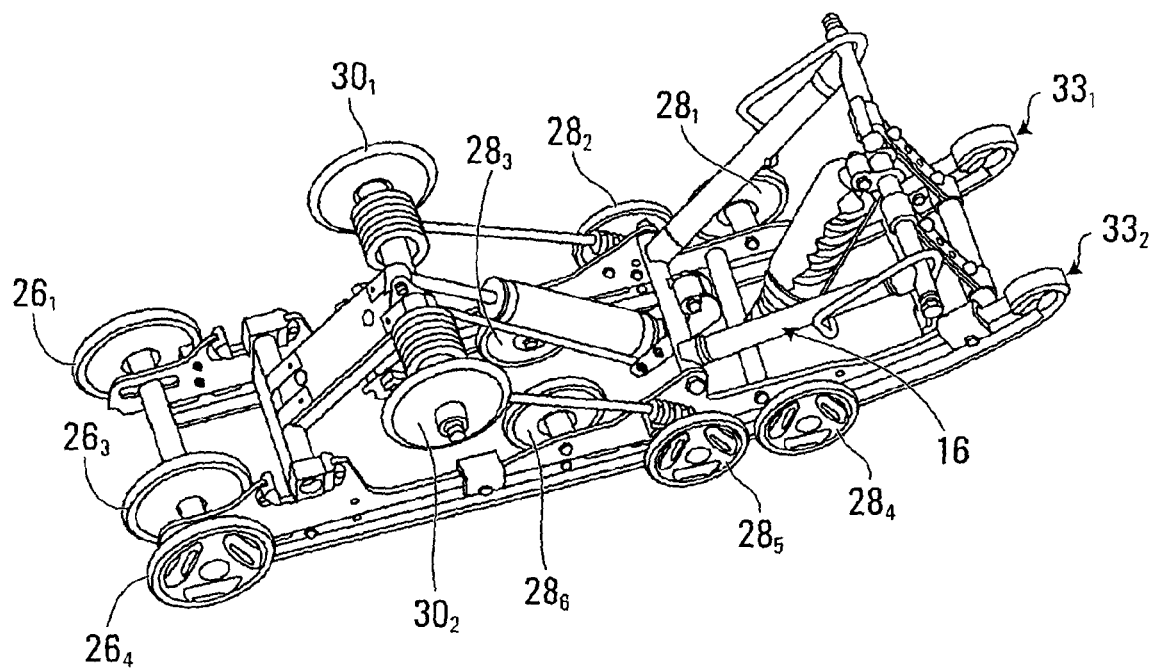
FIG. 2 shows a perspective view of components of the track system.
Figure 3:
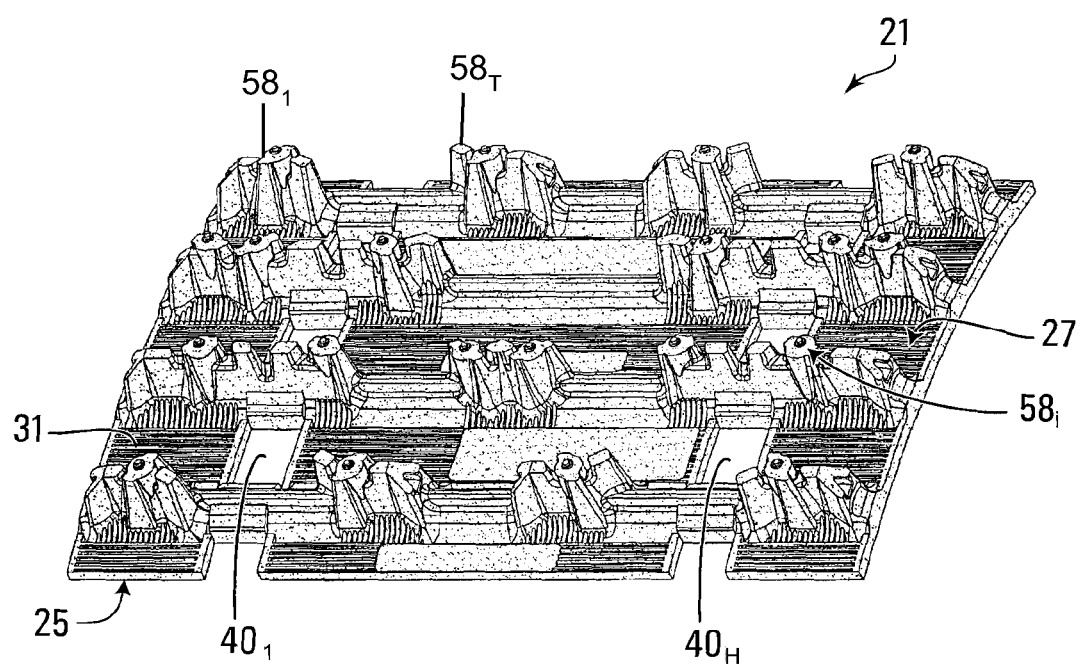
FIG. 3 shows a perspective view of part of a track of the track system.
Figure 4:
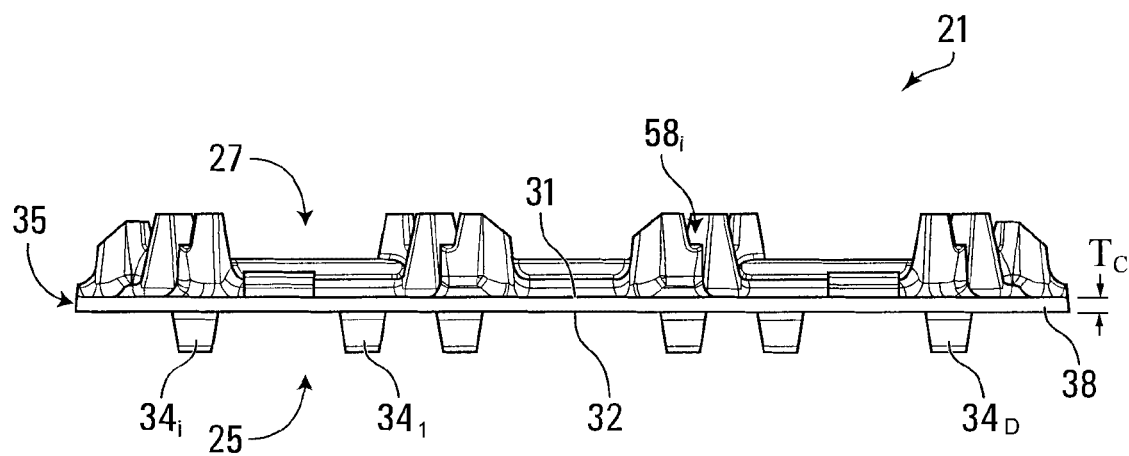
Figure 5:
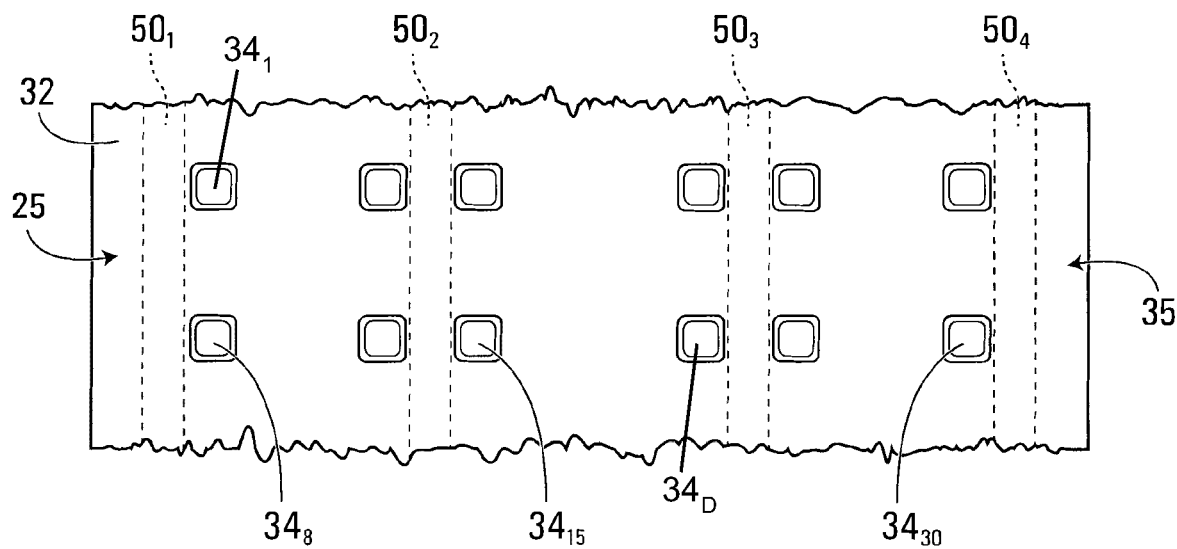
Figure 6:
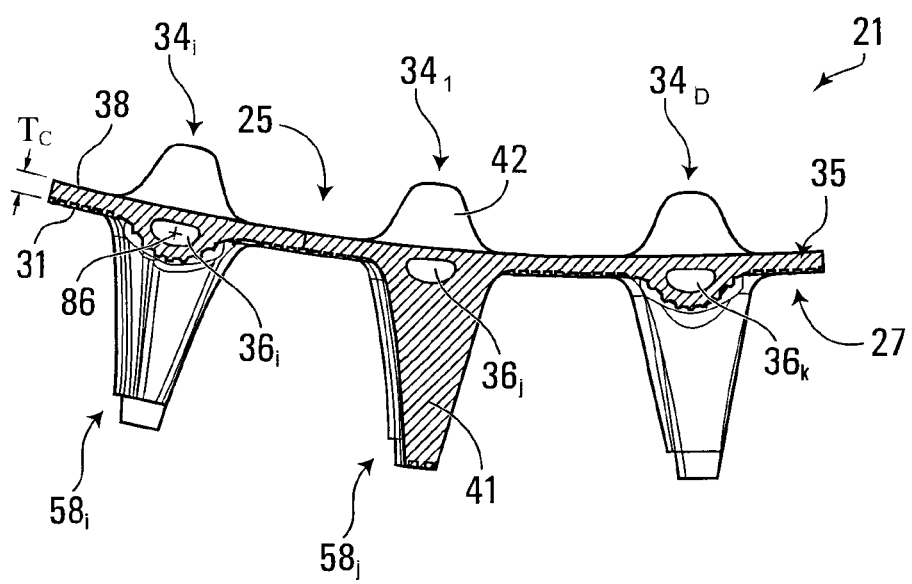

The track system 14 engages the ground to generate traction of the snowmobile 10. In this embodiment, the track system 14 comprises a track-engaging assembly 24 and a track 21 disposed around the track-engaging assembly 24. More particularly, in this embodiment, with additional reference to FIG. 2, the track-engaging assembly 24 comprises a plurality of wheels, including a plurality of drive wheels 22 and a plurality of idler wheels, which includes rear idler wheels $26_1$-$26_4$, lower roller wheels $28_1$-$28_6$, and upper roller wheels $30_1$, $30_2$. The track-engaging assembly 24 also comprises a plurality of slide rails $33_1$, $33_2$. Various components of the track-engaging assembly 24, including the idler wheels $26_1$-$26_4$, $28_1$-$28_6$, $30_1$, $30_2$ and the slide rails $33_1$, $33_2$ are supported by a suspension unit 16. The track system 14 has a longitudinal direction and a first longitudinal end and a second longitudinal end that define a length of the track system 14. The track system 14 has a widthwise direction and a width that is defined by a width of the track 21. The track system 14 has a height direction that is normal to its longitudinal direction and its widthwise direction.

The track 21 engages the ground to provide traction to the snowmobile 10. A length of the track 21 allows the track 21 to be mounted around the track-engaging assembly 24. In view of its closed configuration without ends that allows it to be disposed and moved around the track-engaging assembly 24, the track 21 can be referred to as an "endless" track. With additional reference to FIGS. 3 to 7A, the endless track 21 comprises an inner side 25 and a ground-engaging outer side 27. The inner side 25 faces the wheels 22, $26_1$-$26_4$, $28_1$-$28_6$, $30_1$, $30_2$ and the slide rails $33_1$, $33_2$. The ground-engaging outer side 27 engages the ground. A top run 65 of the endless track 21 extends between the longitudinal ends of the track system 14 and over the wheels 22, $26_1$-$26_4$, $28_1$-$28_6$, $30_1$, $30_2$, and a bottom run of the endless track 21 extends between the longitudinal ends of the track system 14 and under the wheels 22, $26_1$-$26_4$, $28_1$-$28_6$, $30_1$, $30_2$ and the slide rails $33_1$, $33_2$. The endless track 21 has a longitudinal axis which defines a longitudinal direction of the track 21 (i.e., a direction generally parallel to its longitudinal axis) and transversal directions of the track (i.e., directions transverse to its longitudinal axis), including a widthwise direction of the track (i.e., a lateral direction generally perpendicular to its longitudinal axis). The endless track 21 has a thickness direction normal to its longitudinal and widthwise directions.

The track 21 is elastomeric, i.e., comprises elastomeric material, to be flexible around the track-engaging assembly 24. The elastomeric material of the track 21 can include any polymeric material with suitable elasticity. In this embodiment, the elastomeric material of the track 21 includes rubber. Various rubber compounds may be used and, in some cases, different rubber compounds may be present in different areas of the track 21. In other embodiments, the elastomeric material of the track 21 may include another elastomer in addition to or instead of rubber (e.g., polyurethane elastomer).

More particularly, the track 21 comprises an endless body 35 underlying its inner side 25 and ground-engaging outer side 27. In view of its underlying nature, the body 36 will be referred to as a "carcass". The carcass 35 is elastomeric in that it comprises elastomeric material 38 which allows the carcass 35 to elastically change in shape and thus the endless track 21 to flex as it is in motion around the track-engaging assembly 24. The elastomeric material 38 can be any polymeric material with suitable elasticity. In this embodiment, the elastomeric material 38 includes rubber. Various rubber compounds may be used and, in some cases, different rubber compounds may be present in different areas of the carcass 35. In other embodiments, the elastomeric material 38 may include another elastomer in addition to or instead of rubber (e.g., polyurethane elastomer).

In this embodiment, the carcass 35 comprises a plurality of reinforcements embedded in its elastomeric material 38. These reinforcements can take on various forms.

For example, in this embodiment, the carcass 35 comprises a plurality of transversal stiffening rods $36_1$-$36_N$ that extend transversally to the longitudinal direction of the endless track 21 to provide transversal rigidity to the track 21. More particularly, in this embodiment, the transversal stiffening rods $36_1$-$36_N$ extend in the widthwise direction of the track 21. Each of the transversal stiffening rods $36_1$-$36_N$ may have various shapes and be made of any suitably rigid material (e.g., metal, polymer or composite material).

As another example, in this embodiment, the carcass 35 comprises a plurality of reinforcing cables $37_1$-$37_M$ (which indicates any number of reinforcing cables $37_1$, $37_2$, . . . $37_M$) that are adjacent to one another and extend generally in the longitudinal direction of the endless track 21 to enhance strength in tension of the track 21 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible longitudinally (e.g., fibers or wires of metal, plastic or composite material).

As yet another example, in this embodiment, the carcass 35 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 21 to have a reinforcing effect in a transversal direction of the track 21. For instance, the reinforcing fabric 43 may comprise a ply of reinforcing woven fibers (e.g., nylon fibers or other synthetic fibers). For example, the reinforcing fabric 43 may protect the transversal stiffening rods $36_1$-$36_N$, improve cohesion of the track 21, and counter its elongation.

The carcass 35 may be molded into shape in a molding process during which the rubber 38 is cured. For example, in this embodiment, a mold may be used to consolidate layers of rubber providing the rubber 38 of the carcass 35, the reinforcing cables $37_1$-$37_M$ and the layer of reinforcing fabric 43.

In this embodiment, the endless track 21 is a one-piece "jointless" track such that the carcass 35 is a one-piece jointless carcass. In other embodiments, the endless track 21 may be a "jointed" track (i.e., having at least one joint connecting adjacent parts of the track 21) such that the carcass 35 is a jointed carcass (i.e., which has adjacent parts connected by the at least one joint). For example, in some embodiments, the endless track 21 may comprise a plurality of track sections interconnected to one another at a plurality of joints, in which case each of these track sections includes a respective part of the carcass 35. In other embodiments, the endless track 21 may be a one-piece track that can be closed like a belt with connectors at both of its longitudinal ends to form a joint.

The ground-engaging outer side 27 of the track 21 comprises a ground-engaging outer surface 31 of the carcass 35 and a plurality of traction projections $58_1$-$58_T$ that project outwardly from the ground-engaging outer surface 31 to enhance traction on the ground. The traction projections $58_1$-$58_T$, which can be referred to as "traction lugs" or "traction profiles", may have any suitable shape (e.g., curved shapes, shapes with straight parts and curved parts, etc.).

In this embodiment, each of the traction projection $58_1$-$58_T$ is an elastomeric traction projection in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of each of the traction projections $58_1$-$58_T$. In other embodiments, the elastomeric material 41 may include another elastomer in addition to or instead of rubber (e.g., polyurethane elastomer).

The traction projections $58_1$-$58_T$ may be provided on the ground-engaging outer side 27 in various ways. For example, in this embodiment, the traction projections $58_1$-$58_T$ are provided on the ground-engaging outer side 27 by being molded with the carcass 35.

The inner side 25 of the track 21 comprises an inner surface 32 of the carcass 35 and a plurality of inner projections $34_1$-$34_D$ (which indicates any number of inner projections $34_1 \ldots 34_8 \ldots 34_{15} \ldots 34_{30} \ldots 34_D$) that project inwardly from the inner surface 32 and are positioned to contact at least some of the wheels 22, $26_1$-$26_4$, $28_1$-$28_6$, $30_1$, $30_2$ and/or some of the slide rails $33_1$, $33_2$ to do at least one of driving (i.e., imparting motion to) the track 21 and guiding the track 21. Since each of them is used to do at least one of driving the track 21 and guiding the track 21, the inner projections $34_1$-$34_D$ can be referred to as "drive/guide projections" or "drive/guide lugs". In some cases, a drive/guide lug $34_i$ may interact with a given one of the drive wheels 22 to drive the track 21, in which case the drive/guide lug $34_i$ is a drive lug. In other cases, a drive/guide lug $34_i$ may interact with a given one of the idler wheels $26_1$-$26_4$, $28_1$-$28_2$, $30_1$, $30_2$ and/or a given one of the slide rails $33_1$, $33_2$ to guide the track 21 to maintain proper track alignment and prevent de-tracking without being used to drive the track 21, in which case the drive/guide lug $34_i$ is a guide lug. In yet other cases, a drive/guide lug $34_i$ may both (i) interact with a given one of the drive wheels 22 to drive the track 21 and (ii) interact with a given one of the idler wheels $26_1$-$26_4$, $28_1$-$28_6$, $30_1$, $30_2$ and/or a given one of the slide rails $33_1$, $33_2$ to guide the track 21, in which case the drive/guide lug $34_i$ is both a drive lug and a guide lug.

In this embodiment, each of the drive/guide lugs $34_1$-$34_D$ is an elastomeric drive/guide lug in that it comprises elastomeric material 42. The elastomeric material 42 can be any polymeric material with suitable elasticity. More particularly, in this embodiment, the elastomeric material 42 includes rubber. Various rubber compounds may be used and, in some cases, different rubber compounds may be present in different areas of each of the drive/guide lugs $34_1$-$34_D$. In other embodiments, the elastomeric material 42 may include another elastomer in addition to or instead of rubber (e.g., polyurethane elastomer).

The drive/guide lugs $34_1$-$34_D$ may be provided on the inner side 25 in various ways. For example, in this embodiment, the drive/guide lugs $34_1$-$34_D$ are provided on the inner side 25 by being molded with the carcass 35.

The carcass 35 has a thickness $T_c$ which is relatively small. The thickness $T_c$ of the carcass 35 is measured from the inner surface 32 to the ground-engaging outer surface 31 of the carcass 35 between longitudinally-adjacent ones of the traction projections $58_1$-$58_T$. For example, in some embodiments, the thickness $T_c$ of the carcass 35 may be no more than 0.25 inches, in some cases no more than 0.24 inches, in some cases no more than 0.23 inches, in some cases no more than 0.22 inches, in some cases no more than 0.21 inches, in some cases no more than 0.20 inches, and in some cases even less (e.g., 0.18 or 0.17 inches). The thickness $T_c$ of the carcass 35 may have any other suitable value in other embodiments.

The endless track 21 may be constructed and/or manufactured in various other ways in other embodiments.

Figure 7A:
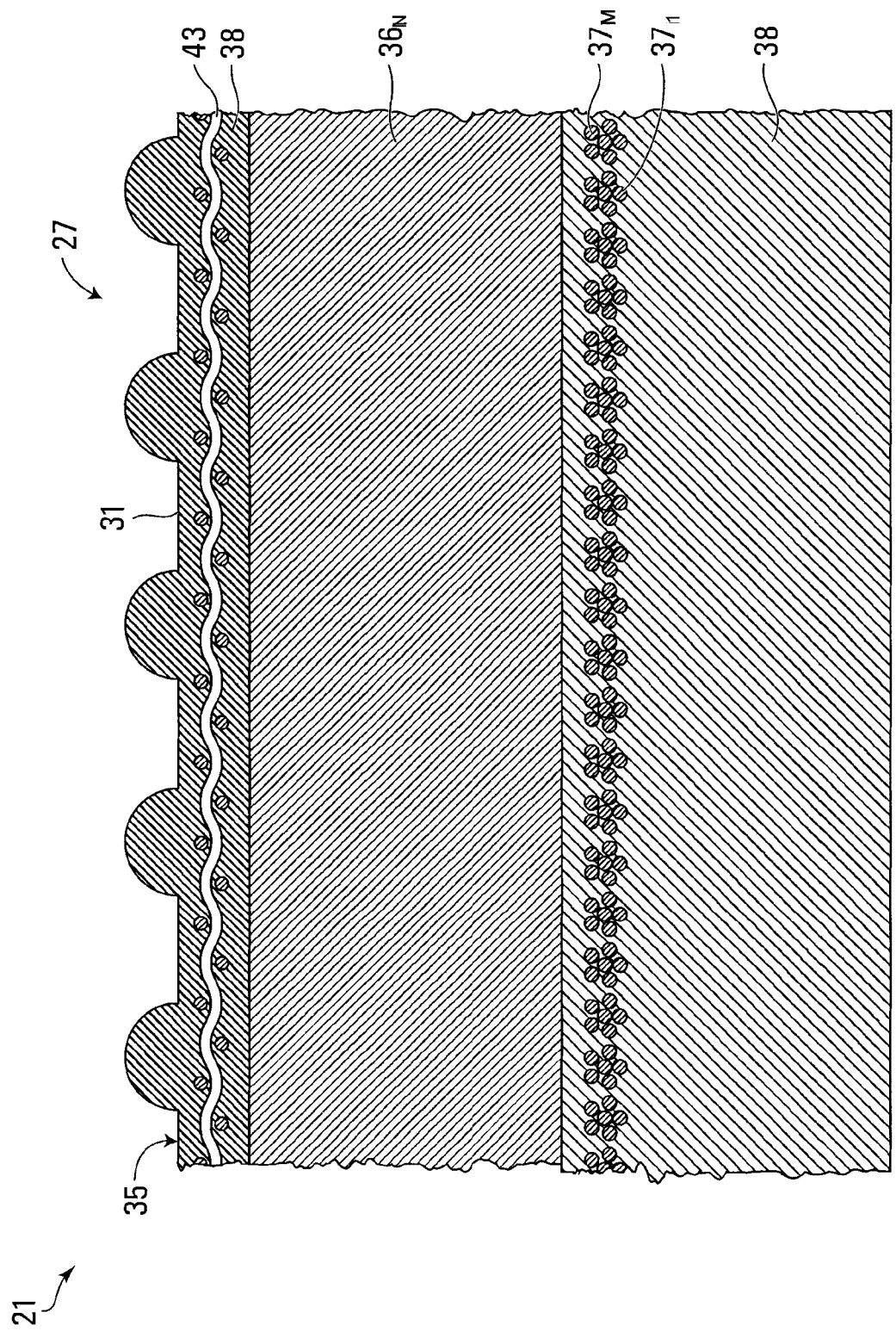
Figure 7B:
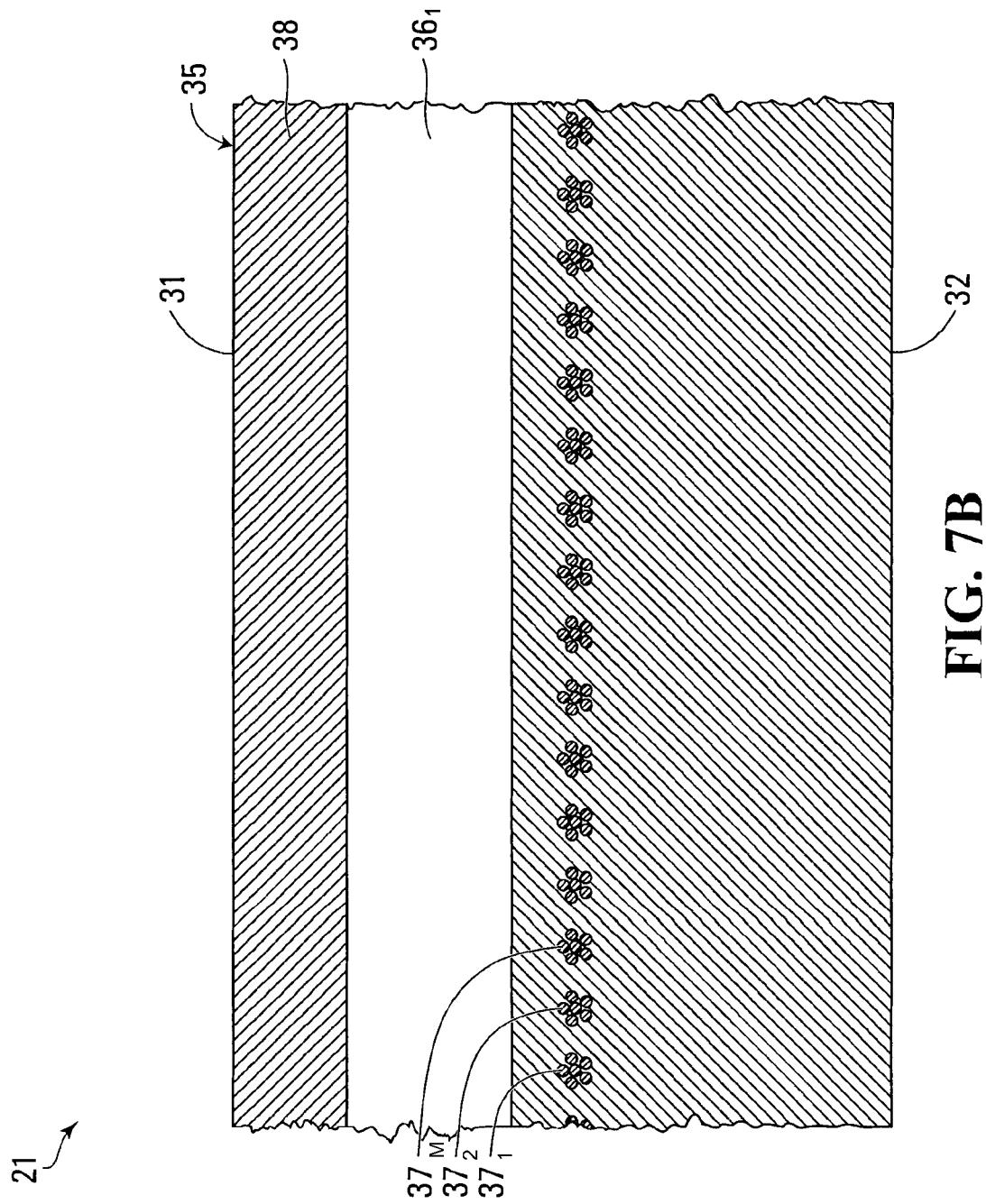
FIGS. 7B to 7D shows a widthwise cross-sectional view of part of the track according to other embodiments of the invention.

For example, FIG. 7B shows an embodiment in which the track 21 is free of reinforcing fabric between the inner surface 32 and the ground-engaging outer surface 31 of the carcass 35 along at least part of the length of the track 21. That is, there is no layer of reinforcing fabric in the carcass 35 along at least part of the length of the track 21. In this embodiment, the track 21 is free of reinforcing fabric between the inner surface 32 and the ground-engaging outer surface 31 along at least a majority of the length of the track 21. More particularly, in this example of implementation, the track 21 is free of reinforcing fabric between the inner surface 32 and the ground-engaging outer surface 31 along an entirety of the length of the track 21. There is thus no layer of reinforcing fabric in the carcass 35 of the track 21 in this example of implementation. Specifically, in this case, the track 21 is free of reinforcing fabric, i.e., there is no layer of reinforcing fabric in the track 21.

This lack of reinforcing fabric layer may reduce a weight of the track 21. The lack of reinforcing fabric layer may also reduce a power consumption to drive the track 21. That is, when operated at a given speed, the track 21 may consume less power than if it had a reinforcing fabric layer (e.g., the layer of reinforcing fabric 43) embedded in the carcass 35 and extending along at least a majority (e.g., an entirety) of the length of the track 21 but was otherwise identical. For instance, in some examples of implementation, the track 21 may consume less power when operated at a speed above 40 miles per hour, in some cases above 60 miles per hour, and in some cases above 80 miles per hour.

Figure 7C:
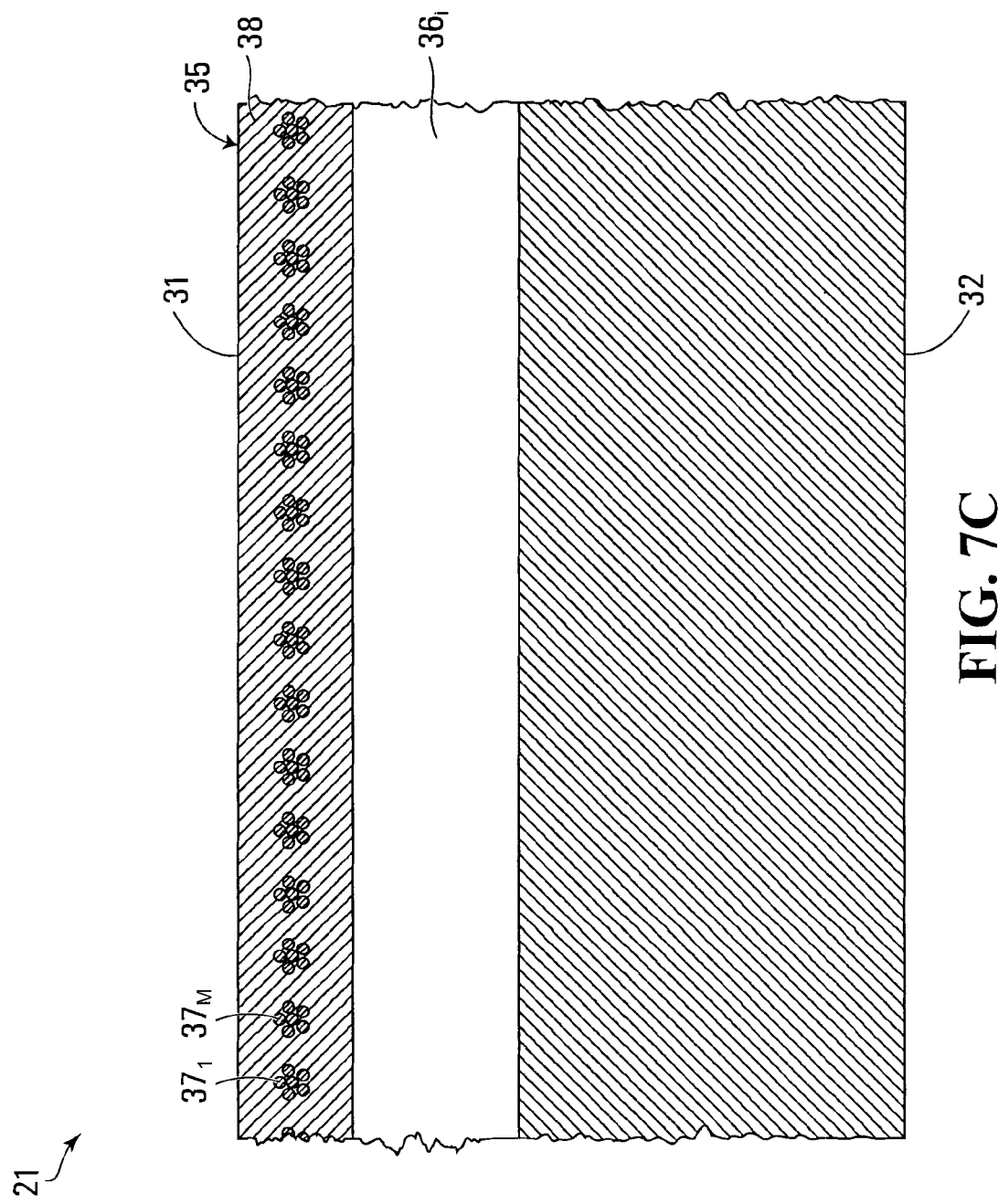

More particularly, in this embodiment, the carcass 35 comprises the reinforcing cables $37_1$-$37_M$ and the transversal stiffening rods $36_1$-$36_N$ embedded in its rubber 38 but is free of any reinforcing fabric layer (i.e., the layer of reinforcing fabric 43 discussed above is omitted). In this case, the reinforcing cables $37_1$-$37_M$ are located between the transversal stiffening rods $36_1$-$36_N$ and the inner surface 32 of the carcass 35 in the thickness direction of the track 21. In other cases, as shown in FIG. 7C, the reinforcing cables $37_1$-$37_M$ may be located between the transversal stiffening rods $36_1$-$36_N$ and the outer surface 31 of the carcass 35 in the thickness direction of the track 21. In such cases, the reinforcing cables $37_1$-$37_M$ may act to protect the transversal stiffening rods $36_1$-$36_N$.

Figure 7D:
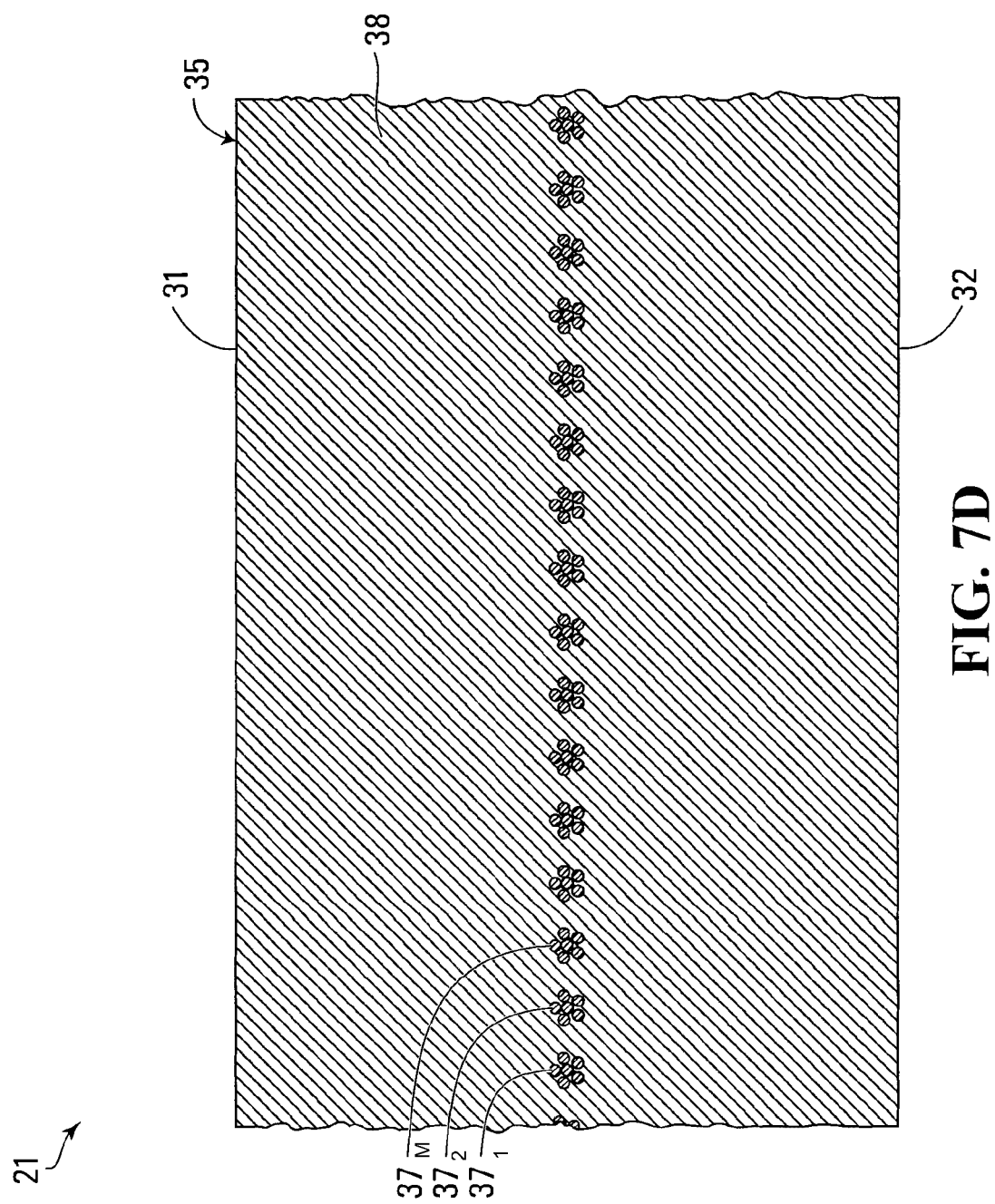

The track 21 free of any reinforcing fabric layer may be configured in various other ways in other embodiments. For example, in some embodiments, the track 21 may also be free of transversal stiffening rods, as shown in FIG. 7D.

In other embodiments, the track 21 may be free of reinforcing fabric between the inner surface 32 and the ground-engaging outer surface 31 of the carcass 35 along part of the length of the track 21 but still include some reinforcing fabric (e.g., between the inner surface 32 and the ground-engaging surface 31 along one or more segments of the length of the track 21, or within one or more of the drive/guide lugs $34_1$-$34_D$ and/or one or more of the traction projections $58_1$-$58_T$).

Elastomeric material of a given portion of the endless track 21, including the elastomeric material 38 of the carcass 35, the elastomeric material 41 of one of the traction projection $58_1$-$58_T$, and the elastomeric material 42 of one of the drive/guide lugs $34_1$-$34_D$, has various material properties, including a hardness (e.g., durometers in a Shore A hardness scale) and a modulus of elasticity, which can have any suitable value.

If the elastomeric material of the given portion of the track 21 is constituted of a single elastomer, the hardness of the elastomeric material of the given portion of the track 21 is the hardness of this single elastomer. Alternatively, if the elastomeric material of the given portion of the track 21 is constituted of two or more different elastomers, the hardness of the elastomeric material of the given portion of the track 21 is taken as an average hardness, which is obtained by multiplying a proportion of each elastomer in the elastomeric material of the given portion of the track 21 by that elastomer's hardness and then summing the results. That is, if the elastomeric material of the given portion of the track 21 is constituted of N elastomers, the average hardness is $$A_{avg} = \sum\nolimits_{i=1}^{N} P_i A_i$$

where $A_i$ is the hardness of elastomer "i" and Pi is the proportion (%) of elastomer "i" in the elastomeric material of the given portion of the track 21. In situations where this calculated value is not an integer and the hardness scale is only in integers, this calculated value rounded to the nearest integer gives the average hardness. An elastomer's hardness can be obtained from a standard ASTM D-2240 test (or equivalent test).

Similarly, if the elastomeric material of the given portion of the track 21 is constituted of a single elastomer, the modulus of elasticity of the elastomeric material of the given portion of the track 21 is the modulus of elasticity of this single elastomer. Alternatively, if the elastomeric material of the given portion of the track 21 is constituted of two or more different elastomers, the modulus of elasticity of the elastomeric material of the given portion of the track 21 is taken as an average modulus of elasticity, which is obtained by multiplying a proportion (%) of each elastomer in the elastomeric material of the given portion of the track 21 by that elastomer's modulus of elasticity and then summing the results. That is, if the elastomeric material of the given portion of the track 21 is constituted of N elastomers, the average modulus of elasticity is $$\lambda_{avg} = \sum\nolimits_{i=1}^{N} P_i A_i$$

where $\lambda_i$ is the modulus of elasticity of elastomer "i" and Pi is the proportion (%) of elastomer "i" in the elastomeric material of the given portion of the track 21. For instance, in an embodiment in which the elastomeric material of the given portion of the track 21 is constituted of two types of rubbers, say rubber "A" having a modulus of elasticity of 1.9 MPa and being present in a proportion of 15% and rubber "B" having a modulus of elasticity of 6.3 MPa and being present in a proportion of 85%, the average modulus of elasticity of the elastomeric material of the given portion of the track 21 is 5.64 MPa. An elastomer's modulus of elasticity can be obtained from a standard ASTM D-412-A test (or equivalent test) based on a measurement at 100% elongation of the elastomer.

Each of the drive wheels 22 is rotatable on an axle of the snowmobile 10 for driving the endless track 21. That is, power generated by the prime mover 15 and delivered over the powertrain 12 of the snowmobile 10 rotates the axle, which rotates the drive wheels 22, which impart motion of the track 21. In this embodiment, each drive wheel 22 comprises a drive sprocket engaging some of the drive/guide lugs $34_1$-$34_D$ of the inner side 25 of the track 21 in order to drive the track 21. In other embodiments, the drive wheel 22 may be configured in various other ways. For example, in embodiments where the track 21 comprises drive holes, the drive wheel 22 may have teeth that enter these holes in order to drive the track 21. As yet another example, in some embodiments, the drive wheel 22 may frictionally engage the inner side 25 of the track 21 in order to frictionally drive the track 21. The drive wheels 22 may be arranged in other configurations and/or the track system 14 may comprise more or less drive wheels (e.g., a single drive wheel, more than two drive wheels, etc.) in other embodiments.

The idler wheels $26_1$-$26_4$, $28_1$-$28_6$, $30_1$, $30_2$ are not driven by power supplied by the prime mover 15, but are rather used to do at least one of guiding the track 21 as it is driven by the drive wheels 22 tensioning the track 21, and supporting part of the weight of the snowmobile 10 on the ground via the track 21. More particularly, in this embodiment, the rear idler wheels $26_1$-$26_4$ are trailing idler wheels that maintain the track 21 in tension, guide the track 21 as it wraps around them, and can help to support part of the weight of the snowmobile 10 on the ground via the track 21. The lower roller wheels $28_1$-$28_6$ roll on the inner side 25 of the track 21 along the bottom run of the track 21 to apply the bottom run on the ground. The upper roller wheels $30_1$, $30_2$ roll on the inner side 25 of the track 21 along the top run 65 of the track 21 to support and guide the top run 65 as the track 21 moves. The idler wheels $26_1$-$26_4$, $28_1$-$28_6$, $30_1$, $30_2$ may be arranged in other configurations and/or the track assembly 14 may comprise more or less idler wheels in other embodiments.

The idler wheels $26_1$-$26_4$, $28_1$-$28_6$, $30_1$, $30_2$ move on respective ones of a plurality of idler wheel paths $50_1$-$50_4$ of the inner surface 32 of the carcass 35 of the endless track 21. Each of the idler wheel paths $50_1$-$50_4$ extends adjacent to respective ones of the drive/guide lugs $34_1$-$34_D$ to allow these lugs to guide motion of the track 21 around the track-engaging assembly 24. As the roller wheels $28_1$-$28_6$, $30_1$, $30_2$ roll on respective ones of the idler wheel paths $50_1$-$50_4$, these paths can be referred to as "rolling paths".

Figure 8:
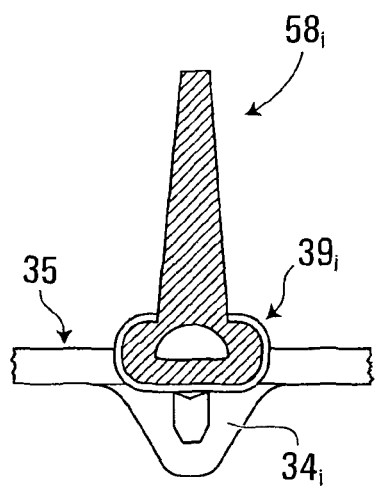
FIGS. 8 and 9 respectively show the track with and without a slide member.
Figure 9:
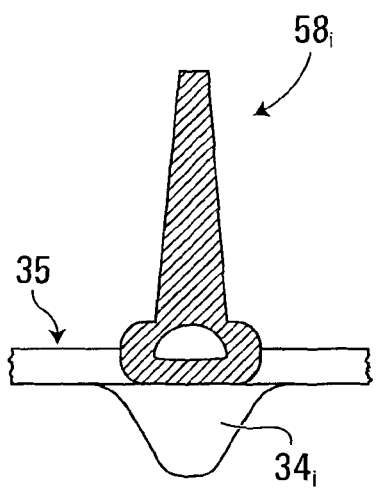

The slide rails $33_1$, $33_2$ slide on the inner side 25 of the endless track 21 along the bottom run of the track 21 to apply the bottom run onto the ground. In this embodiment, the slide rails $33_1$, $33_2$ are curved upwardly in a front region of the track system 14 to guide the track 21 towards the drive wheels 22. In some cases, as shown in FIG. 8, the endless track 21 may comprise slide members that slide against the slide rails $33_1$, $33_2$ to reduce friction. The slide members, which can sometimes be referred to as "clips", may be mounted via holes $40_1$-$40_H$ arranged in two rows extending longitudinally and spaced apart laterally of the track 21. In other cases, as shown in FIG. 9, the endless track 21 may be free of such slide members. The slide rails $33_1$, $33_2$ may be arranged in other configurations and/or the track assembly 14 may comprise more or less slide rails in other embodiments.

Various considerations may be important when it comes to use and performance of the snowmobile 10.

For example, in use, the snowmobile 10 generates noise, including noise generated by the track system 14. Various factors may contribute to the noise generated by the track system 14. For example, in some cases: impacts between the idler wheels $26_1$-$26_4$, $28_1$-$28_6$, $30_1$, $30_2$ and the transversal stiffening rods $36_1$-$36_N$ of the endless track 21; impacts between the slide rails $33_1$, $33_2$ and the transversal stiffening rods $36_1$-$36_N$ of the track 21; impacts between the slide rails $33_1$, $33_2$ and the clips of the track 21, if any; impacts between the traction projections $58_1$-$58_T$ of the track 21 and the ground; and contact between the track 21 and the drive wheels 22 may be contributors to the noise generated by the track system 14.

As another example, traction and floatation provided by the track system 14 depend on rigidity of the endless track 21. While longitudinal flexibility of the track 21 is desirable in order to efficiently drive the track around the track-engaging assembly 24, transversal rigidity of the track 21 is desirable in order to have a proper ground-contacting area for traction and floatation.

The snowmobile 10, including the track system 14, may therefore be configured to have a reduced noise profile so as to generate less noise, enhanced track rigidity characteristics to improve its traction and floatation, and/or other features improving use and performance of the snowmobile 10. This may be achieved in various ways in various embodiments, examples of which will now be discussed.

1. Shape of Transversal Stiffening Rod

In some embodiments, the transversal stiffening rods $36_1$-$36_N$ of the endless track 21 may be shaped in order to reduce noise generation and/or for other purposes (e.g., weight reduction, controlled transversal rigidity, etc.). Various shapes of the transversal stiffening rods $36_1$-$36_N$ can be implemented in various embodiments, examples of which are discussed below.

1.1 Transversal Stiffening Rods Shaped to Increase Thickness of Elastomeric Material In some embodiments, the transversal stiffening rods $36_1$-$36_N$ may be shaped so as to increase a thickness of elastomeric material of the endless track 21 at locations of the rods $36_1$-$36_N$. That is, the transversal stiffening rods $36_1$-$36_N$ may be shaped such that a thickness of elastomeric material where they are located is greater than that which would exist if they were replaced with conventional transversal stiffening rods having a generally semicircular or half-moon-shaped cross-section, such as those shown in FIG. 6, but the track 21 was otherwise identical and had the same transversal rigidity. The greater thickness of elastomeric material can provide enhanced shock absorption, and therefore reduce noise generation, when the idler wheels $26_1$-$26_4$, $28_1$-$28_6$, $30_1$, $30_2$ and the slide rails $33_1$, $33_2$ cross the transversal stiffening rods $36_1$-$36_N$. Also, in some cases, the transversal stiffening rods $36_1$-$36_N$ may have a smaller cross-section than conventional rods and this may make them less rigid and thus less noisy when crossed by the idler wheels $26_1$-$26_4$, $28_1$-$28_6$, $30_1$, $30_2$ and the slide rails $33_1$, $33_2$.

Various shapes of the transversal stiffening rods $36_1$-$36_N$ can be implemented to increase the thickness of elastomeric material in various embodiments, examples of which are discussed below.

1.1.1 Rod Cross-Section being Elongate (i.e., Having a High Aspect Ratio)

Figure 10:
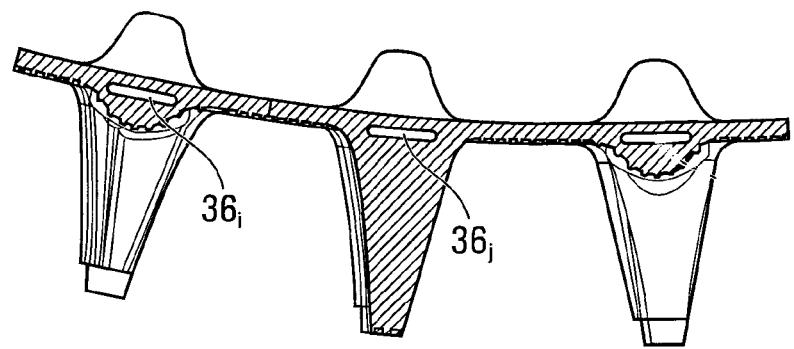
FIGS. 10 to 21 show different shapes of transversal stiffening rods of the track in accordance with various embodiments of the invention.
Figure 11:
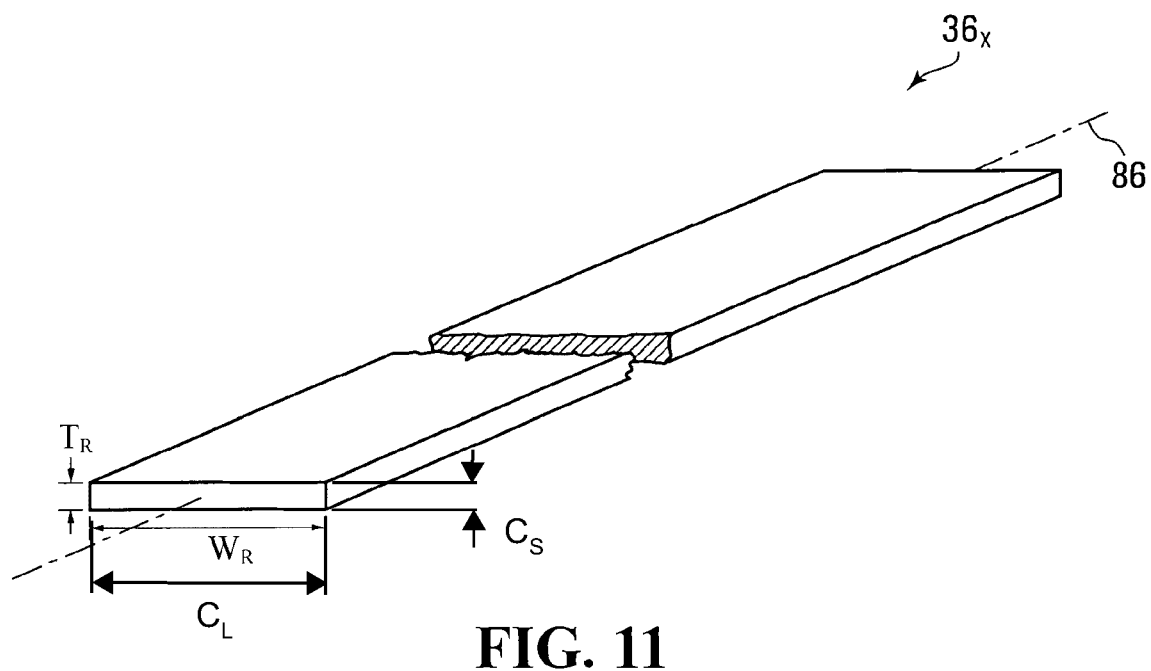

In some embodiments, as shown in FIGS. 10 and 11, a transversal stiffening rod $36_x$ may have a cross-section which is elongate, i.e., has a high aspect ratio $C_L/C_S$. The cross-section of the transversal stiffening rod $36_x$ is taken perpendicularly to a longitudinal axis 86 of the rod $36_x$ and is elongate since a longest dimension $C_L$ of the cross-section is significantly greater than a smallest dimension $C_S$ of the cross-section. In this example, the longest dimension $C_L$ of the cross-section of the transversal stiffening rod $36_x$ is in the longitudinal direction of the endless track 21 and the smallest dimension $C_S$ of the cross-section of the transversal stiffening rod $36_x$ is in the thickness direction of the endless track 21. The cross-section of the transversal stiffening rod $36_x$ is thus elongated in the longitudinal direction of the track 21.

The aspect ratio $C_L/C_S$ of the cross-section of the transversal stiffening rod $36_x$, which is a ratio of the longest dimension $C_L$ of the cross-section to the smallest dimension $C_S$ of the cross-section, can have any suitable value in various embodiments. For example, in some embodiments, the aspect ratio $C_L/C_S$ may be at least 4, in some cases at least 5, in some cases at least 6, in some cases at least 7, in some cases at least 8, in some cases at least 10, and in some cases even more (e.g., 12, 15 or more).

In this embodiment, the cross-section of the transversal stiffening rod $36_x$ is substantially flat. That is, the cross-section of the rod $36_x$ has major surfaces generally parallel to one another and distinctly larger than its minor surfaces.

More particularly, in this embodiment, the cross-section of the transversal stiffening rod $36_x$ is oblong. More specifically, in this embodiment, the cross-section of the transversal stiffening rod $36_x$ has a generally oblong rectangular shape. A width WR of the cross-section of the transversal stiffening rod $36_x$ is in the longitudinal direction of the endless track 21, and corresponds to the longest dimension $C_L$ of the cross-section. A thickness $T_R$ of the cross-section of the transversal stiffening rod $36_x$ is in the thickness direction of the endless track 21, and corresponds to the smallest dimension $C_S$ of the cross-section. In this example, the aspect ratio $W_R/T_R$ is about 8. In view of the generally oblong rectangular shape and thinness of its cross-section, in this example, the transversal stiffening rod $36_x$ is plate-like and similar to a ruler and can be referred to as a "plate-like" or "ruler" rod.

Also, in this embodiment, the cross-section of the transversal stiffening rod $36_x$ is constant (i.e., does not substantially change) along at least a majority of a length of the rod $36_x$. More particularly, in this example, the cross-section of the transversal stiffening rod $36_x$ is constant along an entirety of the length of the rod $36_x$. In other embodiments, the cross-section of the transversal stiffening rod $36_x$ may vary along the longitudinal axis 86 of the rod $36_x$ such that it is different (e.g., larger, smaller, and/or differently shaped) at respective locations along the longitudinal axis 86 of the rod $36_x$.

The cross-section of each of the transversal stiffening rods $36_1$-$36_N$ may have various other shapes such that it is elongate, i.e., its aspect ratio $C_L/C_S$ is high, in other embodiments. For example, in other embodiments, the cross-section of a transversal stiffening rod $36_x$ may be oblong but not rectangular (e.g., it may be oblong with bent, curved or pointy lateral edges).

1.1.2 Thin Rod

Figure 12:
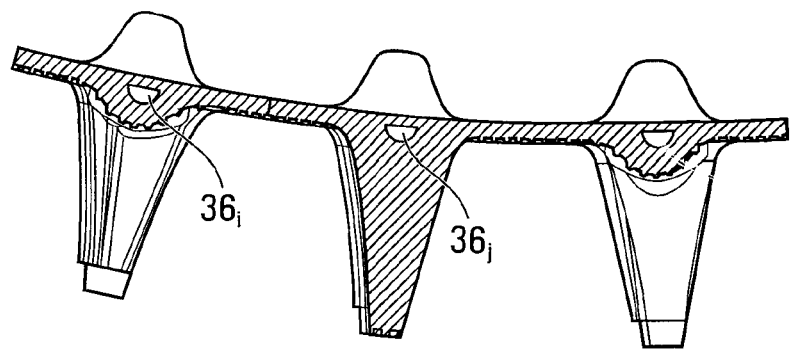
Figure 13:
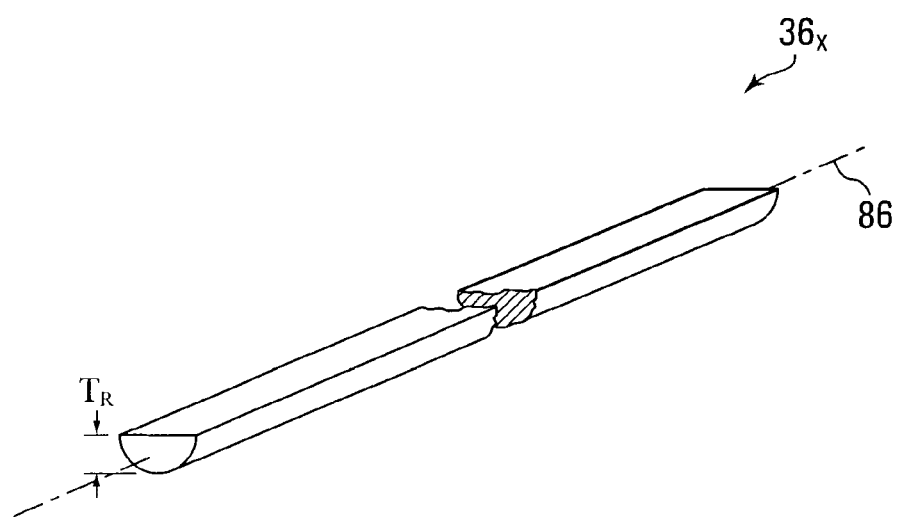

In some embodiments, as shown in FIGS. 12 and 13, a transversal stiffening rod $36_x$ may be "thin", i.e., the thickness $T_R$ of the cross-section of the transversal stiffening rod $36_x$ in the thickness direction of the endless track 21 may be small. In some cases, this can happen with the cross-section of the transversal stiffening rod $36_x$ being elongate, i.e., having a high aspect ratio $C_L/C_S$, as discussed above in section 1.1.1. In other cases, this can happen without the cross-section of the transversal stiffening rod $36_x$ being elongate, i.e., having a high aspect ratio $C_L/C_S$.

The thickness $T_R$ can have any suitable value. For example, in some embodiments, the thickness $T_R$ may be less than 3.5 mm, in some cases no more than 3 mm, in some cases no more than 2.5 mm, in some cases no more than 2 mm, and in some cases even less (e.g., 1.5 mm or less).

The thickness $T_R$ of the cross-section of the transversal stiffening rod $36_x$ can also be expressed relative to the thickness $T_C$ of the carcass 35. For example, in some embodiments, a ratio $T_R/T_C$ of the thickness $T_R$ of the cross-section of the transversal stiffening rod $36_x$ to the thickness $T_C$ of the carcass 35 may be less than 0.7, in some cases no more than 0.6, in some cases no more than 0.5, in some cases no more than 0.4, and in some cases even less (e.g., 0.2 or less).

In this embodiment, the cross-section of the transversal stiffening rod $36_x$ is generally semicircular or half-moon-shaped. The thickness $T_R$ thus generally corresponds to a radius of the cross-section of the transversal stiffening rod $36_x$. Hence, in this embodiment, the transversal stiffening rod $36_x$ is thin but its cross-section does not have a high aspect ratio $C_L/C_S$ as discussed above in section 1.1.1.

The cross-section of each of the transversal stiffening rods $36_1$-$36_N$ may have various other shapes such that its thickness $T_R$ is small in other embodiments. For example, in other embodiments, the cross-section of a transversal stiffening rod $36_x$ may be generally circular, square, oblong rectangular, etc.

1.1.3 Rod Defining an Internal Space

Figure 14:
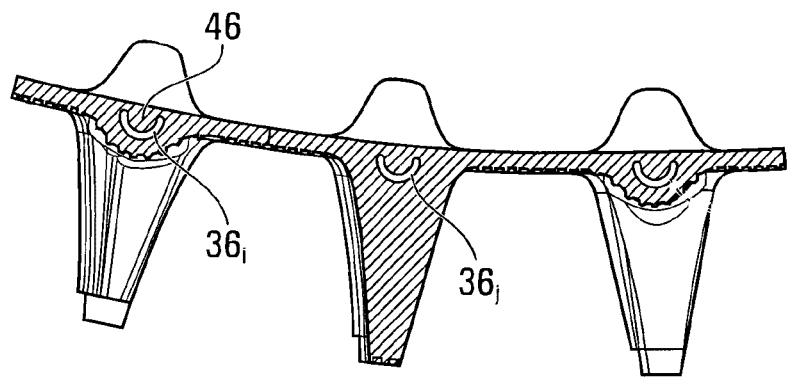
Figure 15:
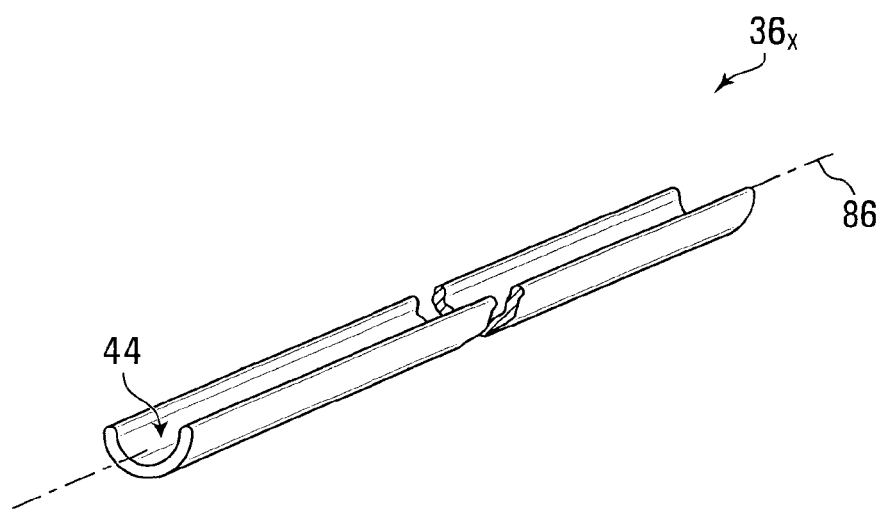

In some embodiments, as shown in FIGS. 14 and 15, a transversal stiffening rod $36_x$ may form a cavity (i.e., an internal space) 44 which, in this example, receives elastomeric material 46. In this embodiment, the cavity 44 is open toward the inner side 25 of the endless track 21 in order to increase a thickness of elastomeric material between the transversal stiffening rod $36_x$ and the inner side 25 of the track 21. The elastomeric material 46, which is a portion of the elastomeric material 38 of the carcass 35, is thus located between the transversal stiffening rod $36_x$ and the inner surface 32 of the carcass 35.

More particularly, in this embodiment, the transversal stiffening rod $36_x$ forms the cavity 44 by having a cross-section that is curved. In this example, the cross-section of the transversal stiffening rod $36_x$ is generally arc-shaped. In addition to the increase in the thickness of elastomeric material, this shape may make the transversal stiffening rod $36_x$ more rigid (e.g., compared to a plate-like rod as discussed above in section 1.1.1).

The cross-section of the transversal stiffening rod $36_x$ may have various other shapes which define the cavity 44 in other embodiments. For instance, in some embodiments, the cross-section of the transversal stiffening rod $36_x$ may have other curvatures, may have straight segments, or may have a combination of straight segments and curved segments to define the cavity 44.

Figure 16:
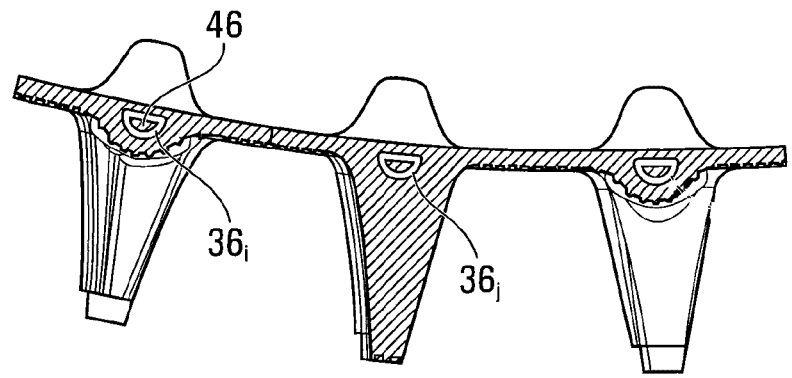
Figure 17:
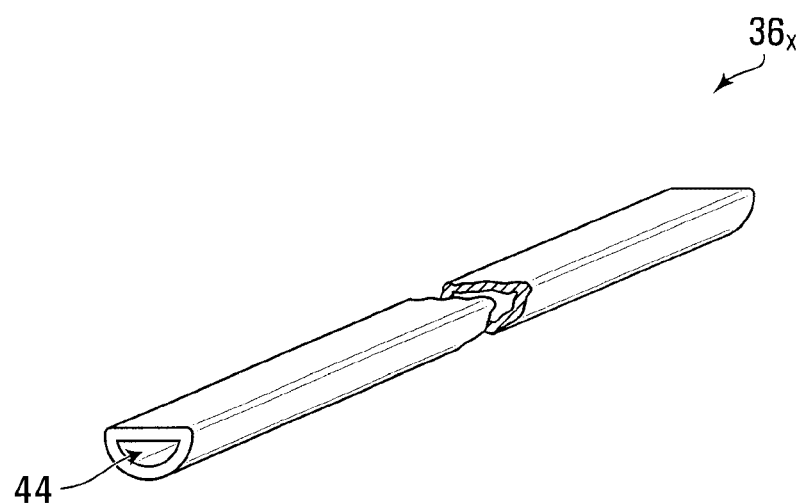

FIGS. 16 and 17 show another embodiment in which the cavity 44 is closed around the cross-section of the transversal stiffening rod $36_x$. Basically, the transversal stiffening rod $36_x$ is hollow and has the elastomeric material 46 in its hollow interior. In this embodiment, the cross-section of the transversal stiffening rod $36_x$ has a generally semicircular outer wall and the cavity 44 is also generally semicircular. The cross-section of the transversal stiffening rod $36_x$ and the cavity 44 may have various other shapes in other embodiments.

The transversal stiffening rod $36_x$ with the cavity 44 may be made using various processes. For example, in some embodiments, the transversal stiffening rod $36_x$ may be extruded using an extrusion process or pultruded using a pultrusion process. The elastomeric material 46 may be provided in the cavity 46 by having some of the elastomeric material 38 of the carcass 35 migrate in the cavity 46 during molding of the track 21 (e.g., in cases where the cavity 44 is open as in FIGS. 14 and 15), or by placing a piece of elastomeric material in the cavity 44 of before molding of the track 21 (e.g., in cases where the cavity 44 is closed as in FIGS. 16 and 17).

As a variant to having elastomeric material 46 in the cavity 44 of a transversal stiffening rod $36_x$, in some embodiments, the cavity 44 may be empty or may contain material (e.g., a fluid) other than elastomeric material. In some cases, this may involve the cavity 44 being closed not only around the cross-section of the transversal stiffening rod $36_x$ but also at both longitudinal ends of the transversal stiffening rod $36_x$.

1.1.4 Rod Including a Recess at Idler Wheel Path

Figure 18:
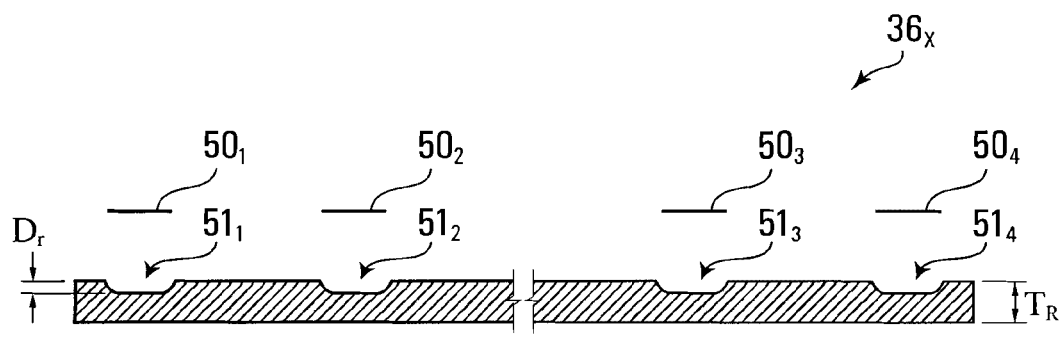

In some embodiments, as shown in FIG. 18, a transversal stiffening rod $36_x$ may comprise a plurality of recesses $51_1$-$51_4$ aligned with respective ones of the idler wheel paths $50_1$-$50_4$. That is, the recesses $51_1$-$51_4$ are located in the widthwise direction of the endless track 21 where the idler wheel paths $50_1$-$50_4$ are located, i.e., each of these recesses overlaps a respective one of the idler wheel paths $50_1$-$50_4$ in the widthwise direction of the track 21. Each recess $51_i$ is defined by an inner surface of the transversal stiffening rod $36_x$ that recedes towards the ground-engaging outer side 27 of the endless track 21. This results in the thickness of elastomeric material between the transversal stiffening rod $36_x$ and the idler wheel path $50_i$ being greater than the thickness of elastomeric material between the transversal stiffening rod $36_x$ and a portion of the inner surface 32 of the carcass 35 outside of the idler wheel paths $50_1$-$50_4$.

The recess $51_i$ has a depth $D_r$ that may have any suitable value in various embodiments. For example, in some embodiments, the depth $D_r$ may be at least 0.03 inches, in some cases at least 0.045 inches, in some cases at least 0.06 inches, and in some cases even more (e.g., up to 0.125 inches).

The depth $D_r$ of the recess $51_i$ can also be expressed relative to the thickness $T_R$ of the transversal stiffening rod $36_x$. For example, in some embodiments, a ratio $D_r/T_R$ of the depth $D_r$ of the recess $51_i$ to the thickness $T_R$ of the transversal stiffening rod $36_x$ may be at least 0.1, in some cases at least 0.15, in some cases at least 0.2, and in some cases even more (e.g., up to 0.8).

In this embodiment, the recess $51_i$ is defined by a dimensional reduction of the cross-section of the transversal stiffening rod $36_x$. In cases where the transversal stiffening rod $36_x$ is molded, the recess $51_1$ may be molded during molding of the transversal stiffening rod $36_x$ or may be cut or otherwise formed after molding of the transversal stiffening rod $36_x$.

Figure 19:
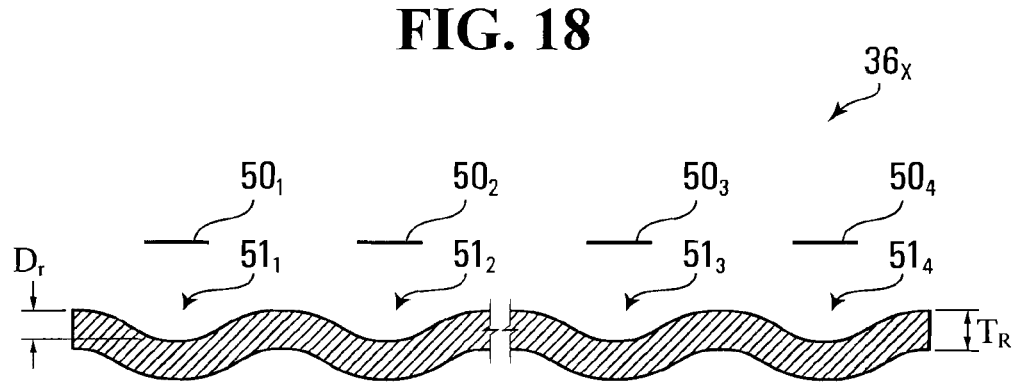

FIG. 19 shows another embodiment in which the recess $51_i$ is defined by a deflection of the transversal stiffening rod $36_x$. More particularly, in this embodiment, the transversal stiffening rod $36_x$ is curved towards the ground-engaging outer side 27 of the track 21 to define the recess $51_1$. The transversal stiffening rod $36_x$ may be deflected in various other manners in other embodiments to define the recess $51_i$ (e.g., have a V-shaped bent). In cases where the transversal stiffening rod $36_x$ is molded, the deflection of the transversal stiffening rod $36_x$ which defines the recess $51_i$ may be created during molding of the transversal stiffening rod $36_x$.

Figure 20A:
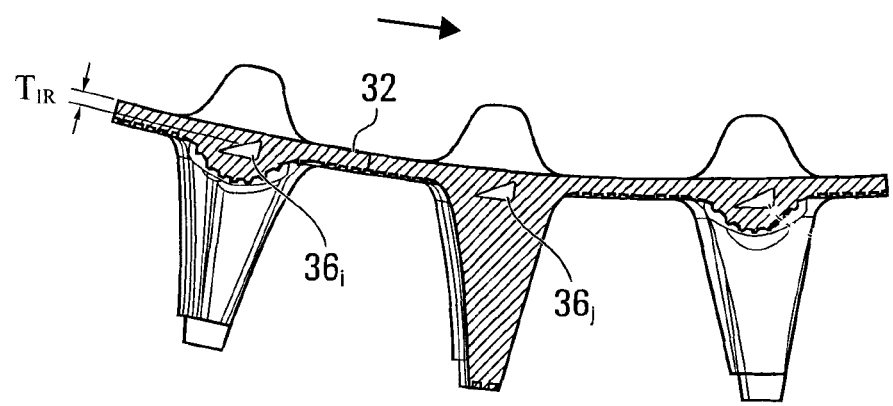
Figure 21:
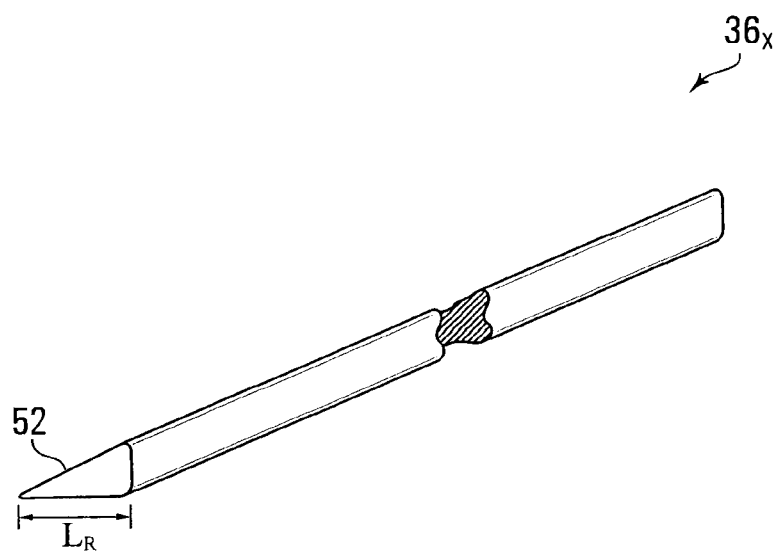

1.1.5 Thickness of Elastomeric Material Between Rod Inner Surface and Carcass Inner Surface Varying Longitudinally In some embodiments, as shown in FIGS. 20A and 21, a transversal stiffening rod $36_x$ may be shaped such that a thickness of elastomeric material $T_{IR}$ between an inner surface 52 of the transversal stiffening rod $36_x$ (i.e., a surface of the transversal stiffening rod $36_x$ facing the inner side 25 of the track 21) and the inner surface 32 of the carcass 35 varies in the longitudinal direction of the track 21.

In this case, the thickness of elastomeric material $T_{IR}$ decreases in the longitudinal direction of the track 21 along a direction of motion of the roller wheels $28_1$-$28_6$, $30_1$, $30_2$ when the snowmobile 10 travels forward. This may help to reduce an intensity of a shock when a given one of the roller wheels $28_1$-$28_6$, $30_1$, $30_2$ arrives at the transversal stiffening rod $36_x$. Basically, a transition of the roller wheel between a relatively soft region of the track 21 before the transversal stiffening rod $36_x$ and a relatively hard region of the track at the transversal stiffening rod $36_x$ is made progressively.

A variation $\Delta T_{IR}$ of the thickness of elastomeric material $T_{IR}$ across a dimension $L_R$ of the cross-section of the transversal stiffening rod $36_x$ in the longitudinal direction of the track 21 may have any suitable value in various embodiments. The variation $\Delta T_{IR}$ can be calculated $\Delta T_{IR}=(T_{IR-max}-T_{IR-min})/T_{IR-min}\times 100\%$, where $T_{IR-max}$ and $T_{IR-min}$ are respectively the maximum and minimum values of the thickness of elastomeric material $T_{IR}$ across the dimension $L_R$ of the cross-section of the transversal stiffening rod $36_x$. For example, in some embodiments, the variation $\Delta T_{IR}$ may be at least 10%, in some cases at least 30%, in some cases at least 50%, and in some cases even more (e.g., up to 100%).

In this embodiment, the cross-section of the transversal stiffening rod $36_x$ has a wedge-like shape such that the thickness of elastomeric material $T_{IR}$ progressively decreases across its dimension $L_R$.

Figure 20B:
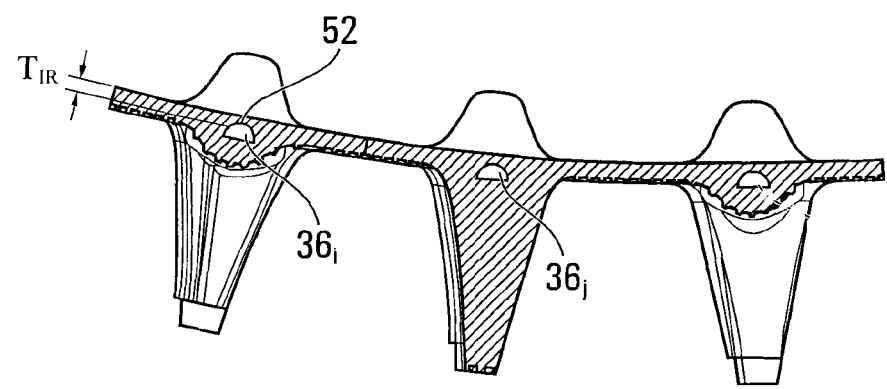

FIG. 20B shows another embodiment in which the inner surface 52 of a transversal stiffening rod $36_x$ is uneven such that the thickness of elastomeric material $T_{IR}$ between the inner surface 52 of the transversal stiffening rod $36_x$ and the inner surface 32 of the carcass 35 varies in the longitudinal direction of the track 21. In this embodiment, the inner surface 52 of the transversal stiffening rod $36_x$ is curved. More particularly, in this example, the cross-section of the transversal stiffening rod $36_x$ is generally semicircular or half-moon-shaped with the inner surface 52 being arched.

The cross-section of the transversal stiffening rod $36_x$ may have various other shapes to create the variation $\Delta T_{IR}$ of the thickness of elastomeric material $T_{IR}$ in other embodiments.

1.2 Short Rods

Figure 36:
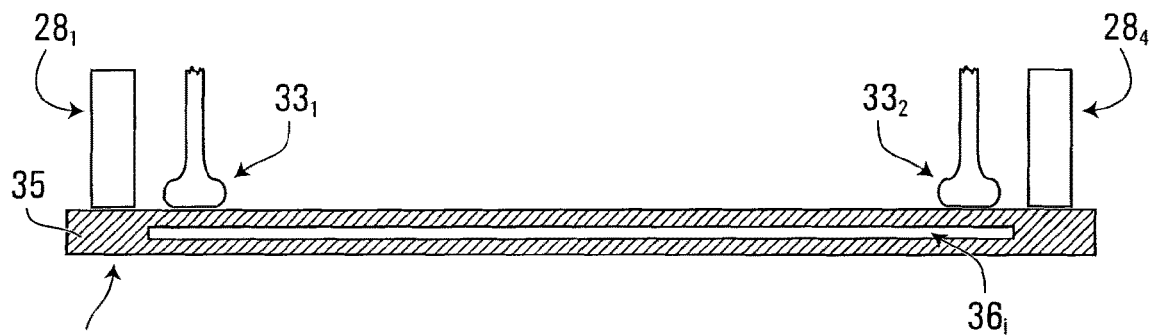
FIGS. 36 and 37 show different lengths of transversal stiffening rods of the track in accordance with various embodiments of the invention.

In some embodiments, as shown in FIG. 36, a transversal stiffening rod $36_x$ may be a "short" rod that does not extend across all the width of the endless track 21 such that it does not extend beneath laterally-outmost track-contacting devices of the track-engaging assembly 24, i.e., laterally-outmost ones of the idler wheels $26_1$-$26_4$, $28_1$-$28_6$, $30_1$, $30_2$ (i.e., those idler wheels which are closest to lateral edges of the track 21) and/or the slide rails $33_1$, $33_2$. This may avoid impacts that would otherwise occur between the transversal stiffening rod $36_x$ and these wheels and/or slide rails and may therefore reduce noise generation.

A ratio of the length of the transversal stiffening rod $36_x$ to the width of the track 21 may have any suitable value. For example, in some embodiments, the ratio of the length of the transversal stiffening rod $36_x$ to the width of the track 21 may be no more than 90%, in some cases no more than 85%, in some cases no more than 80%, and in some cases even less (e.g., no more than 50%).

Figure 37:
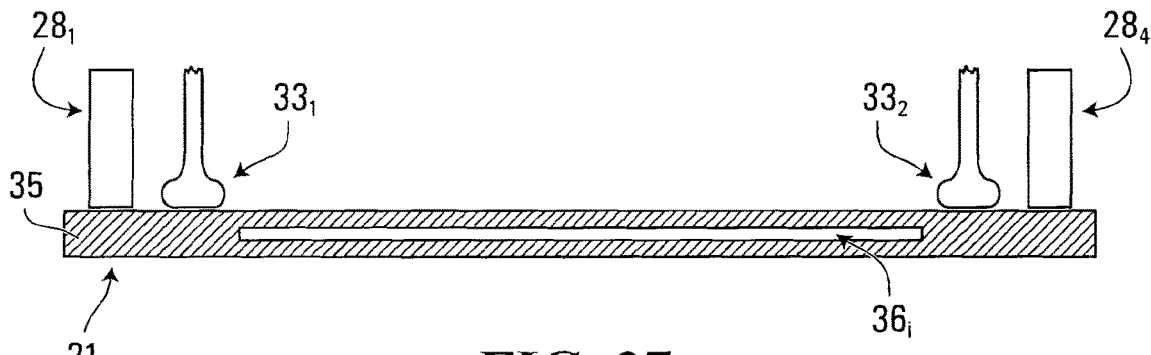

In this embodiment, the transversal stiffening rod $36_x$ extends beneath the slide rails $33_1$, $33_2$ but does not extend beneath the idler wheels $26_1$, $26_4$, $28_1$, $28_2$, $28_4$, $28_5$ which are laterally outmost (only the idler wheels $28_1$, $28_4$ are shown here). In other embodiments, the transversal stiffening rod $36_x$ may be shorter. For instance, FIG. 37 shows an embodiment in which the transversal stiffening rod $36_x$ does not extend beneath the slide rails $33_1$, $33_2$ or the idler wheels $26_1$, $26_4$, $28_1$, $28_2$, $28_4$, $28_5$ which are laterally outmost.

2. Distribution of Transversal Stiffening Rods

In some embodiments, a distribution of the transversal stiffening rods $36_1$-$36_N$ within the endless track 21 may help to reduce noise generation and/or provide other benefits (e.g., controlled transversal rigidity, etc.). Various distributions of the transversal stiffening rods $36_1$-$36_N$ can be implemented in various embodiments, examples of which are discussed below.

2.1 Rods Stacked in Thickness Direction of Track

Figure 22A:
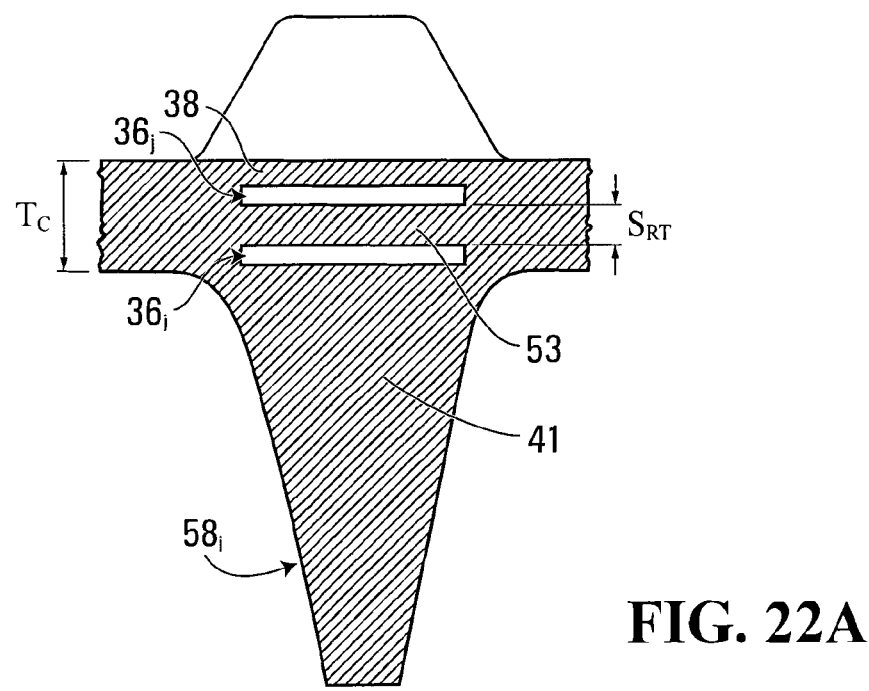
FIGS. 22A to 25 show different arrangements of transversal stiffening rods of the track in accordance with various embodiments of the invention.

In some embodiments, as shown in FIG. 22A, two or more of the transversal stiffening rods $36_1$-$36_N$ may be stacked in the thickness direction of the endless track 21 with deformable material 53 in between. That is, two or more of the transversal stiffening rods $36_1$-$36_N$ may be spaced apart in the track's thickness direction with deformable material 53 in between them. This provides enhanced transversal rigidity but also, by virtue of the deformable material 53, shock absorption, which may help to reduce noise generation.

In this embodiment, a first transversal stiffening rod $36_i$ and a second transversal stiffening rod $36_j$ are spaced apart in the thickness direction of the track 21 and the deformable material 53 between them comprises elastomeric material. In this example of implementation, the elastomeric material 53 is rubber. The elastomeric material 53 may be another elastomer in other examples of implementation.

In some cases, the rubber 53 between the transversal stiffening rods $36_i$, $36_j$ may have the same elasticity and/or the same hardness as other elastomeric material of the endless track 21 (e.g., a portion of the elastomeric material 38 of the carcass 35 above the transversal stiffening rod $36_j$ or a portion of the elastomeric material 41 of the traction projection $58_i$ below the transversal stiffening rod $36_i$).

In other cases, the rubber 53 between the transversal stiffening rods $36_i$, $36_j$ may be more elastic, i.e., have a lower modulus of elasticity, and/or less hard, i.e., a lower hardness, than other elastomeric material of the endless track 21 (e.g., a portion of the elastomeric material 38 of the carcass 35 above the transversal stiffening rod $36_j$ or a portion of the elastomeric material 41 of the traction projection $58_i$ below the transversal stiffening rod $36_i$). This may help in terms of shock absorption. For example, in some embodiments, a ratio of the modulus of elasticity of the rubber 53 between the transversal stiffening rods $36_i$, $36_j$ and the modulus of elasticity of a portion of the elastomeric material 38 of the carcass 35 above the transversal stiffening rod $36_j$ or a portion of the elastomeric material 41 of the traction projection $58_i$ below the transversal stiffening rod $36_i$ may be no more than 0.9, in some cases no more than 0.8, in some cases no more than 0.7, and in some cases even less (e.g., no more than 0.5); and/or a ratio of the hardness of the rubber 53 between the transversal stiffening rods $36_i$, $36_j$ and the hardness of a portion of the elastomeric material 38 of the carcass 35 above the transversal stiffening rod $36_j$ or a portion of the elastomeric material 41 of the traction projection $58_i$ below the transversal stiffening rod $36_i$ may be no more than 0.9, in some cases no more than 0.8, in some cases no more than 0.7, and in some cases even less (e.g., no more than 0.5).

In other cases, the rubber 53 between the transversal stiffening rods $36_i$, $36_j$ may be more rigid, i.e., have a higher modulus of elasticity, and/or harder, i.e., a higher hardness, than other elastomeric material of the endless track 21 (e.g., a portion of the elastomeric material 38 of the carcass 35 above the transversal stiffening rod $36_j$ or a portion of the elastomeric material 41 of the traction projection $58_i$ below the transversal stiffening rod $36_i$). This may help in terms of transverse rigidity. For example, in some embodiments, a ratio of the modulus of elasticity of the rubber 53 between the transversal stiffening rods $36_i$, $36_j$ and the modulus of elasticity of a portion of the elastomeric material 38 of the carcass 35 above the transversal stiffening rod $36_j$ or a portion of the elastomeric material 41 of the traction projection $58_i$ below the transversal stiffening rod $36_i$ may be at least 1.1, in some cases at least 1.2, in some cases at least 1.3, and in some cases even more (e.g., at least 1.5); and/or a ratio of the hardness of the rubber 53 between the transversal stiffening rods $36_i$, $36_j$ and the hardness of a portion of the elastomeric material 38 of the carcass 35 above the transversal stiffening rod $36_j$ or a portion of the elastomeric material 41 of the traction projection $58_i$ below the transversal stiffening rod $36_i$ may be at least 1.1, in some cases at least 1.2, in some cases at least 1.3, and in some cases even more (e.g., at least 1.5).

A spacing $S_{RT}$ of the transversal stiffening rods $36_i$, $36_j$ in the thickness direction of the track 21 may have any suitable value. In this case, the spacing $S_{RT}$ corresponds to a thickness of the rubber 53. For example, in some embodiments, the spacing $S_{RT}$ may be at least 0.030 inches, in some cases at least 0.060 inches, in some cases at least 0.125 inches, and in some cases even more.

The spacing $S_{RT}$ of the transversal stiffening rods $36_i$, $36_j$ in the thickness direction of the track 21 can also be expressed relative to the thickness $T_C$ of the carcass 35. For example, in some embodiments, a ratio $S_{RT}/T_C$ of the spacing $S_{RT}$ of the transversal stiffening rods $36_i$, $36_j$ to the thickness $T_C$ of the carcass 35 may be at least 0.15, in some cases at least 0.30, in some cases at least 0.60, and in some cases even more.

The deformable material 53 can be positioned between the transversal stiffening rods $36_i$, $36_j$ during manufacturing of the endless track 21 in various ways. For example, in embodiments in which the endless track 21 is molded in a mold by placing different layers of material in the mold, the deformable material 53 may be positioned over the transversal stiffening rod $36_i$ in the mold before placing the transversal stiffening rod $36_j$ in the mold, or vice versa.

In this embodiment, each of the transversal stiffening rods $36_i$, $36_j$ has a cross-section with a high aspect ratio and a generally rectangular shape, i.e., it is a plate-like or "ruler" rod, as discussed above in section 1.1.1. The transversal stiffening rods $36_i$, $36_j$ may have any other suitable shapes in other embodiments. Also, in some embodiments, the transversal stiffening rods $36_i$, $36_j$ may have a common shape, while in other embodiments, they may have different shapes.

Although in this embodiment the deformable material 53 between the transversal stiffening rods $36_i$, $36_j$ comprises elastomeric material, in other embodiments, the deformable material 53 may comprise any other deformable substance. For example, in some embodiments, the deformable material 53 may comprise a gel, a fluid (e.g., a pouch or other container containing a liquid or gas), or another substance that can deform under load.

Figure 22B:
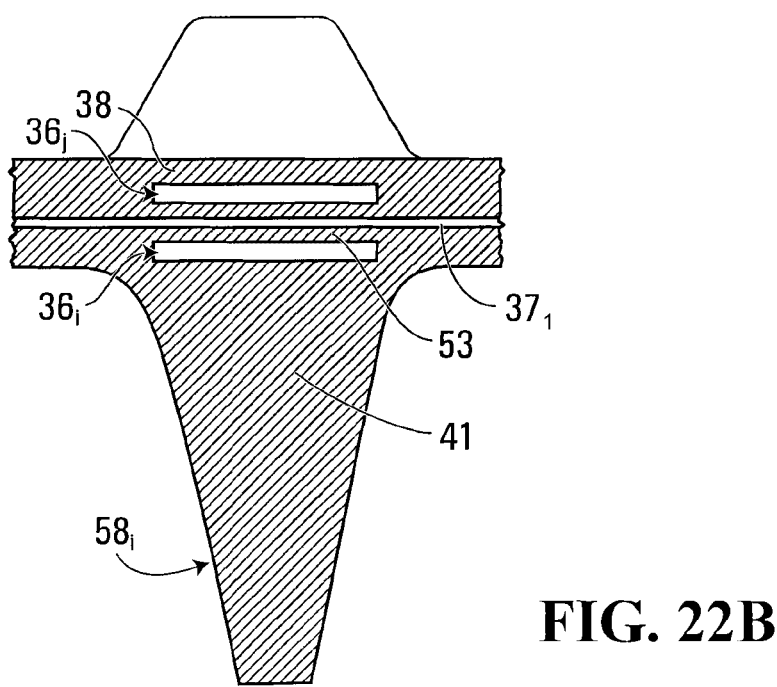
Figure 22C:
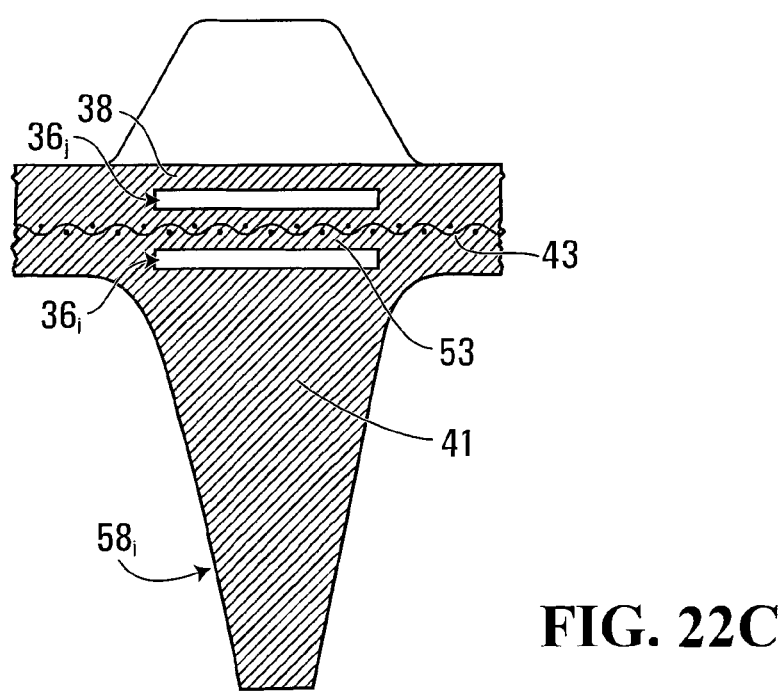

Also, in some embodiments, one or more of the reinforcing cables $37_1$-$37_M$ and/or a layer of reinforcing fabric 43 of the track 21 may extend between the transversal stiffening rods $36_i$, $36_j$ stacked over one another. For example, FIG. 22B shows an embodiment in which a reinforcing cable $37_i$ extends between the transversal stiffening rods $36_i$, $36_j$, while FIG. 22C shows an embodiment in which a layer of reinforcing fabric 43 extends between the transversal stiffening rods $36_i$, $36_j$.

While in this embodiment there are two transversal stiffening rods $36_i$, $36_j$ stacked over one another, in other embodiments, there may be three or more of the transversal stiffening rods $36_1$-$36_N$ that are stacked in the thickness direction of the track 21 with deformable material 53 between adjacent ones of these three or more transversal stiffening rods.

2.2 Rods Located Between Longitudinally-Adjacent Traction Projections

Figure 23A:
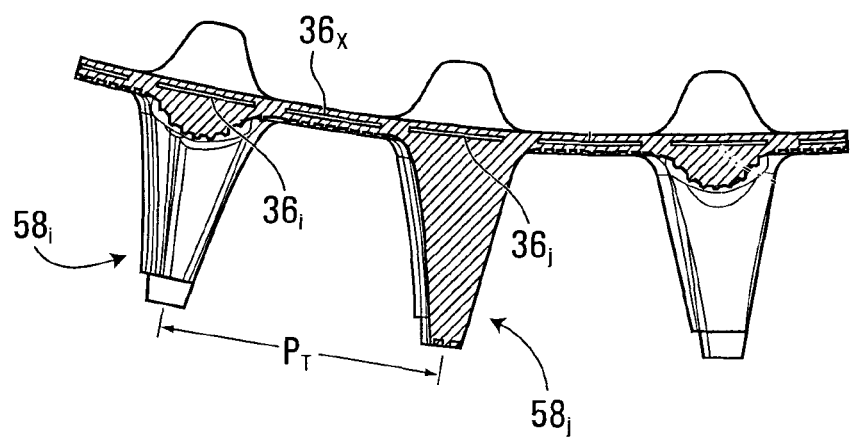

In some embodiments, as shown in FIG. 23A, in addition to given ones of the transversal stiffening rods $36_1$-$36_N$ being aligned with respective ones of the traction projections $58_1$-$58_T$ in the longitudinal direction of the track 21 (i.e., being located, in the longitudinal direction of the track 21, where respective ones of the traction projections $58_1$-$58_T$ are located such that a stiffening rod overlaps a traction projection in the longitudinal direction of the track 21), other ones of the transversal stiffening rods $36_1$-$36_N$ may be located, in the longitudinal direction of the track 21, between adjacent ones of the traction projections $58_1$-$58_T$. This may provide enhanced transversal rigidity while not being detrimental in terms of noise generation. For example, in some cases, the idler wheels $28_1$-$28_6$, $30_1$, $30_2$ spending more time on relatively rigid parts of the track 21 as they move along respective ones of the rolling paths $50_1$-$50_4$ of the inner surface 32 of the carcass 35 may help to reduce noise generation. In other cases, the transversal stiffening rods $36_1$-$36_N$ may be shaped such that noise generated is not greater than if there were rods only where the traction projections $58_1$-$58_T$ are located.

More particularly, in this embodiment, a transversal stiffening rod $36_x$ is located longitudinally between a first traction projection $58_i$ and a second traction projection $58_j$ that are adjacent to one another in the longitudinal direction of the track 21. The transversal stiffening rod $36_x$ is also located longitudinally between a first transversal stiffening rod $36_i$ and a second transversal stiffening rod $36_j$ which are respectively located, in the longitudinal direction of the track 21, where the traction projections $58_i$, $58_j$ are located. A distance PT between the traction projections $58_i$, $58_j$ along the longitudinal direction of the track 21 is referred to as a "pitch". In view of its longitudinal position, the transversal stiffening rod $36_x$ may be referred to as an "inter-traction-projection" rod or an "interpitch" rod.

In this example, the transversal stiffening rod $36_x$ is located midway between the traction projections $58_i$, $58_j$. In other examples, the transversal stiffening rod $36_x$ may be located closer to a given one of the traction projections $58_i$, $58_j$ than the other.

In this embodiment, each of the transversal stiffening rods $36_x$, $36_i$, $36_j$ has a cross-section with a high aspect ratio and a generally rectangular shape, i.e., it is a plate-like or "ruler" rod, as discussed above in section 1.1.1. The longitudinal extent of each of the transversal stiffening rods $36_x$, $36_i$, $36_j$ results in the roller wheels $28_1$-$28_6$, $30_1$, $30_2$ spending even more time on relatively rigid parts of the track 21 as they move along respective ones of the rolling paths $50_1$-$50_4$ of the inner surface 32 of the carcass 35. Also, the thinness of the transversal stiffening rod $36_x$ allows it to be entirely embedded in the carcass 35 between the traction projections $58_i$, $58_j$.

Figure 23B:
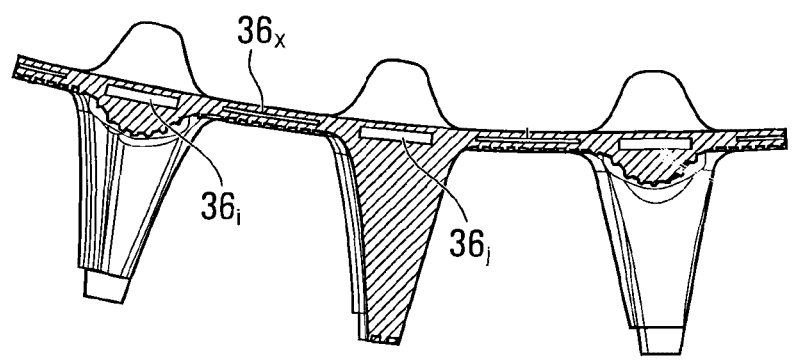

Each of the transversal stiffening rods $36_x$, $36_i$, $36_j$ may have any other suitable shape in other embodiments. Also, different ones of the transversal stiffening rods $36_x$, $36_i$, $36_j$ may have different shapes in other embodiments. For example, in some embodiments, the transversal stiffening rods $36_i$, $36_j$ may have a common shape while the transversal stiffening rod $36_x$ may have a different shape. For instance, FIG. 23B shows an embodiment in which the transversal stiffening rods $36_i$, $36_j$ are thicker and thus more rigid than the transversal stiffening rod $36_x$ since there is more rubber where they are located.

Figure 24:
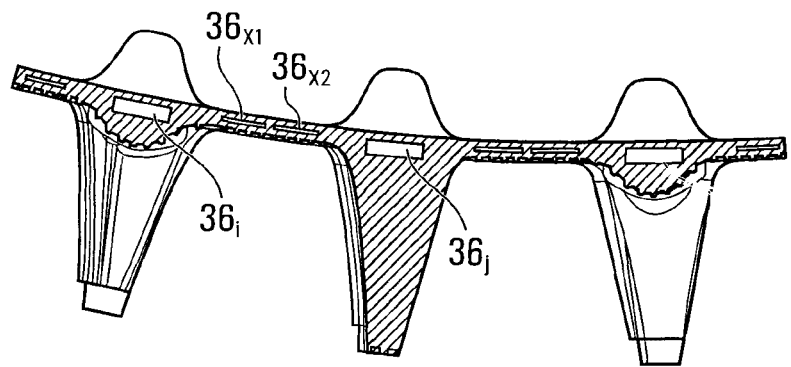

Although in this embodiment there is a single inter-traction-projection rod $36_x$ between the adjacent traction projections $58_i$, $58_j$, in other embodiments, there may be two or more inter-traction-projection rods between the traction projections $58_i$, $58_j$. For instance, FIG. 24 shows an embodiment in which there are two inter-traction-projection rods $36_{x1}$, $36_{x2}$ between the traction projections $58_i$, $58_j$.

2.3 Longitudinally-Adjacent Rods have at Least One Different Characteristic

Figure 25:
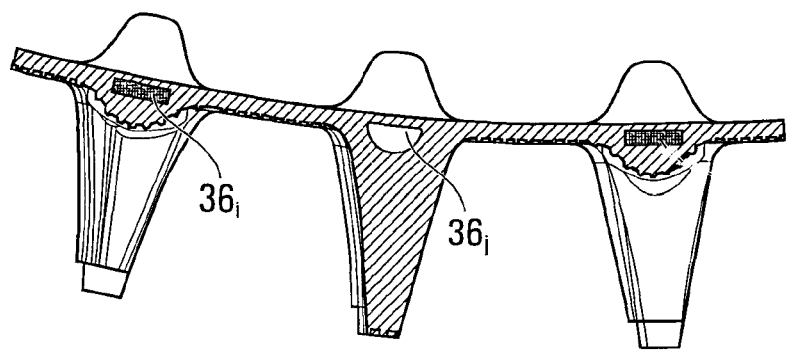

In some embodiments, as shown in FIG. 25, longitudinally-adjacent ones of the transversal stiffening rods $36_1$-$36_N$ may be different from one another, i.e., may have at least one characteristic, such as shape or material, that is different. This may help to reduce noise generation by creating a sound spectrum which is different from that which would result if all the transversal stiffening rods $36_1$-$36_N$ were identical.

In this embodiment, a first transversal stiffening rod $36_i$ and a second transversal stiffening rod $36_j$ which are adjacent to one another in the longitudinal direction of the endless track 21 have different shapes. In this example, the transversal stiffening rod $36_i$ has a generally rectangular cross-section (as discussed above in section 1.1.1), while the transversal stiffening rod $36_j$ has a generally semicircular cross-section. The transversal stiffening rods $36_i$, $36_j$ may have any other suitable shapes that are different from one another in other examples (e.g., the transversal stiffening rods $36_i$, $36_j$ and the transversal stiffening rod $36_x$ discussed in connection with FIG. 23B).

Also, in this embodiment, the transversal stiffening rods $36_i$, $36_j$ comprise different materials. For example, in this case, the transversal stiffening rod $36_i$ may be made of material which is more rigid than material from which is made the transversal stiffening rod $36_j$, given its smaller cross-sectional size.

While in this embodiment the transversal stiffening rods $36_i$, $36_j$ differ both in shape and material, in other embodiments, the transversal stiffening rods $36_i$, $36_j$ may differ only in shape or only in material.

Also, although in this embodiment, only two adjacent transversal stiffening rods $36_i$, $36_j$ have been considered, in some embodiments, three or more of the stiffening rods $36_1$-$36_N$ which succeed one another in the longitudinal direction of the track 21 may be different from one another (e.g., have three or more different shapes and/or comprise three of more different materials).

3. Material of Transversal Stiffening Rod

In some embodiments, a transversal stiffening rod $36_x$ may be made of material which may help to reduce noise generation and/or provide other benefits (e.g., controlled transversal rigidity, etc.). For example, in some embodiments, the material of the transversal stiffening rod $36_x$ may be selected so as to provide transversal rigidity yet reduce the difference in thickness-wise hardness or rigidity between a region of the endless track 21 where the transversal stiffening rod $36_x$ is located and adjacent regions of the endless track 21 where there are no transversal stiffening rods. This may help to reduce an intensity of a shock when a given one of the roller wheels $28_1$-$28_6$, $30_1$, $30_2$ arrives at the transversal stiffening rod $36_x$.

3.1 Reinforced Elastomeric Rod

Figure 26:
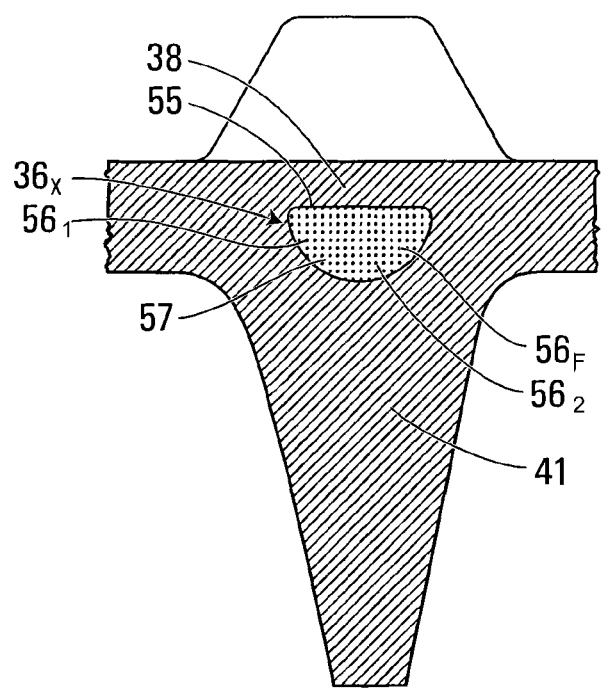
FIG. 26 shows a reinforced elastomeric transversal stiffening rod in accordance with an embodiment of the invention.

In some embodiments, as shown in FIG. 26, a transversal stiffening rod $36_x$ may be an elastomeric fiber-reinforced rod which comprises an elongated elastomeric body 55 in which are embedded fibers $56_1$-$56_F$ (which indicates any number of embedded fibers, $56_1$, $56_2$ . . . to $56_F$). The fibers $56_1$-$56_F$ generally extend transversally to the longitudinal direction of the track 21 to provide transversal rigidity to the transversal stiffening rod $36_x$.

The elongated elastomeric body 55 is elastomeric in that it comprises elastomeric material 57. The elastomeric material 57 can be any polymeric material with suitable elasticity. More particularly, in this embodiment, the elastomeric material 57 includes rubber. Various rubber compounds may be used and, in some cases, different rubber compounds may be present in different areas of each of the elongated elastomeric body 55. In other embodiments, the elastomeric material 57 may include another elastomer in addition to or instead of rubber (e.g., polyurethane elastomer).

In some cases, the rubber 57 of the transversal stiffening rod $36_x$ may be more rigid and/or harder than the elastomeric material 38 or 41 of the track 21 in contiguous regions of the track 21 where there is no transversal stiffening rod. For example, in some embodiments, the rubber 57 of the transversal stiffening rod $36_x$ may be less elastic, i.e., have a higher modulus of elasticity, and/or harder, i.e., have a higher hardness, than the elastomeric material 38 or 41 of the track 21 in contiguous regions of the track 21 where is there is no transversal stiffening rod.

In other cases, the rubber 57 of the transversal stiffening rod $36_x$ may be less rigid and/or less hard than the elastomeric material 38 or 41 of the track 21 in contiguous regions of the track 21 where there is no transversal stiffening rod. For example, in some embodiments, the rubber 57 of the transversal stiffening rod $36_x$ may be more elastic, i.e., have a lower modulus of elasticity, and/or less hard, i.e., have a lower hardness, than the elastomeric material 38 or 41 of the track 21 in contiguous regions of the track 21 where is there is no transversal stiffening rod.

For example, in some embodiments, a ratio of the modulus of elasticity of the rubber 57 of the transversal stiffening rod $36_x$ to the modulus of elasticity of the elastomeric material 38 or 41 of the track 21 in contiguous regions of the track 21 where is there is no transversal stiffening rod may be at least 0.75, in some cases at least 1, and in some cases at least 1.1, and in some cases even more. Alternatively or additionally, in some embodiments, a ratio of the hardness of the rubber 57 of the transversal stiffening rod $36_x$ to the hardness of the elastomeric material 38 or 41 of the track 21 in contiguous regions of the track 21 where is there is no transversal stiffening rod may be at least 0.75, in some cases at least 1, in some cases at least 1.1, and in some cases even more.

For instance, in some embodiments, the hardness of the rubber 57 of the transversal stiffening rod $36_x$ may at least 60 durometers A, in some cases at least 80 durometers A, in some cases at least 90 durometers A, and in some cases even more. The hardness of the rubber 57 of the transversal stiffening rod $36_x$ may have any other suitable value in other embodiments.

The fibers $56_1$-$56_F$ may be implemented in various manners. In this embodiment, each of the fibers $56_1$-$56_F$ extends along at least a majority of a length of the transversal stiffening rod $36_x$. More particularly, in this case, each of the fibers $56_1$-$56_F$ extends along all of the length of the transversal stiffening rod $36_x$. In other embodiments, each of the fibers $56_1$-$56_F$ may be shorter. For example, in other embodiments, the fibers $56_1$-$56_F$ may be "chopped" or otherwise cut fibers which are few millimeters or centimeters long and are distributed throughout the transversal stiffening rod $36_x$.

In this embodiment, the fibers $56_1$-$56_F$ are polymeric fibers. More specifically, in this example, the fibers $56_1$-$56_F$ are aramid fibers. Various other types of polymeric fibers may be used in other examples (e.g., polyvinyl alcohol (PVA) fibers). Also, in other embodiments, the fibers $56_1$-$56_F$ may be any other suitable type of fibers (e.g., metallic fibers, carbon fibers, glass fibers, etc.).

The transversal stiffening rod $36_x$ may be manufactured using various techniques. For example, in some embodiments, the transversal stiffening rod $36_x$ may be manufactured using an extrusion process or a pultrusion process in which the fibers $56_1$-$56_F$ are incorporated during extrusion or pultrusion of the elongated elastomeric body 55 of the rod. In other embodiments, the elongated elastomeric body 55 of the rod may be molded with the fibers $56_1$-$56_F$ inside a mold. For instance, two or more strips or other suitably-sized pieces of rubber reinforced with the fibers $56_1$-$56_F$ having a width generally corresponding to that of the transversal stiffening rod $36_x$ may be cut from calendared fiber-reinforced rubber and layered on top of one another such that, during molding, they form the transversal stiffening rod $36_x$.

3.2 Rod Made of Composite Material

In some embodiments, a transversal stiffening rod $36_x$ may be made of composite material. For instance, in some embodiments, a transversal stiffening rod $36_x$ may be made of a carbon fiber reinforced plastic material.

4. Zones with Different Elastomeric Material Properties

In some embodiments, elastomeric material of certain zones of the endless track 21 may have different hardness and/or different elasticity in order to reduce noise generation and/or provide other benefits (e.g., controlled rigidity). Various zones with different hardness and/or elasticity can be implemented in various embodiments, examples of which are discussed below.

Figure 27:
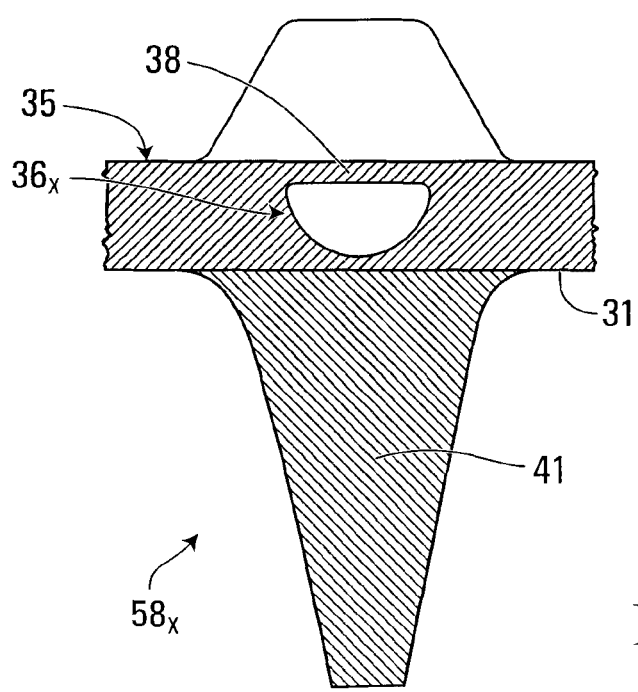
FIGS. 27 to 31 show zones of the track with different properties in accordance with various embodiments of the invention.

4.1 Hardness and/or Modulus of Elasticity of Elastomeric Material of Ground-Engaging Outer Side is Lower than Hardness and/or Modulus of Elasticity of Elastomeric Material of Carcass In some embodiments, as shown in FIG. 27, the hardness and/or the modulus of elasticity of elastomeric material of the ground-engaging outer side 27 of the endless track 21 may be lower than the hardness and/or the modulus of elasticity of the elastomeric material 38 of the carcass 35 of the track 21. This may help to reduce noise generated.

More particularly, in this embodiment, the hardness and/or the modulus of elasticity of the rubber 41 of a traction projection $58_x$ is lower than the hardness and/or the modulus of elasticity of the rubber 38 of the carcass 35. For example, in some embodiments, a ratio of the hardness of the rubber 41 of the traction projection $58_x$ to the hardness of the rubber 38 of the carcass 35 may be no more than 0.9, in some cases no more than 0.8, and in some cases no more than 0.7. The hardness of the rubber 41 of the traction projection $58_x$ may have any other suitable value in other embodiments.

In embodiments where the rubber 38 of the carcass 35 is constituted of a single rubber compound, the hardness of the rubber 38 is that of the single rubber compound. In embodiments where the rubber 38 of the carcass 35 is constituted of two or more rubber compounds, the hardness of the rubber 38 is the average hardness determined based on the hardness of each of these constituent rubber compounds and their proportions (as discussed previously).

In some cases, in embodiments where the rubber 38 of the carcass 35 is constituted of two or more rubber compounds, the hardness of the rubber 41 of the traction projection $58_x$ may be lower than the hardness of an outer layer of the rubber 38 of the carcass 35 which forms the ground-engaging outer surface 31 of the carcass 35.

As another example, in some embodiments, a ratio of the modulus of elasticity of the rubber 41 of the traction projection $58_x$ to the modulus of elasticity of the rubber 38 of the carcass 35 may be no more than 0.9, in some cases no more than 0.8, and in some cases no more than 0.7. The modulus of elasticity of the rubber 41 of the traction projection $58_x$ may have any other suitable value in other embodiments.

In embodiments where the rubber 38 of the carcass 35 is constituted of a single rubber compound, the modulus of elasticity of the rubber 38 is that of the single rubber compound. In embodiments where the rubber 38 of the carcass 35 is constituted of two or more rubber compounds, the modulus of elasticity of the rubber 38 is the average modulus of elasticity determined based on the modulus of elasticity of each of these constituent rubber compounds and their proportions (as discussed previously).

In some cases, in embodiments where the rubber 38 of the carcass 35 is constituted of two or more rubber compounds, the modulus of elasticity of the rubber 41 of the traction projection $58_x$ may be lower than the modulus of elasticity of the outer layer of the rubber 38 of the carcass 35 which forms the ground-engaging outer surface 31 of the carcass 35.

Figure 28:
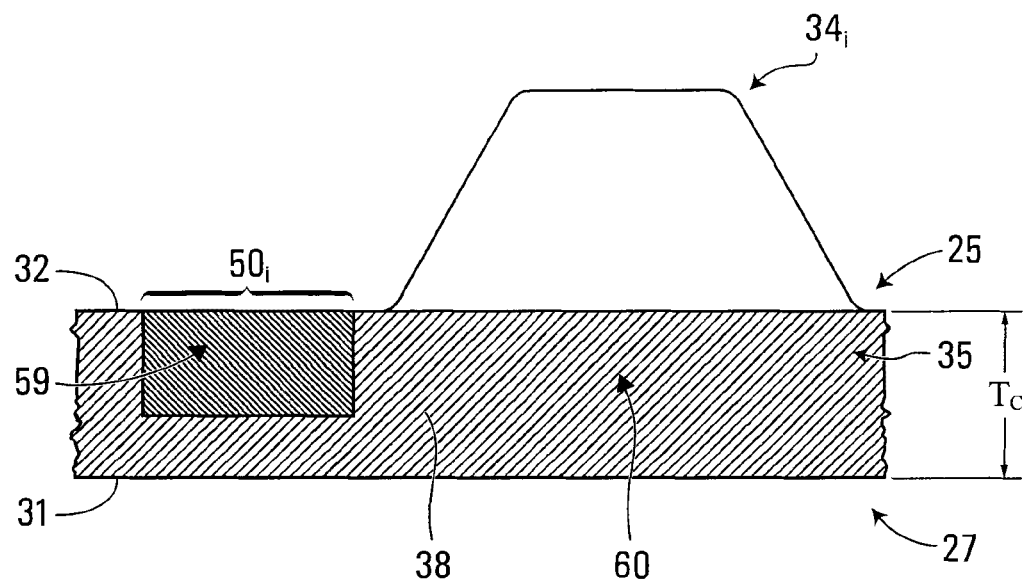

4.2 Hardness and/or Modulus of Elasticity of Elastomeric Material at Widthwise Position of Idler Wheel Path is Lower than Hardness and/or Modulus of Elasticity of Elastomeric Material at Widthwise Position Outside of Idler Wheel Path In some embodiments, as shown in FIG. 28, elastomeric material 59 of the endless track 21 at a widthwise position of an idler wheel path $50_i$ may be less hard and/or more elastic than elastomeric material 60 of the endless track 21 at a widthwise position outside every idler wheel path. This forms a "shock absorption zone" that provides shock absorption, and thus reduces noise generation, when a given one of the idler wheels $26_1$-$26_4$, $28_1$-$28_6$, $30_1$, $30_2$ which runs on the idler wheel path $50_i$ crosses the transversal stiffening rods $36_1$-$36_N$. This is an example of an embodiment in which a shock absorbency (i.e., a capacity to absorb shocks) of the track 21 at the widthwise position of the idler wheel path $50_i$ is greater than a shock absorbency of the track 21 at a widthwise position outside the idler wheel path $50_i$.

More particularly, in this embodiment, the elastomeric material 59 and the elastomeric material 60 are adjacent portions of the rubber 38 of the carcass 35. In this example, the rubber 59 extends outwardly in the thickness direction of the track 21 from the inner surface 32 of the carcass 35. The elastomeric material 59 may have any suitable thickness. For instance, in some cases, the thickness of the rubber 59 may correspond to at least 10% of the thickness $T_C$ of the carcass 35, in some cases at least 20% of the thickness $T_C$ of the carcass 35, in some cases at least 30% of the thickness $T_C$ of the carcass 35, in some cases at least 40% of the thickness $T_C$ of the carcass, and in some cases even more. In some cases, the rubber 59 may extend from the inner surface 32 to the ground-engaging outer surface 31 of the carcass 35, i.e., the thickness of the rubber 59 may correspond to the thickness $T_C$ of the carcass 35.

As an example, in some embodiments, a ratio of the hardness of the rubber 59 at the widthwise position of the idler wheel path $50_i$ to the hardness of the rubber 60 at a widthwise position outside of every idler wheel path may be no more than 0.9, in some cases no more than 0.8, in some cases no more than 0.7, and in some cases even less (e.g., no more than 0.5).

For instance, in some embodiments, the hardness of the rubber 59 at the widthwise position of the rolling path $50_i$ may no more than 80 durometers A, in some cases no more than 70 durometers A, in some cases no more than 60 durometers A, and in some cases even less. The hardness of the rubber 59 may have any other suitable value in other embodiments.

In embodiments where the rubber 59 or 60 of the carcass 35 is constituted of a single rubber compound, the hardness of the rubber 59 or 60 is that of the single rubber compound. In embodiments where the rubber 59 or 60 of the carcass 35 is constituted of two or more rubber compounds, the hardness of the rubber 59 or 60 is the average hardness determined based on the hardness of each of these rubber compounds and their proportions (as discussed previously).

As another example, in some embodiments, a ratio of the modulus of elasticity of the rubber 59 at the widthwise position of the rolling path $50_i$ to the modulus of elasticity of the rubber 60 outside of every rolling path may be no more than 0.9, in some cases no more than 0.8, in some cases no more than 0.7, and in some cases even less (e.g., no more than 0.5).

In embodiments where the rubber 59 or 60 of the carcass 35 is constituted of a single rubber compound, the modulus of elasticity of the rubber 59 or 60 is that of the single rubber compound. In embodiments where the rubber 59 or 60 of the carcass 35 is constituted of two or more rubber compounds, the modulus of elasticity of the rubber 59 or 60 is the average modulus of elasticity determined based on the modulus of elasticity of each of these rubber compounds and their proportions (as discussed previously).

Figure 29:
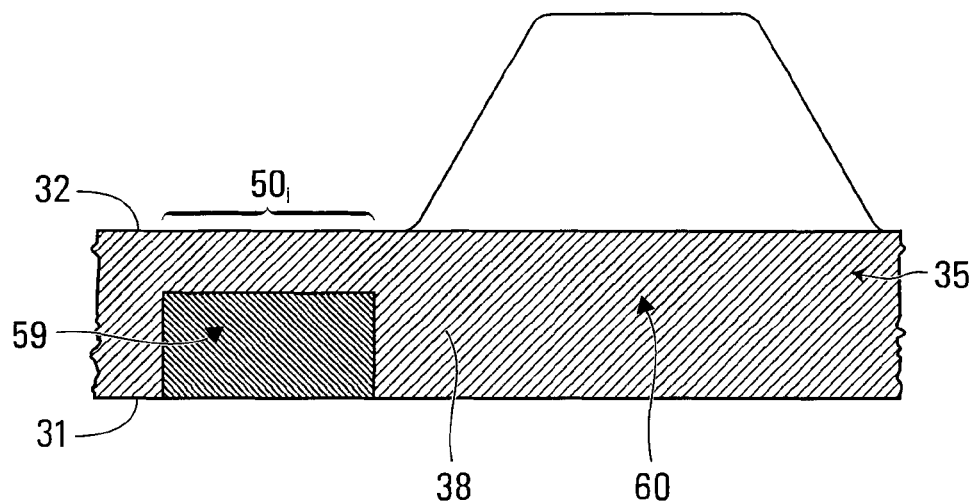
Figure 30:
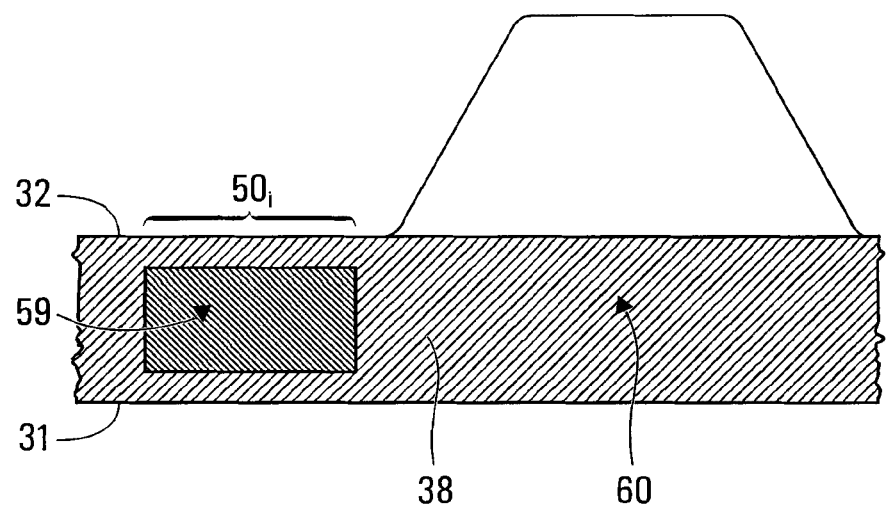

While in embodiments considered above the rubber 59 forming an absorption zone extends outwardly from the inner surface 32 of the carcass 35, in other embodiments, the rubber 59 may extend inwardly from the ground-engaging outer surface 31 of the carcass 32 without reaching the inner surface 32 of the carcass 35, as shown in FIG. 29, or may be embedded in the carcass 35 without reaching either of its inner surface 32 and ground-engaging outer surface 31, as shown in FIG. 30.

Figure 31:
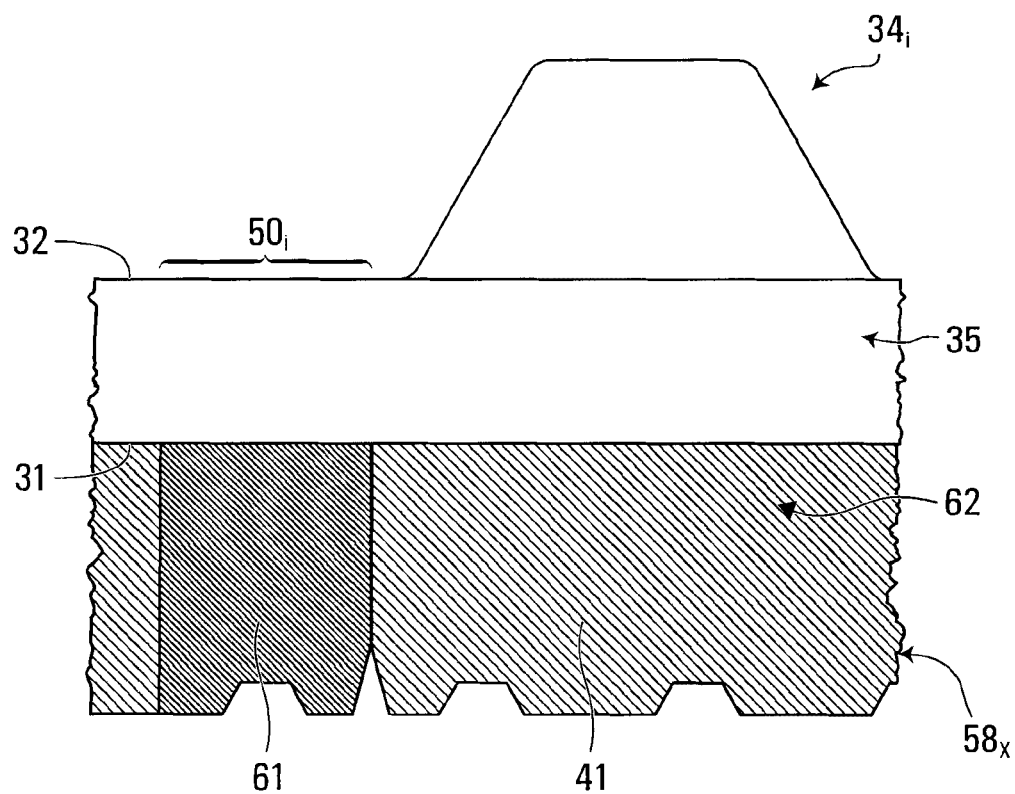

FIG. 31 shows another embodiment in which elastomeric material 61 of the endless track 21 at a widthwise position of an idler wheel path $50_i$ is less hard and/or more elastic than elastomeric material 62 of the endless track 21 at a widthwise position outside every idler wheel path. In this embodiment, the elastomeric material 61 and the elastomeric material 62 are adjacent portions of the rubber 41 of a traction projection $58_x$. In some embodiments, the hardness and/or the modulus of elasticity of each of the rubber 61 and the rubber 62 may be selected as discussed above in respect of the rubber 59 or 60 of the carcass 35.

In embodiments considered above, the rubber 59 and the rubber 60 of the carcass 35, and the rubber 61 and the rubber 62 of the traction projection $58_x$, may be provided during manufacturing of the endless track 21 by placing pieces of rubber (e.g., cut sheets or blocks of rubber) corresponding to these rubber portions in a mold such that, after molding, they form these rubber portions of track 21.

5. Transversal Stiffening Cables

Figure 32A:
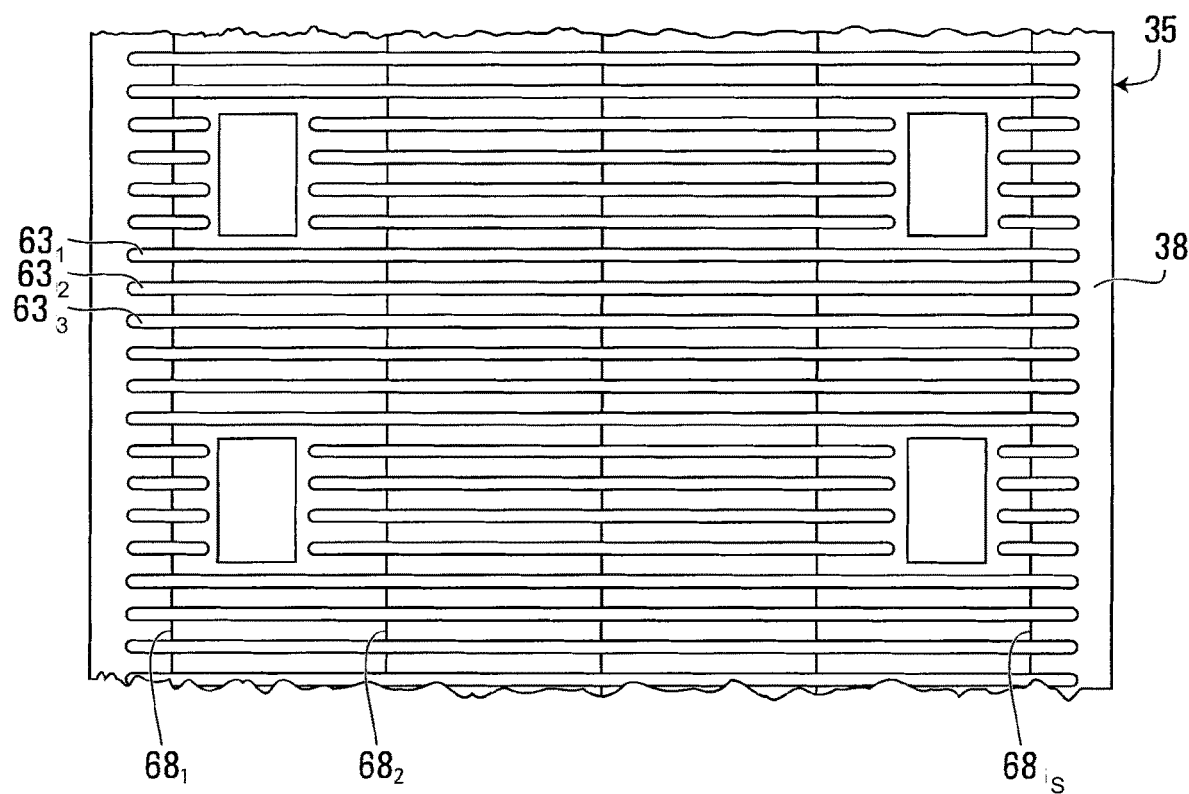
FIGS. 32A to 32D show various embodiments of the track comprising a layer of transversal stiffening cables in accordance with various embodiments of the invention.

In some embodiments, as shown in FIG. 32A, the endless track 21 may comprise a layer of transversal stiffening cables $63_1$-$63_T$ (which indicates any number of transversal stiffening cables $63_1$, $63_2$, $63_3$ . . . to $63_T$) which are generally parallel to one another and extend transversally to the longitudinal direction of the track 21 to provide transverse rigidity. More particularly, in this embodiment, the transversal stiffening cables $63_1$-$63_T$ extend in the widthwise direction of the track 21.

The transversal stiffening cables $63_1$-$63_T$ may be any suitable type of cable. For example, in some embodiments, each of the transversal stiffening cables $63_1$-$63_T$ may be a cord including a plurality of strands (e.g., textile fibers or metallic wires). In other embodiments, each of the transversal stiffening cables $63_1$-$63_T$ may include a single strand and/or may be made of any other suitable material (e.g., metal, plastic or composite material).

The layer of transversal stiffening cables $63_1$-$63_T$ can be implemented in various ways. For example, in this embodiment, the layer of transversal stiffening cables $63_1$-$63_T$ is a layer of tire cord fabric in which the transversal stiffening cords $63_1$-$63_T$ are interlaced with longitudinal strands $68_1$-$68_S$ (which indicates any number of longitudinal strands $68_1$, $68_2$ . . . $68_5$ . . . $68_S$) that run generally along the longitudinal direction of the track 21. In other embodiments, the transversal stiffening cables $63_1$-$63_T$ may not be interlaced with any other fabric members but may rather be unconnected other than by the rubber of the track 21.

Figure 32B:
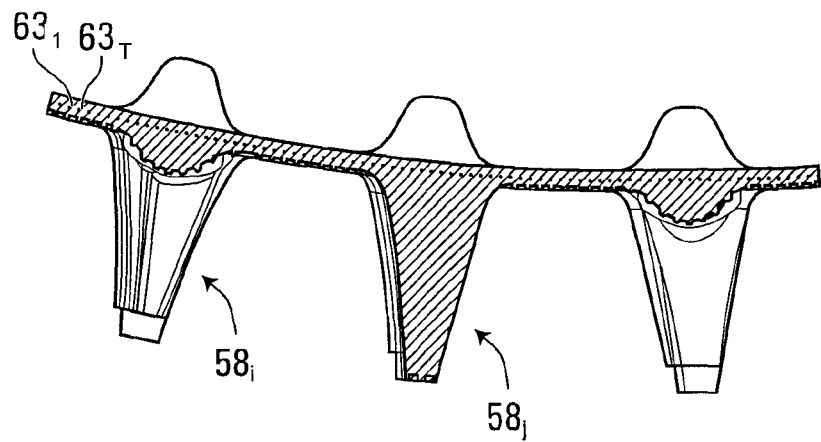

In some embodiments, as shown in FIG. 32B, the track 21 may be free of transversal stiffening rods but have sufficient transversal rigidity because of the transversal stiffening cables $63_1$-$63_T$.

Figure 32C:
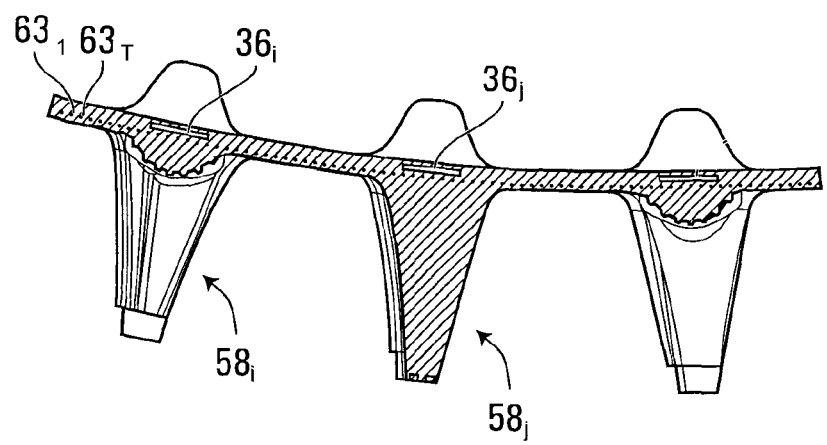

In other embodiments, as shown in FIG. 32C, the track 21 may include the transversal stiffening rods $36_1$-$36_N$ along with the transversal stiffening cables $63_1$-$63_T$. In some examples of implementation, the transversal stiffening rods $36_1$-$36_N$ may be smaller than conventional rods since the transversal stiffening cables $63_1$-$63_T$ assist in providing transversal rigidity. For instance, in this case, each of the transversal stiffening rods $36_1$-$36_N$ has a cross-section with a high aspect ratio and a generally rectangular shape, i.e., it is a plate-like or "ruler" rod, as discussed above in section 1.1.1. The transversal stiffening rods $36_1$-$36_N$ may have any other suitable shapes in other embodiments. Also, in this example, the layer of transversal stiffening cables $63_1$-$63_T$ is located between the transversal stiffening rods $36_1$-$36_N$ and the ground-engaging outer side 27 of the track 21. In other examples, the layer of transversal stiffening cables $63_1$-$63_T$ may be located between the transversal stiffening rods $36_1$-$36_N$ and the inner side 25 of the track 21.

In this case, the transversal stiffening rods $36_1$-$36_N$ are distributed in the track 21 such that there is one transversal stiffening rod $36_i$ beneath every traction projection $58_i$ of the track 21. In other words, a longitudinal spacing or pitch of the transversal stiffening rods $36_1$-$36_N$ may correspond to a longitudinal spacing or pitch of the traction projection $58_1$-$58_T$.

Figure 32D:
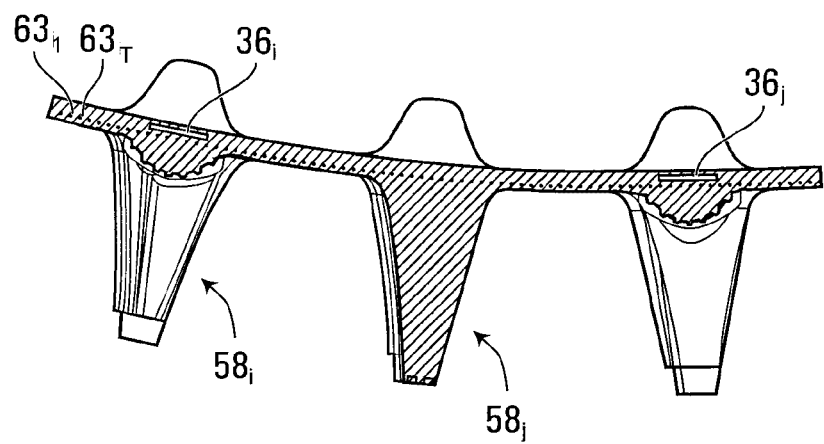

In other cases, as shown in FIG. 32D, the transversal stiffening rods $36_1$-$36_N$ may be distributed in the track 21 such that there is no transversal stiffening rod $36_i$ beneath at least some of the traction projection $58_1$-$58_T$ of the track 21. In such cases, the longitudinal spacing or pitch of the transversal stiffening rods $36_1$-$36_N$ is greater than the longitudinal spacing or pitch of the traction projection $58_1$-$58_T$. For instance, in this embodiment, there is one transversal stiffening rod $36_i$ at every two of the traction projections $58_1$-$58_T$. The longitudinal spacing or pitch of the transversal stiffening rods $36_1$-$36_N$ may be even greater in other examples (e.g., one transversal stiffening rod $36_i$ at every three or four of the traction projection $58_1$-$58_T$).

6. Carcass Periphery

In some embodiments, a periphery of the carcass 35, including its inner surface 32 and its ground-engaging outer surface 31, may be configured to reduce noise generation and/or provide other benefits (e.g., controlled rigidity). This can be achieved in various ways in various embodiments, examples of which will be discussed.

Figure 33A:
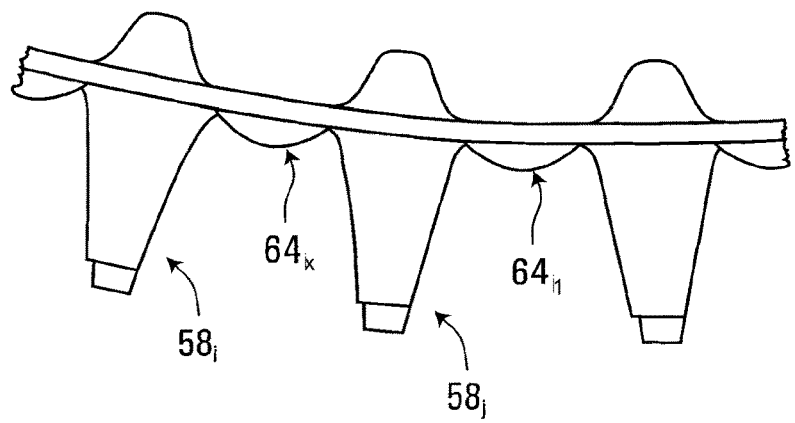
FIGS. 33A and 33B show idler wheel path projections on a ground-engaging outer side of the track in accordance with an embodiment of the invention.
Figure 33B:
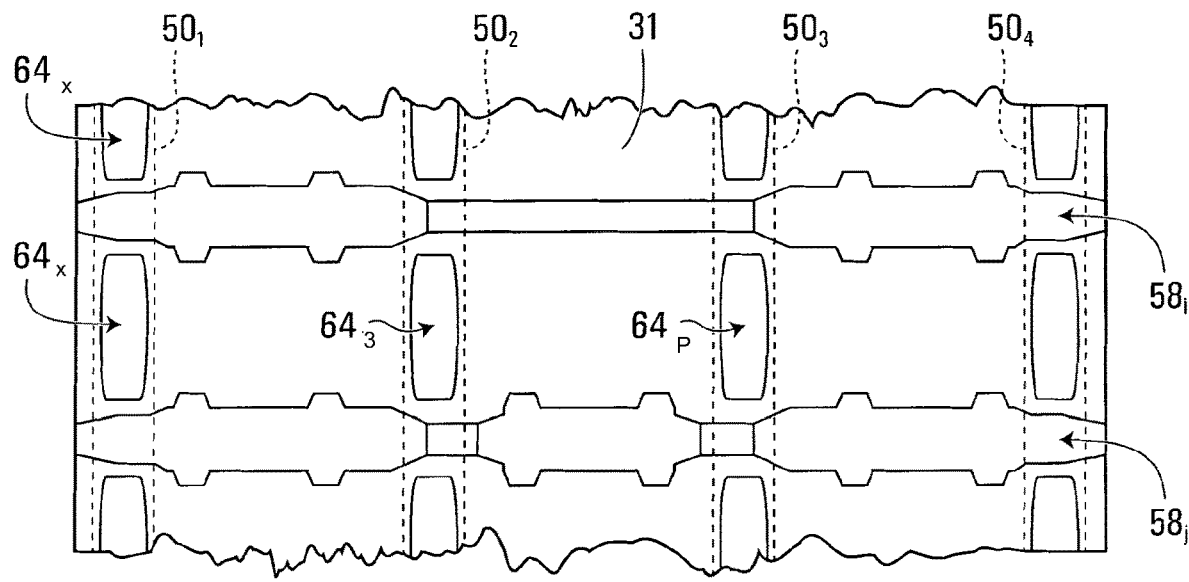

6.1 Idler Wheel Path Projections on Carcass Outer Surface Between Adjacent Traction Projections In some embodiments, as shown in FIGS. 33A and 33B, the ground-engaging outer surface 31 of the carcass 35 may define a plurality of idler wheel path projections $64_1$-$64_P$ (which indicates any number of path projections $64_1$, $64_2$, $64_3$ ... $64_P$) which are located between adjacent ones of the traction projections $58_1$-$58_T$ in the longitudinal direction of the track and which are aligned with respective ones of the idler wheel paths $50_1$-$50_4$ in the widthwise direction of the track 21 (i.e., overlap with respective ones of the idler wheel paths $50_1$-$50_4$ in the widthwise direction of the track 21). The idler wheel path projections $64_1$-$64_P$ may help to reduce noise generation when they are crossed over by respective ones of the idler wheels $26_1$-$26_4$, $28_1$-$28_6$, $30_1$, $30_2$.

For example, when a lower roller wheel $28_i$ on a rolling path $50_i$ arrives where an idler wheel rolling path projection $64_x$ is located, the idler wheel rolling path projection $64_x$ contacts the ground and counters a tendency of the carcass 35 to deflect downwardly under loading of the lower roller wheel $28_i$.

In this embodiment, each idler wheel rolling path projection $64_x$ is uneven along the longitudinal direction of the track 21. More particularly, in this case, the idler wheel rolling path projection $64_x$ is curved along the longitudinal direction of the track 21 so that its thickness varies longitudinally.

Figure 34A:
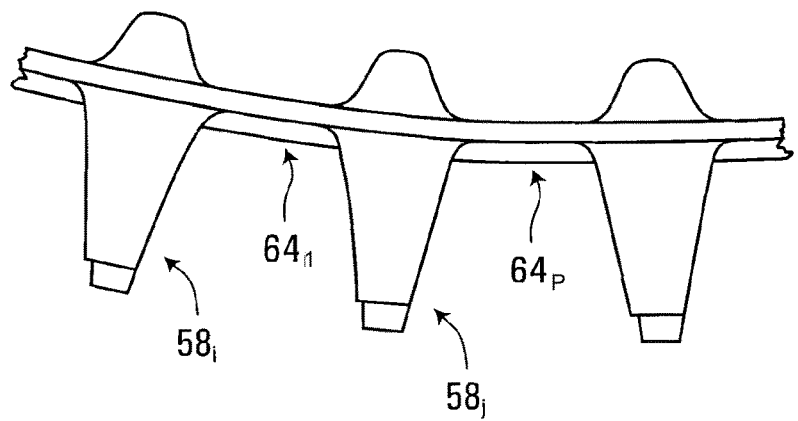
FIGS. 34A and 34B show idler wheel path projections on a ground-engaging outer side of the track in accordance with another embodiment of the invention.
Figure 34B:
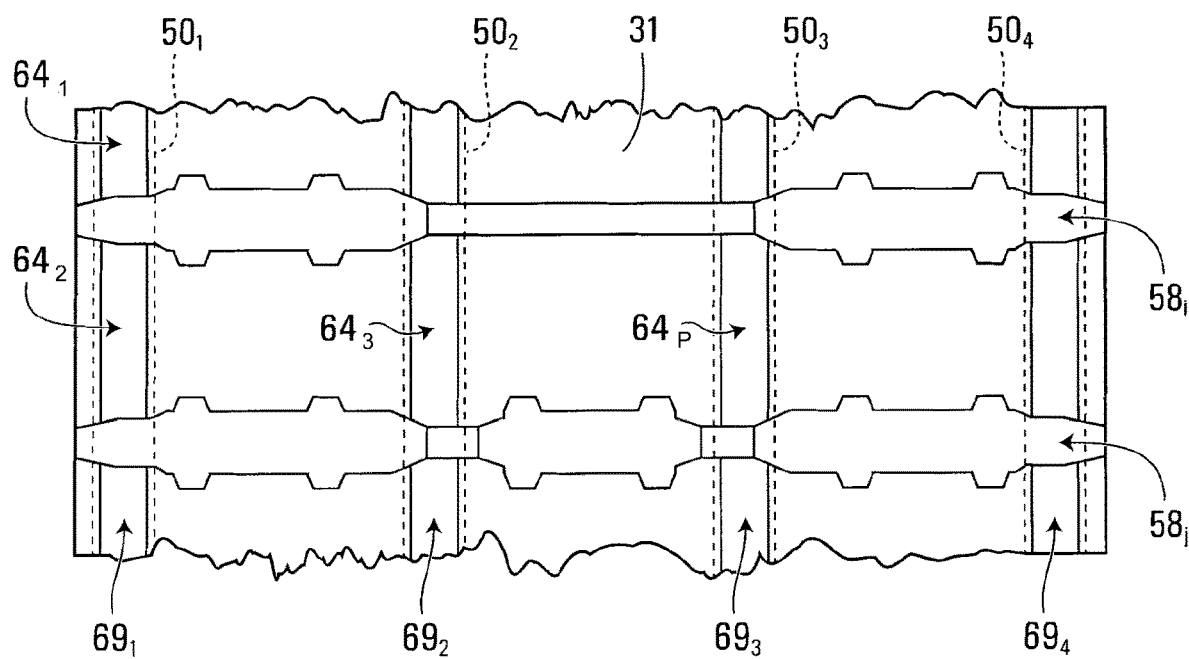

The idler wheel path projections $64_1$-$64_P$ may be configured in various other ways in other embodiments. For example, in some embodiments, as shown in FIGS. 34A and 34B, each of the idler wheel path projections $64_1$-$64_P$ may be generally flat along the longitudinal direction of the track 21 and may occupy all of a longitudinal extent between adjacent ones of the traction projection $58_1$-$58_T$ such that the idler wheel path projections $64_1$-$64_P$ form "continuous" raised longitudinal bands $69_1$-$69_4$ on the ground-engaging outer side 27 of the track 21.

6.2 Longitudinal Rigidifiers on Carcass Inner Surface and/or Outer Surface

Figure 38:
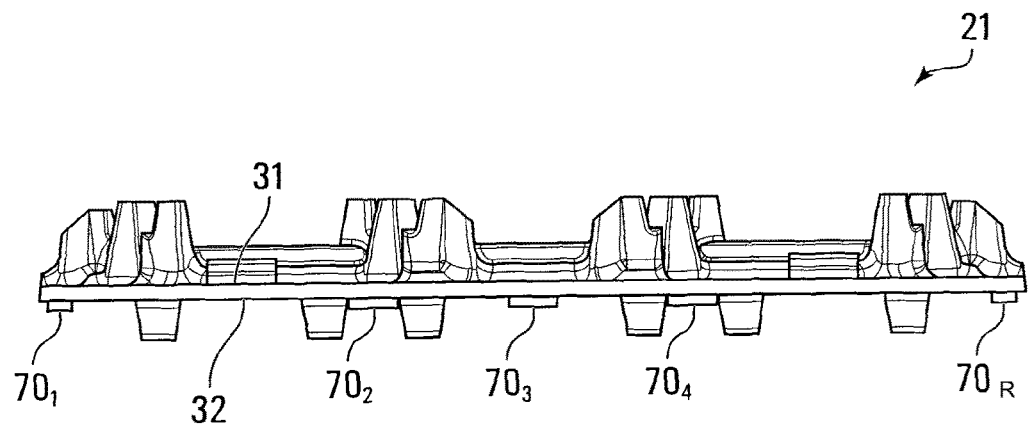
FIGS. 38 and 39 show longitudinal rigidifiers on an inner surface of a carcass of the track in accordance with an embodiment of the invention.
Figure 39:
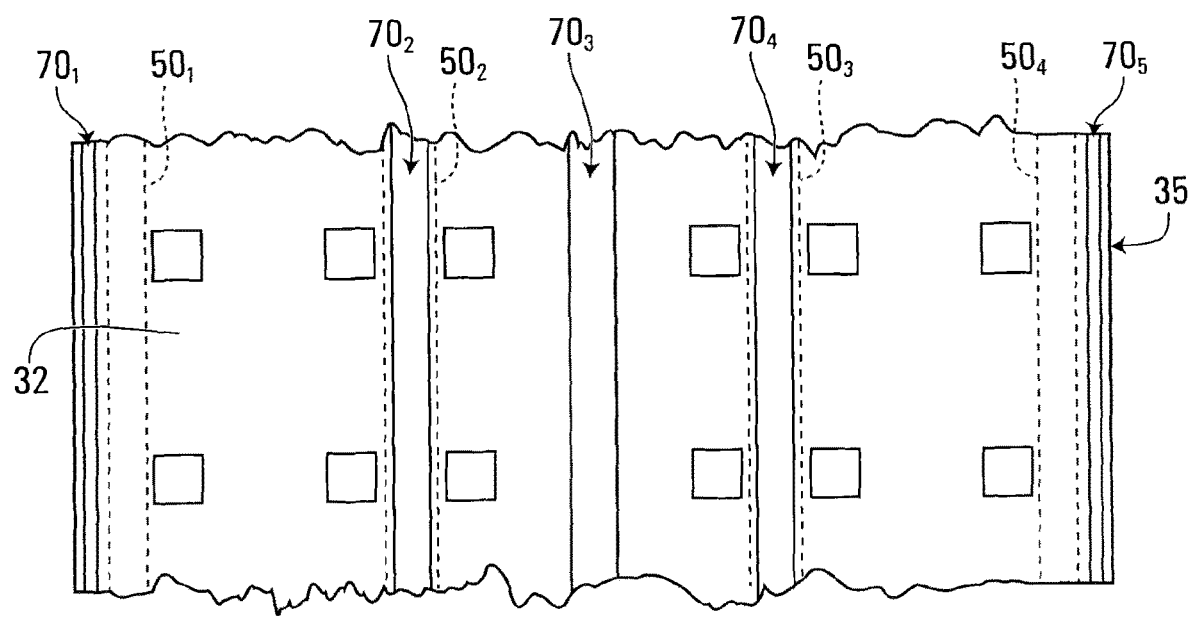

In some embodiments, as shown in FIGS. 38 and 39, the inner surface 32 and/or the ground-engaging outer surface 31 of the carcass 35 of the endless track 21 may comprise a plurality of longitudinal rigidifiers $70_1$-$70_R$ (which indicates any number of longitudinal rigidifiers $70_1$, $70_2$, $70_3$, $70_4$, $70_5$ ... $70_R$) for imparting longitudinal rigidity to the track 21. Each of the longitudinal rigidifiers $70_1$-$70_R$ is an elastomeric formation, such as a projection or recess, formed in the rubber of the carcass 35 that increases the longitudinal rigidity of the track 21 compared to if the track 21 lacked the longitudinal rigidifiers $70_1$-$70_R$ but was otherwise identical. The increased longitudinal rigidity of the track 21 may help to reduce deflection of the track 21 when the idler wheels roll on the bottom run of the track 21.

In this embodiment, the longitudinal rigidifiers $70_1$-$70_R$ are longitudinally-rigidifying projections formed in the inner surface 32 of the track 32. More particularly, in this example of implementation, the longitudinally-rigidifying projections $70_1$-$70_R$ are shaped as raised strips that are generally parallel to the longitudinal direction of the track 21. The longitudinally-rigidifying projections $70_1$-$70_R$ may have various other shapes (e.g., narrower ridges or ribs) and/or may have various other orientations (e.g., oblique) relative to the longitudinal direction of the track 21 in other examples of implementation. In other embodiments, instead of being projections, the longitudinal rigidifiers $70_1$-$70_R$ may be longitudinally-rigidifying recesses (e.g., grooves that are generally parallel to the longitudinal direction of the track 21). In yet other embodiments, the longitudinal rigidifiers $70_1$-$70_R$ may include both longitudinally-rigidifying projections and longitudinally-rigidifying recesses.

The longitudinal rigidifiers $70_1$-$70_R$ may be arranged in various ways. For example, in this embodiment, the longitudinal rigidifiers $70_2$, $70_4$ are located where the idler wheel paths $50_2$, $50_3$ are located while the longitudinal rigidifiers $70_1$, $70_3$, $70_5$ are located outside of the idler wheel paths $50_1$-$50_4$.

Although in this embodiment the longitudinal rigidifiers $70_1$-$70_R$ are located on the inner surface 32 of the carcass 35, in other embodiments, similar longitudinal rigidifiers may be located on the ground-engaging outer surface 31 of the track 21 in addition to or instead of the longitudinal rigidifiers $70_1$-$70_R$ on the inner surface 32.

6.3 Longitudinally Uneven Idler Wheel Path

Figure 35:
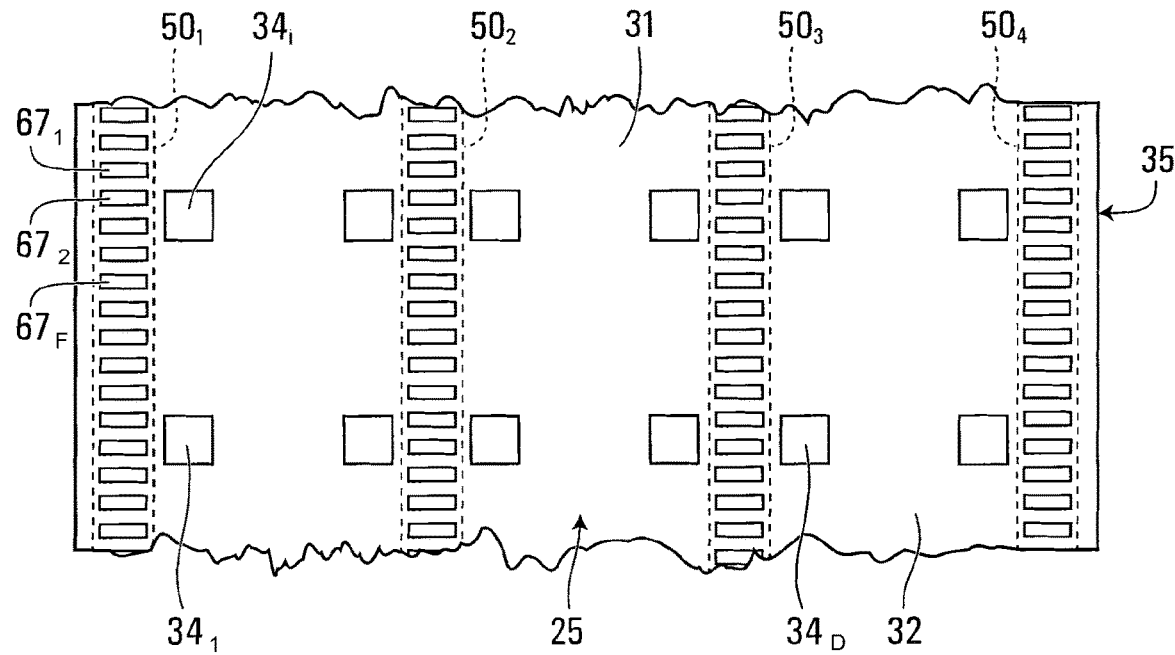
FIG. 35 shows longitudinally uneven idler wheel paths on an inner side of the track in accordance with an embodiment of the invention.

In some embodiments, as shown in FIG. 35, an idler wheel path $50_i$ on the inner surface 32 of the carcass 35 may be uneven in the longitudinal direction of the endless track 21. For example, in this embodiment, the idler wheel path $50_i$ includes a series of idler wheel path formations $67_1$-$67_F$ (which indicates any number of idler wheel path formations $67_1$, $67_2$ ... $67_F$) distributed in the longitudinal direction of the track 21. The formations $67_1$-$67_F$ constitute a deformable shock-absorbing zone in the idler wheel path $50_i$ such that, when idler wheels contact some of these formations $67_1$-$67_F$, the formations $67_1$-$67_F$ can deform to absorb the shock and thus reduce noise generation. In this case, the formations $67_1$-$67_F$ include recesses. In other cases, the formations $67_1$-$67_F$ may include projections or a combination of recesses and projections. This is an example of an embodiment in which a shock absorbency (i.e., a capacity to absorb shocks) of the track 21 at the widthwise position of the idler wheel path $50_i$ is greater than a shock absorbency of the track 21 at a widthwise position outside the idler wheel path $50_i$.

A longitudinal spacing of adjacent ones of the idler wheel path formations $67_1$-$67_F$ may be selected so as to allow proper deformability for shock absorbance yet avoid creating unwanted vibrational effects as some of the idler wheels $26_1$-$26_4$, $28_1$-$28_6$, $30_1$, $30_2$ roll over these formations $67_1$-$67_F$. For example, in some embodiments, the longitudinal spacing of adjacent ones of the idler wheel path formations $67_1$-$67_F$ may be no more than 5 mm, in some cases no more than 4, and in some cases no more than 3 mm. The longitudinal spacing of adjacent ones of the idler wheel path formations $67_1$-$67_F$ may have any other suitable value in other embodiments.

7. Track Elastomeric Material

In some embodiments, elastomeric material of the track 21 may have certain characteristic which may help to reduce noise generation and/or provide other benefits (e.g., controlled rigidity).

7.1 Fiber-Reinforced Elastomeric Material

Figure 44:
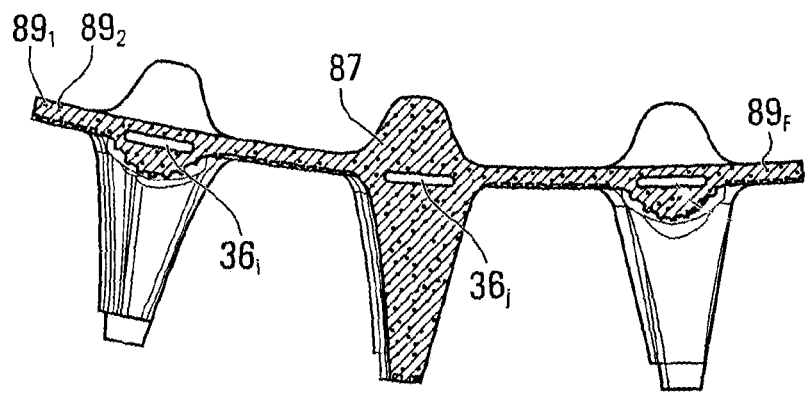
FIG. 44 shows an example of implementation in which the track is at least mainly made of fiber-reinforced elastomeric material in accordance with an embodiment of the invention.

In some embodiments, as shown in FIG. 44, the track 21 may be at least mainly (i.e., entirely or mainly) made of fiber-reinforced elastomeric material which comprises an elastomeric matrix 87 in which are embedded fibers $89_1$-$89_F$ (which indicates any number of embedded fibers $89_1$, $89_2$ . . . $89_F$). In other words, at least a bulk of the track 21 may be made of the fiber-reinforced elastomeric material. In this embodiment, the fibers $89_1$-$89_F$ generally extend transversally to the longitudinal direction of the track 21. This can provide transversal rigidity to the track 21.

In this embodiment, at least part of (i) the carcass 35, (ii) a traction projection $58_x$, and (iii) a drive/guide lug $34_x$ of the track 21 are made of the fiber-reinforced elastomeric material. More particularly, in this embodiment, at least a majority of (i) the carcass 35, (ii) a traction projection $58_x$, and (iii) a drive/guide lug $34_x$ of the track 21 are made of the fiber-reinforced elastomeric material. In the example shown in FIG. 44, the track 21 is entirely made of the fiber-reinforced elastomeric material except for any reinforcement, such as the transversal stiffening rods $36_1$-$36_N$, the reinforcing cables $37_1$-$37_M$, or the reinforcing fabric 43, which may be embedded in the fiber-reinforced elastomeric material.

The elastomeric matrix 87 may include any suitable elastomer. In some cases, the elastomeric matrix 87 may include a single elastomer (e.g., rubber). In other cases, the elastomeric matrix 87 may include two or more constituent elastomers (e.g., two or more different rubber compounds, one or more rubber compounds along with one or more other types of elastomer, etc.).

In this embodiment, each of the fibers $89_1$-$89_F$ is a "short" fiber. For example, in some embodiments, each of the fibers $89_1$-$89_F$ may have a length of no more than 10% of the width of the track 21, in some cases no more than 5% of the width of the track 21, in some cases no more than 3% of the width of the track 21, and in some cases even less (e.g., no more than 2% of the width of the track 21). For instance, in some embodiments, the length of each of the fibers $89_1$-$89_F$ may be no more than 30 mm, in some cases no more than 20 mm, in some cases no more than 10 mm, and in some cases even less (e.g., no more than 5 mm). In this example of implementation, the fibers $89_1$-$89_F$ are "chopped" or otherwise cut fibers.

In other embodiments, each of the fibers $89_1$-$89_F$ may be a "long" fiber that extends along at least a majority of the width of the track 21. For instance, in some cases, each of the fibers $89_1$-$89_F$ may extends along all of the width of the track.

The fibers $89_1$-$89_F$ may be made of any suitable material. In this embodiment, the fibers $89_1$-$89_F$ are polymeric fibers. More specifically, in this example, the fibers $89_1$-$89_F$ are aramid fibers (e.g., Kevlar fibers). Various other types of polymeric fibers may be used in other examples (e.g., polyvinyl alcohol (PVA) fibers). Also, in other embodiments, the fibers $89_1$-$89_F$ may be any other suitable type of fibers (e.g., metallic fibers, carbon fibers, glass fibers, etc.).

In some embodiments, as it may provide transversal rigidity and/or other reinforcing effects, the fiber-reinforced elastomeric material of the track 21 may allow fewer or modified reinforcements to be embedded in it. For example, in this embodiment, the transversal stiffening rods $36_1$-$36_N$ have a high aspect ratio (e.g., are plate-like or "ruler" rods) and the track 21 is free of reinforcing fabric, as discussed previously.

The track 21 and its fiber-reinforced elastomeric material may be produced using various techniques. For example, in some embodiments, sheets of fiber-reinforced elastomeric material, which include respective portions of the elastomeric matrix 87 and respective ones of the fibers $89_1$-$89_F$, may be produced by calendaring, extrusion, pultrusion or any other process in which those fibers are incorporated into that portion of the elastomeric matrix 87. These sheets may then be placed into a mold for molding the track 21 such that the respective portions of the elastomeric matrix 87 and the respective ones of the fibers $89_1$-$89_F$ of these sheets are combined into the track 21. Various other manufacturing processes may be used in other embodiments.

7.2 Slipper Elastomeric Material

In some embodiments, at least part of the elastomeric material of the track 21, including the elastomeric material 38 of the carcass 35, may include "slipper" rubber. The slipper rubber forms at least part of the inner surface 32 of the carcass 35 on which the slide rails $33_1$, $33_2$ slide. The slipper rubber exhibits a migration of lubricant (e.g., oil) contained within itself to the inner surface 32 of the carcass 35 in use. This helps to reduce friction between the slide rails $33_1$, $33_2$ and the track 21. As a result, this reduced friction may allow a reduction in number of the slide clips on the track 21 or the track 21 to be free of slide clips altogether. By reducing or eliminating contact between the slide rails $33_1$, $33_2$ and slide clips, noise generation is reduced. Any suitable type of slipper rubber which exhibits oil migration to its surface may be used.

7.3 Cellular Elastomeric Material

In some embodiments, at least part of the elastomeric material of the track 21, such as the elastomeric material 38 of the carcass 35, may include cellular elastomeric material (e.g., cellular rubber) at a widthwise position of an idler wheel path $50_i$. The cellular elastomeric material is elastomeric material which contains cells (e.g., bubbles) created by introducing a gas (e.g., air) or a gas-producing agent (e.g., sodium bicarbonate) during manufacturing of the cellular elastomeric material. The cells of the cellular elastomeric material may include closed cells and/or open cells. The cellular elastomeric material creates a deformable shock-absorbing zone in the idler wheel path $50_i$ such that, when idler wheels roll over the cellular elastomeric material, the cellular elastomeric material can deform more than if it was non-cellular (i.e., the same elastomeric compound but without cells) to absorb the shock and thus reduce noise generation. Any suitable type of cellular elastomeric material which provides shock-absorption may be used. This is an example of an embodiment in which a shock absorbency (i.e., a capacity to absorb shocks) of the track 21 at the widthwise position of the idler wheel path $50_i$ is greater than a shock absorbency of the track 21 at a widthwise position outside the idler wheel path $50_i$.

8. Track-Engaging Assembly

In some embodiments, the track-engaging assembly 24, including the wheels 22, $26_1$-$26_4$, $28_1$-$28_6$, $30_1$, $30_2$ and the slide rails $33_1$, $33_2$, may be configured to reduce noise generation and/or provide other benefits (e.g., enhanced load distribution). Examples of how this may be achieved are discussed below.

8.1 Suspension Providing Increased Support

In some embodiments, the suspension unit 16 of the track-engaging assembly 24 may provide increased support. This can be achieved in various ways.

8.1.1 Additional Idler Wheels

Figure 40:
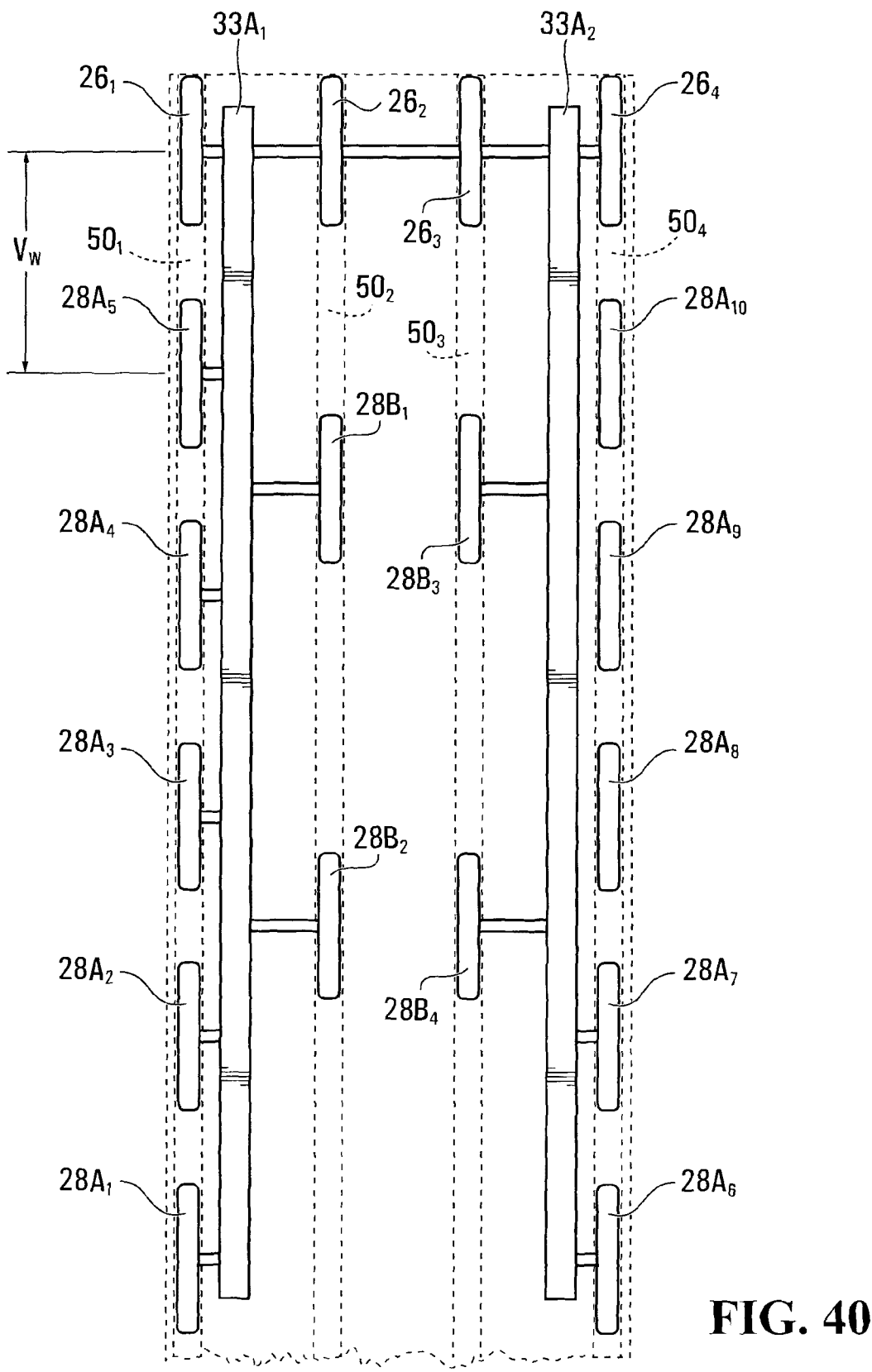
FIGS. 40 and 41 show different configurations of a suspension unit of the track system in accordance with various embodiments of the invention.

In some embodiments, as shown in FIG. 40, a number of idler wheels of the track-engaging assembly 24 that engage the bottom run of the endless track 21 may be increased. For instance, in some embodiments, the track-engaging assembly 24 may comprise a set of idler wheels spaced apart in the longitudinal direction of the track system 14 and substantially aligned with one another to roll on a given idler wheel path $50_i$ on the bottom run of the track 21 such that a longitudinal spacing $V_w$ of any two successive idler wheels of the set of idler wheels on the idler wheel path $50_i$ is less than half of the length of the track system 14, in some cases no more than 40% of the length of the track system 14, in some cases no more than 30% of the length of the track system 14, in some cases no more than 20% of the length of the track system 14, and in some cases even less (e.g., no more than 10% of the length of the track system 14).

For example, in this embodiment, the track-engaging assembly 24 comprises at least four idler wheels spaced apart in the longitudinal direction of the track 21 and substantially aligned with one another so as to roll on a given idler wheel path $50_i$ on the bottom run of the track 21. In this case, there are six idler wheels rolling on the given idler wheel path $50_i$. In other cases, there may be four, five, or more than six idler wheels rolling on the given idler wheel path $50_i$.

More particularly, in this embodiment, the track-engaging assembly 24 comprises a set of six idler wheels $26_1$, $28A_1$-$28A_5$ rolling on the leftmost idler wheel path $50_1$ and a set of six idler wheels $26_4$, $28A_6$-$28A_{10}$ rolling on the rightmost idler wheel path $50_4$. Also, in this embodiment, the track-engaging assembly 24 comprises idler wheels $26_2$, $26_3$, $28B_1$-$28B_4$ which are located between the idler wheels $26_1$, $28A_1$-$28A_5$ and the idler wheels $26_4$, $28A_6$-$28A_{10}$ in the widthwise direction of the track 21 and roll on the idler wheel paths $50_2$, $50_3$. Various other wheel configurations are possible in other embodiments.

In this example of implementation, the idler wheels $26_1$-$26_4$, $28A_1$-$28A_{12}$, $28B_1$-$28B_4$ are mounted to elongated wheel-supporting members $33A_1$, $33A_2$ of the track-engaging assembly 24. In this case, the elongated wheel-supporting members $33A_1$, $33A_2$ are not designed primarily to slide on the track 21 like the slide rails $33_1$, $33_2$ discussed above but are rather designed primarily for supporting the idler wheels $26_1$-$26_4$, $28A_1$-$28A_{12}$, $28B_1$-$28B_2$. In other cases, the elongated wheel-supporting members $33A_1$, $33A_2$ may slide on the track 21 like the slide rails $33_1$, $33_2$ discussed above and thus may also constitute slide rails.

8.1.2 Additional Slide Rails

Figure 41:
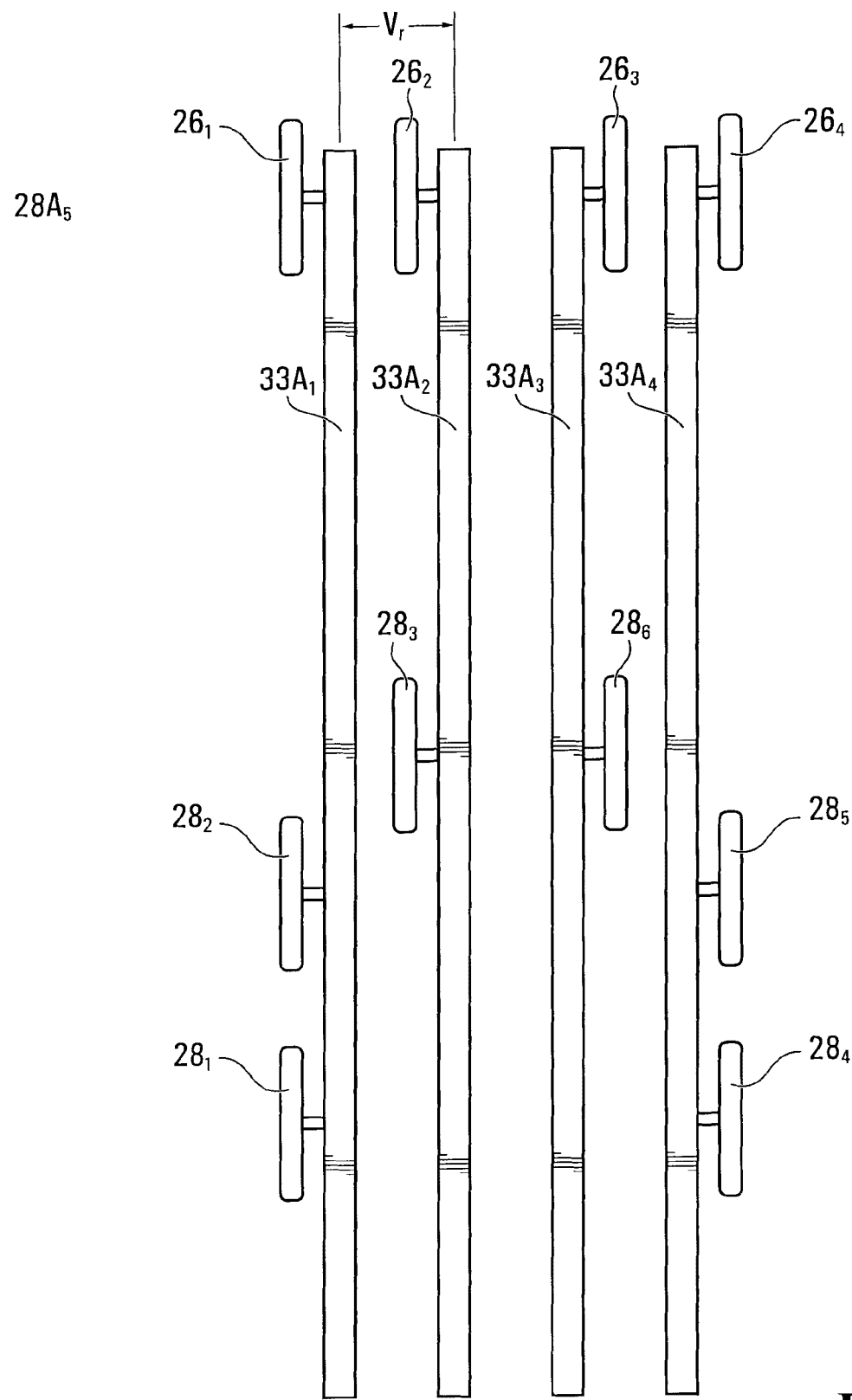

In some embodiments, as shown in FIG. 41, a number of slide rails of the track-engaging assembly 24 that slide along the bottom run of the endless track 21 may be increased. For instance, in some embodiments, the track-engaging assembly 24 may comprises a plurality of side rails spaced apart in the widthwise direction of the track system 14 such that a widthwise spacing $V_r$ of any two adjacent slide rails is less than half of the width of the track system 14, in some cases no more than 40% of the width of the track system 14, in some cases no more than 30% of the width of the track system 14, in some cases no more than 20% of the width of the track system 14, and in some cases even less (e.g., no more than 10% of the width of the track system 14).

For example, in this embodiment, the track-engaging assembly 24 comprises at least three slide rails spaced apart in the widthwise direction of the track 21. In this case, there are four slide rails. In other cases, there may be three, five, or more than five slide rails.

More particularly, in this embodiment, the track-engaging assembly 24 comprises four slide rails $33A_1$-$33A_4$ which are evenly distributed in the widthwise direction of the track 21. In this case, the slide rails $33A_1$-$33A_4$ are substantially identical in size and shape. Also, in this case, the idler wheels $26_1$-$26_4$, $28_1$-$28_6$ are mounted to respective ones of the slide rails $33A_1$-$33A_4$. Various other slide rail configurations are possible in other embodiments (e.g., the slide rails $33A_1$-$33A_4$ may not be evenly distributed in the widthwise direction of the track 21; two or more of the slide rails $33A_1$-$33A_4$ may differ in size and/or shape; one or more of the slide rails $33A_1$-$33A_4$ may not have any idler wheel mounted thereto).

8.2 Extremely Low-Friction Slide Rails

In some embodiments, the slide rails $33_1$, $33_2$ may include very low friction material to minimize as much as possible their friction with the endless track 21.

In some cases, the slide rails $33_1$, $33_2$ may have a friction of coefficient with the endless track 21 that is low enough to allow the track 21 to be free of slide members (i.e., "clips") such as the slide members discussed previously without detrimentally affecting performance of the track system 14.

8.3 Track Tensioner

Figure 42:
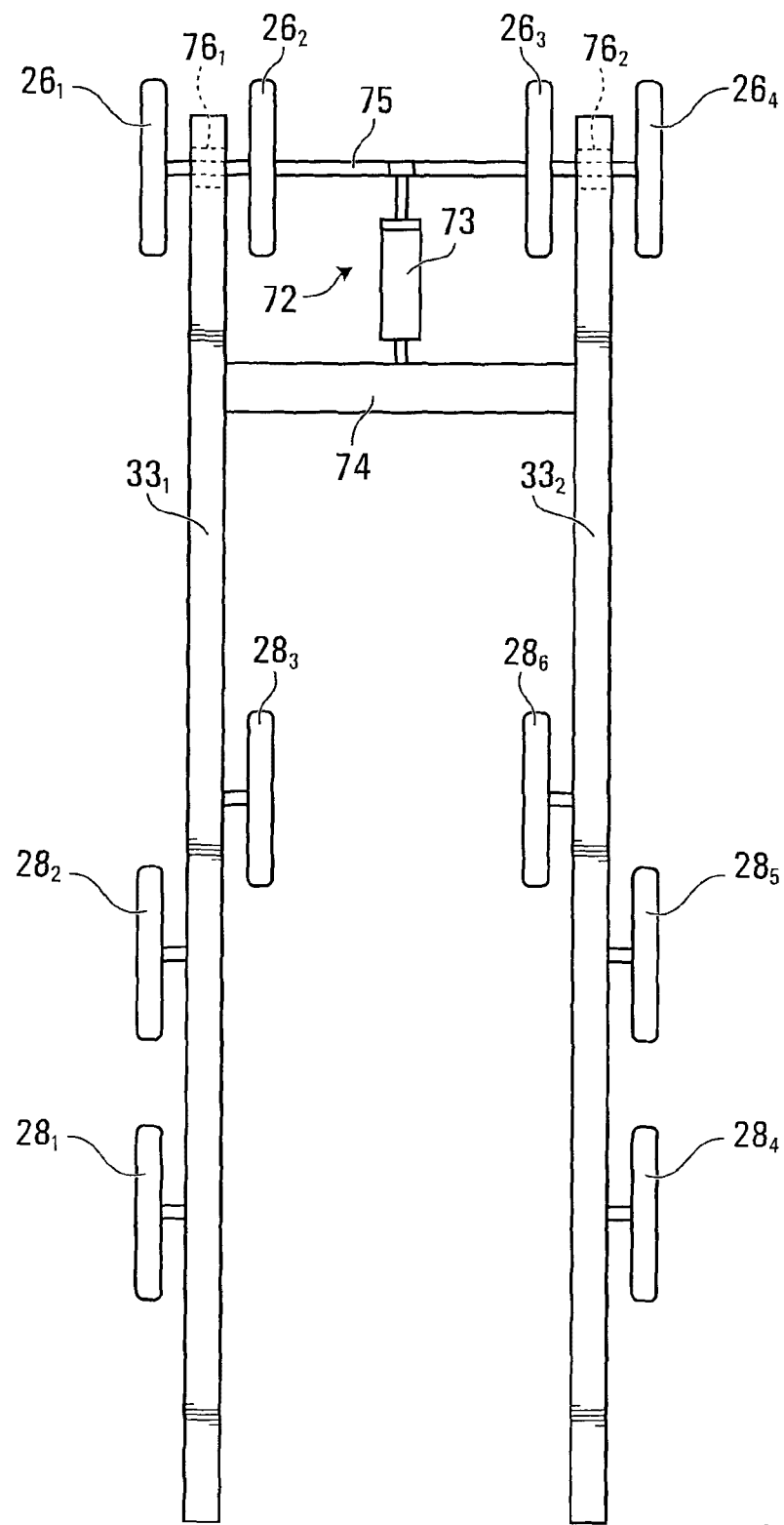
FIGS. 42 and 43 show different examples of implementation of a track tensioner of the track system in accordance with various embodiments of the invention.

In some embodiments, as shown in FIG. 42, the track-engaging assembly 24 may comprise a track tensioner 72 for maintaining tension of the endless track 21. This may counter a tendency of the track 21 to stretch due to centrifugal forces when it is driven at high speeds. In this embodiment, the track tensioner 72 is connected between a structural support 74 of the track-engaging assembly 24 and the rear idler wheels $26_1$-$26_4$ to urge the rear idler wheels $26_1$-$26_4$ in a direction to maintain the tension of the track 21.

The track tensioner 72 comprises a resilient device 73 configured to change from a first configuration to a second configuration in response to a load and return to the first configuration in response to removal of the load. More particularly, in this embodiment, the track tensioner 72 is a fluidic tensioning system, e.g., a hydraulic or pneumatic tensioning system, and the resilient device 73 is a piston-cylinder actuator connected to a fluid reservoir (not shown). In this example of implementation, the actuator 73 is a hydraulic piston-cylinder actuator.

In this embodiment, the piston-cylinder actuator 73 is connected to the structural support 74 and to an idler wheel carrier 75 which carries an axle of the rear idler wheels $26_1$-$26_4$ and which can move in slots $76_1$, $76_2$ defined by the slide rails $33_1$, $33_2$. The tensioning actuator 73 can apply the tension in the track 21 by extending or retracting to move the idler wheel carrier 75 in the slots $76_1$, $76_2$ and thus move rear idler wheels $26_1$-$26_4$ further or closer to the drive wheels 22.

The track tensioner 72 may be configured in various other ways in other embodiments.

For example, in some embodiments, the resilient device 73 may comprise a spring such as a coil spring (e.g., a metallic or polymeric coil spring), an elastomeric spring or a leaf spring, or any other device that changes in configuration under load and recovers its initial configuration when the load is removed.

Figure 43:
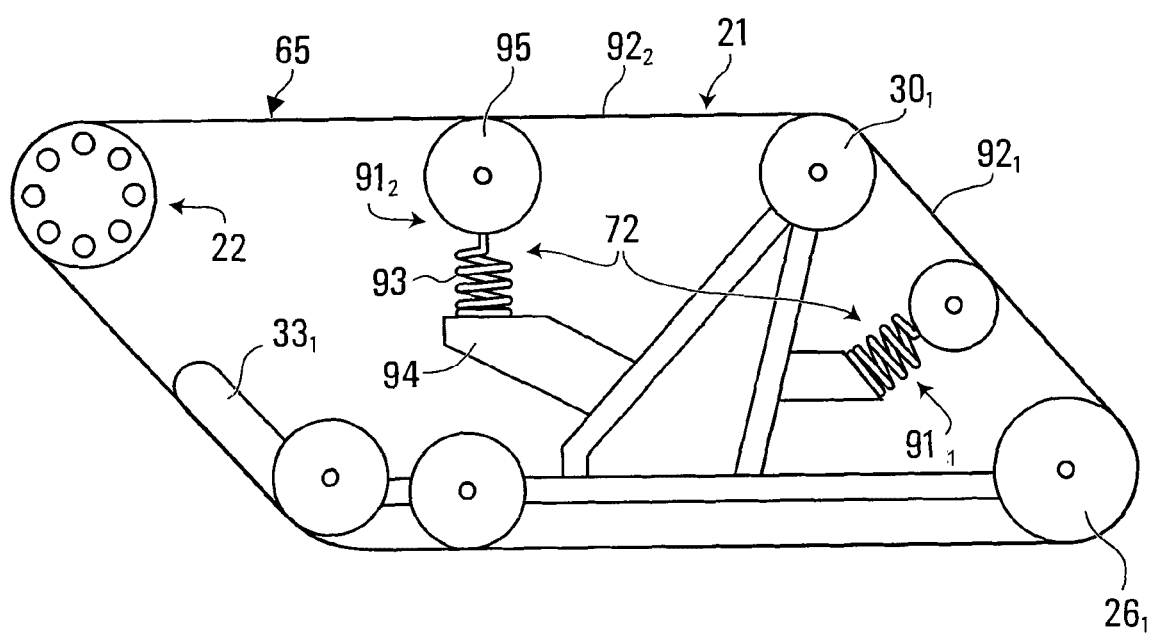

As another example, in other embodiments, the track tensioner 72 may be located elsewhere and/or act on a different part of the track 21. For instance, FIG. 43 shows an embodiment in which the track tensioner 72 comprises a first resilient device $91_1$ contacting a first segment $92_1$ of the top run 65 of the track 21 which extends between the rear idler wheels $26_1$-$26_4$ and the upper roller wheels $30_1$, $30_2$ and a second resilient device $91_2$ contacting a second segment $92_2$ of the top run 65 of the track 21 which extends between the upper roller wheels $30_1$, $30_2$ and the drive wheels 22. In this embodiment, each resilient device $91_i$ comprises a roller wheel 95 and a spring 93 that is connected between the roller wheel 95 and a structural support 94 of the track-engaging assembly 24 in order to urge the roller wheel 95 against the track 21 to tension the track 21. This can help to counter a tendency of the segments 92₁, 92₂ of the top run 65 of the track 21 to deform since they would otherwise be unsupported.

Instead of or in addition to using a track tensioner 72, in some embodiments, the endless track 21 may comprise a substantially inextensible material that can substantially prevent the track 21 from stretching in a range of speeds at which it is expected to be driven. For example, in some embodiments, the reinforcing cables 37₁-37_M of the track 21 may comprise Kevlar™ cables.

Although embodiments described above have been presented individually, any feature of any embodiment described above may be used in combination with any feature of any other embodiment described above.

While embodiments described above relate to a snowmobile, in other embodiments, any feature of any embodiment described above may be used in another type of off-road vehicle.

Figure 45A:
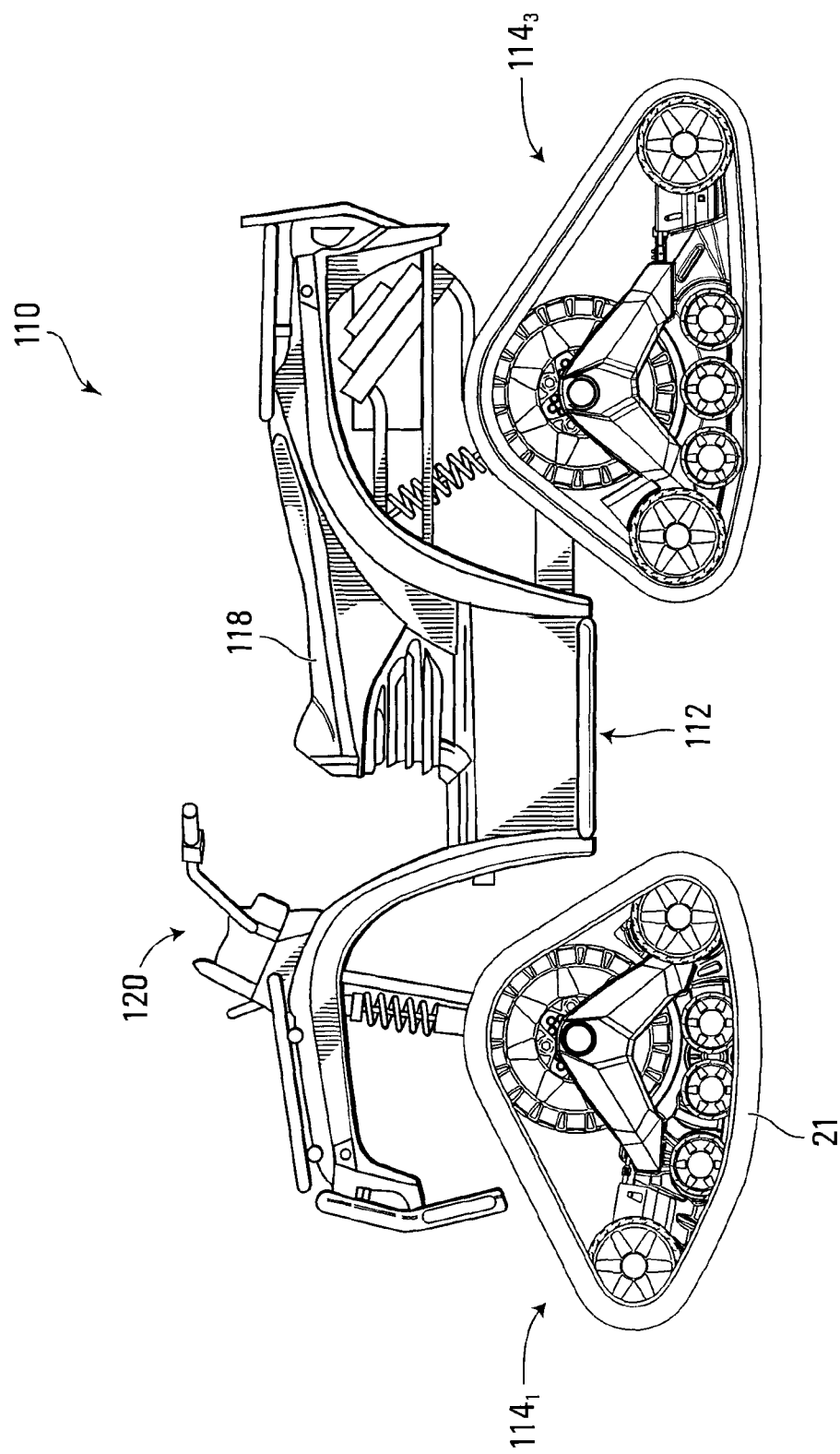
FIGS. 45A and 45B show an example of an all-terrain vehicle (ATV) comprising track systems in accordance with an embodiment of the invention.
Figure 45B:
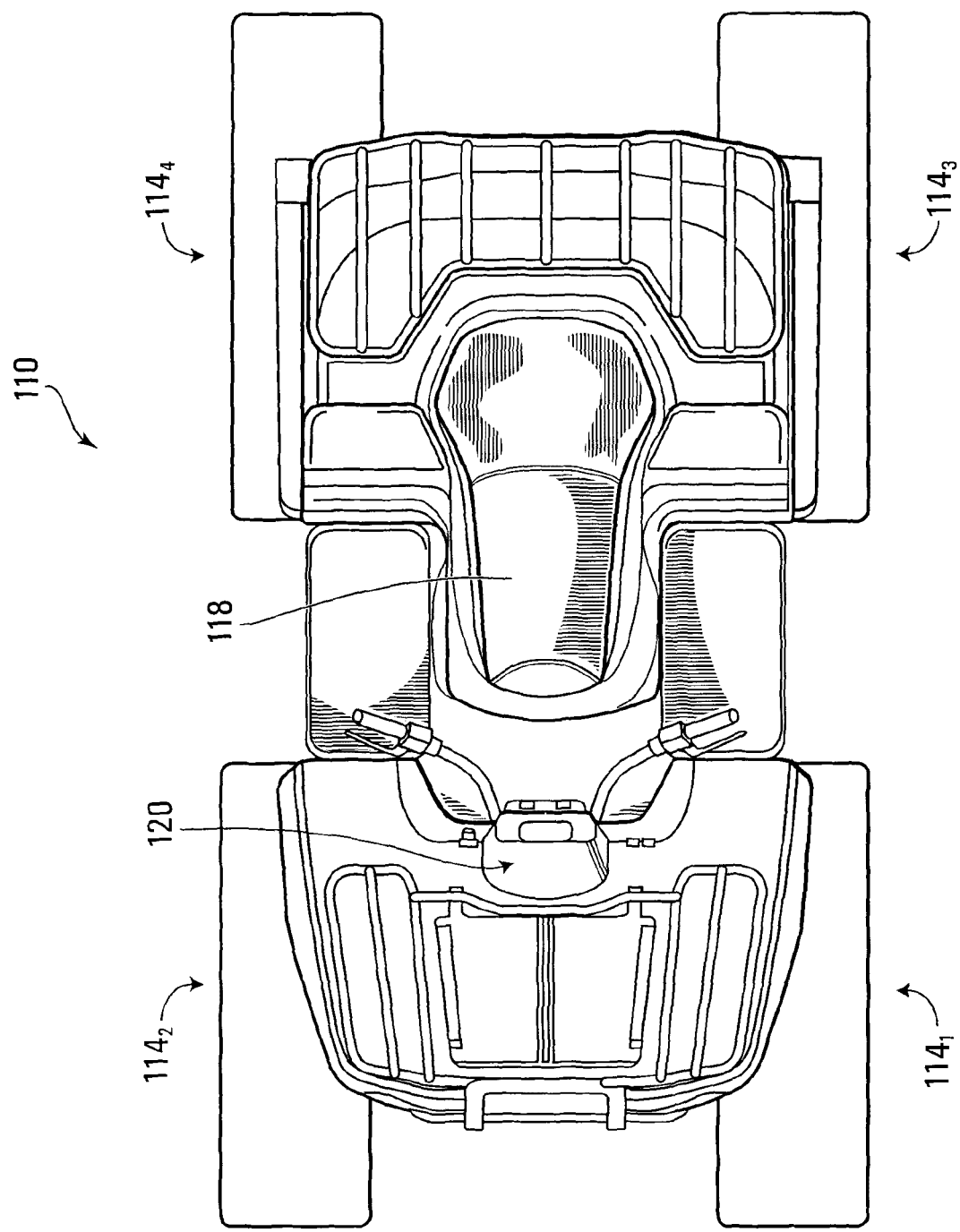

For example, in some embodiments, as shown in FIGS. 45A and 45B, any feature of any embodiment described above may be used in an all-terrain vehicle (ATV) 110 comprising a set of track systems 114₁-114₄ providing traction to the ATV on the ground. The ATV 10 comprises a prime mover 112 in a driving relationship with the track systems 114₁-114₄ via the ATV's powertrain, a seat 118, and a user interface 120, which enable a user of the ATV 110 to ride the ATV 110 on the ground. In this case, the seat 118 is a straddle seat and the ATV 110 is usable by a single person such that the seat 118 accommodates only that person driving the ATV 110. In other cases, the seat 118 may be another type of seat, and/or the ATV 110 may be usable by two individuals, namely one person driving the ATV 110 and a passenger, such that the seat 118 may accommodate both of these individuals (e.g., behind one another or side-by-side) or the ATV 110 may comprise an additional seat for the passenger. For example, in other embodiments, the ATV 110 may be a side-by-side ATV, sometimes referred to as a "utility terrain vehicle" or "UTV". The user interface 120 comprises a steering device operated by the user to control motion of the ATV 110 on the ground. In this case, the steering device comprises handlebars. In other cases, the steering device may comprise a steering wheel or other type of steering element. Each of the front track systems 114₁, 114₂ is pivotable about a steering axis of the ATV 110 in response to input of the user at the handlebars in order to steer the ATV 110 on the ground.

Figure 46A:
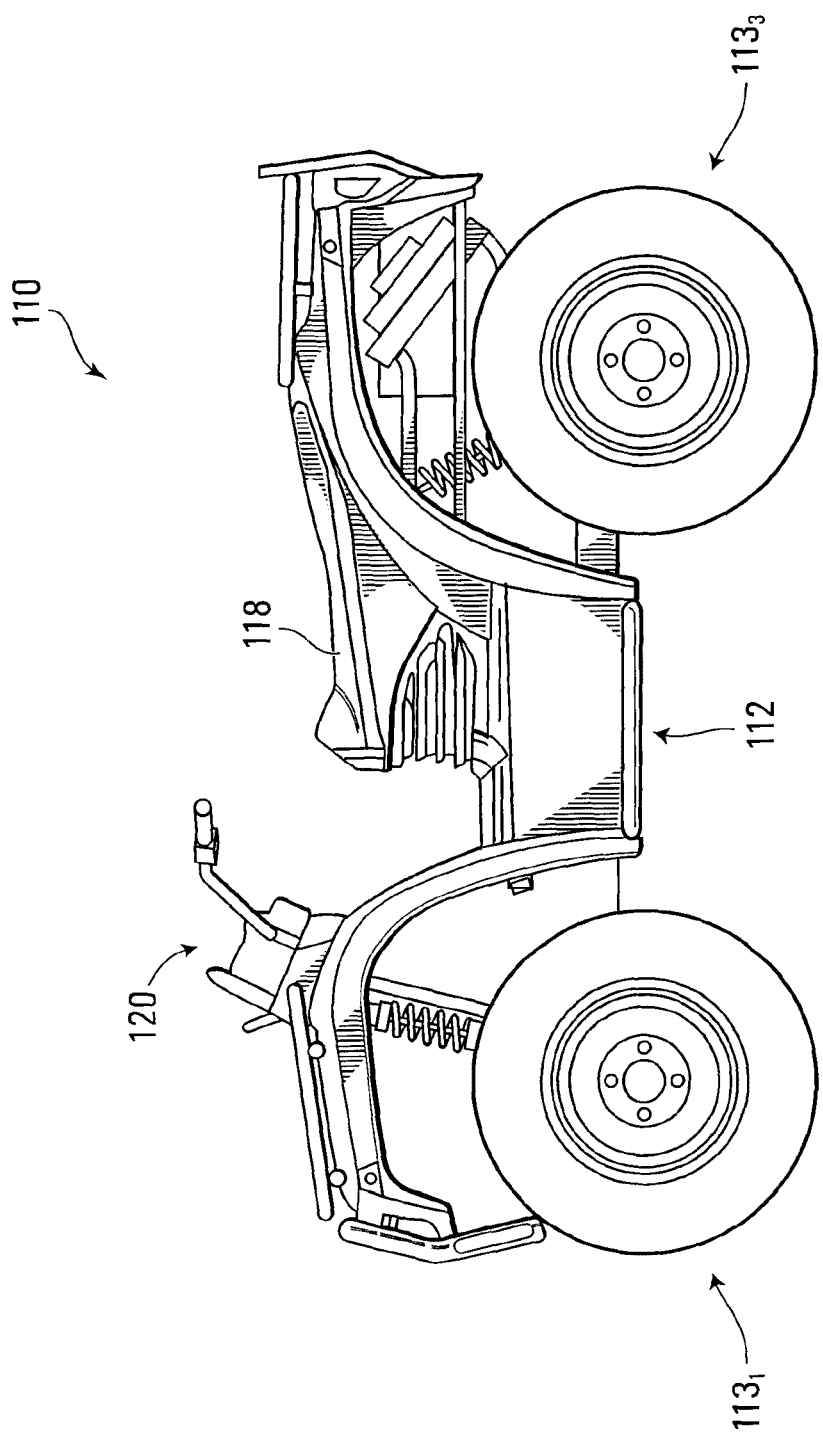
FIGS. 46A and 46B show the ATV equipped with ground-engaging wheels instead of the track systems.
Figure 46B:
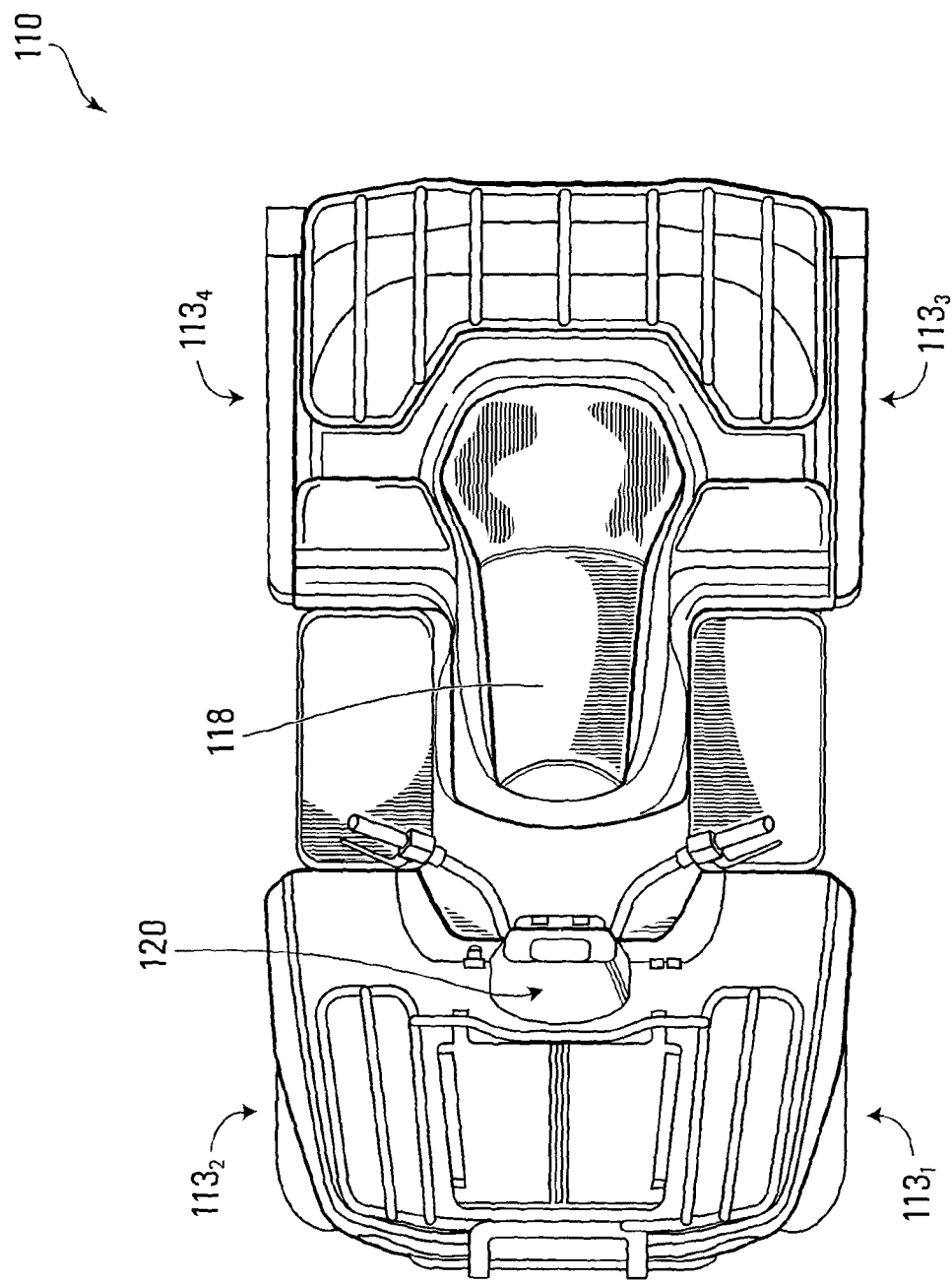

In this embodiment, with additional reference to FIGS. 46A and 46B, each track system 114₁-114₄ is mounted in place of a ground-engaging wheel 113₁-113₄ that may otherwise be mounted to the ATV 110 to propel the ATV 110 on the ground. That is, the ATV 110 may be propelled on the ground by four ground-engaging wheels 113₁-113₄ with tires instead of the track systems 114₁-114₄. Basically, in this embodiment, the track systems 114₁-114₄ may be used to convert the ATV 110 from a wheeled vehicle into a tracked vehicle, thereby enhancing its traction and floatation on the ground.

Any feature described herein with respect to the track system 14 of the snowmobile 10 may be applied to a track system 114₁-114₄ of the ATV 110.

The snowmobile 10 and the ATV 110 considered above are examples of tracked recreational vehicles. While they can be used for recreational purposes, such tracked recreational vehicles may also be used for utility purposes in some cases.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention.

The invention claimed is:

1. A track for traction of a vehicle on a ground, the track being mountable around a plurality of wheels, the track being elastomeric to flex around the wheels, the track comprising:
    a carcass comprising a ground-engaging outer surface for engaging the ground and an inner surface opposite to the ground-engaging outer surface; and
    a plurality of traction projections projecting from the ground-engaging outer surface of the carcass;
    a plurality of guide lugs projecting from the inner surface of the carcass; and
    a plurality of transversal stiffening rods embedded in the track extending transversally to a longitudinal direction of the track;
    wherein at least a part of the carcass, the plurality of traction projections, and the plurality of guide lugs comprises fiber-reinforced elastomeric material including an elastomeric matrix and reinforcing fibers embedded in the elastomeric matrix;
    wherein the plurality of transversal stiffening rods are entirely embedded in the fiber-reinforced elastomeric material; and
    wherein longitudinally-adjacent ones of the transversal stiffening rods have at least one characteristic that is different from each other.

2. The track of claim 1, wherein the at least a part of the carcass, the plurality of traction projections, and the plurality of guide lugs is at least a majority of the carcass, the plurality of traction projections, and the plurality of guide lugs.

3. The track of claim 1, wherein an entirety of the track is made of the fiber-reinforced elastomeric material.

4. The track of claim 1, wherein a length of each of the reinforcing fibers is no more than 3% of a width of the track.

5. The track of claim 1, wherein a length of each of the reinforcing fibers is no more than 10 mm.

6. The track of claim 1, wherein the reinforcing fibers are short fibers.

7. The track of claim 6, wherein the short fibers are chopped fibers.

8. The track of claim 1, wherein the reinforcing fibers are polymeric.

9. The track of claim 1, wherein the reinforcing fibers are aramid fibers.

10. The track of claim 1, wherein the reinforcing fibers are carbon fibers.

11. The track of claim 1, wherein the reinforcing fibers are configured to increase a rigidity of the track.

12. The track of claim 1, wherein the reinforcing fibers are configured to reduce noise generated by the track.

13. A track for traction of a vehicle on a ground, the track being mountable around a plurality of wheels, the track being elastomeric to flex around the wheels, the track comprising:
    a carcass comprising a ground-engaging outer surface for engaging the ground and an inner surface opposite to the ground-engaging outer surface;

a plurality of traction projections projecting from the ground-engaging outer surface; and a plurality of transversal stiffening rods extending transversally to a longitudinal direction of the track; and wherein the track comprises fiber-reinforced elastomeric material including an elastomeric matrix and reinforcing fibers embedded in the elastomeric matrix;

wherein the plurality of transversal stiffening rods are entirely embedded in the fiber-reinforced elastomeric material; and wherein longitudinally-adjacent ones of the transversal stiffening rods have at least one characteristic that is different from each other.

14. The track of claim 13, comprising a plurality of wheel-contacting projections projecting from the inner surface.

15. The track of claim 14, wherein the wheel-contacting projections are drive projections configured to drive the track.

16. The track of claim 13, wherein a length of each of the reinforcing fibers is no more than 10% of a width of the track.

17. The track of claim 13, wherein a length of each of the reinforcing fibers is no more than 30 mm.

18. The track of claim 13, wherein the embedded fibers are chopped fibers.

19. The track of claim 13, wherein the embedded fibers are aramid fibers.

20. The track of claim 13, wherein the embedded fibers are carbon fibers.

21. The track of claim 13, wherein a majority of the plurality of transversal stiffening rods comprises elastomeric fiber-reinforced rods comprising an elongated elastomeric body and rod embedded fibers, wherein the rod embedded fibers extend along at least a majority of a length of a given one of the elastomeric fiber-reinforced rods.

22. The track of claim 13, wherein the reinforcing fibers are configured to increase a rigidity of the track.

23. The track of claim 13, wherein the reinforcing fibers are configured to reduce noise generated by the track.

24. The track of claim 1, wherein a majority of the plurality of transversal stiffening rods comprises elastomeric fiber-reinforced rods comprising an elongated elastomeric body and rod embedded fibers, wherein the rod embedded fibers extend along at least a majority of a length of a given one of the elastomeric fiber-reinforced rods.

25. The track of claim 1, wherein two or more of the plurality of transversal stiffening rods are stacked in a thickness direction of the track such that the two or more of the plurality of transversal stiffening rods are spaced apart in the thickness direction.

26. The track of claim 25, wherein a deformable material is dispersed between the two or more of the plurality of transversal stiffening rods spaced apart in the thickness direction.

27. The track of claim 26, wherein the deformable material has a lower modulus of elasticity or a higher modulus of elasticity than the fiber-reinforced elastomeric material of the track.

28. The track of claim 26, wherein a ratio of a spacing between a first one of the two or more of the plurality of transversal stiffening rods and a second one of the two or more of the plurality of transversal stiffening rods to a thickness of the carcass is at least 0.15.

29. The track of claim 1, wherein at least a portion of the plurality of transversal stiffening rods are aligned with respective ones of the plurality of traction projections in the longitudinal direction.

30. The track of claim 29, wherein a width of the at least a portion of the transversal stiffening rods aligned with the respective ones of the plurality of traction projections in the longitudinal direction is less than a width of the respective ones of the plurality of traction projections.

31. The track of claim 29, wherein at least one of the plurality of transversal stiffening rods are located between adjacent ones of the traction projections.

32. The track of claim 1, wherein the at least one characteristic is a shape and/or a material.

33. The track of claim 1, wherein at least one of the plurality of transversal stiffening rods comprises a short rod that extends across only a portion of a width of the track.

34. The track of claim 33, wherein the short rod extends between inner sides of laterally-outmost ones of the plurality of wheels.

35. The track of claim 33, wherein the short rod extends between inner sides of slide rails adjacent to the plurality of wheels.

36. A track for traction of a vehicle on a ground, the track being mountable around a plurality of wheels, the track being elastomeric to flex around the wheels, the track comprising:

a carcass comprising a ground-engaging outer surface for engaging the ground and an inner surface opposite to the ground-engaging outer surface;

a plurality of traction projections projecting from the ground-engaging outer surface; and a plurality of transversal stiffening rods extending transversally to a longitudinal direction of the track;

wherein at least two of the plurality of transversal stiffening rods have at least one characteristic that are different from each other.

37. The track of claim 36, wherein the at least two of the plurality of transversal stiffening rods are stacked in a thickness direction of the track such that the at least two of the plurality of transversal stiffening rods are spaced apart in the thickness direction.

38. The track of claim 37, wherein the at least one characteristic is shape.

* * * * *